(12) United States Patent
Kanack et al.

(10) Patent No.: US 11,685,028 B2
(45) Date of Patent: *Jun. 27, 2023

(54) HYDRAULIC CRIMPER TOOL

(71) Applicant: MILWAUKEE ELECTRIC TOOL CORPORATION, Brookfield, WI (US)

(72) Inventors: Kris Kanack, Whitewater, WI (US); Sean T. Kehoe, Waukesha, WI (US); Paige Bovard, Milwaukee, WI (US); Alex Huber, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 448 days.

This patent is subject to a terminal disclaimer.

(21) Appl. No.: 16/846,609

(22) Filed: Apr. 13, 2020

(65) Prior Publication Data

US 2020/0238487 A1 Jul. 30, 2020

Related U.S. Application Data

(62) Division of application No. 15/183,603, filed on Jun. 15, 2016, now Pat. No. 10,618,151.

(Continued)

(51) Int. Cl.
*B25B 23/145* (2006.01)
*B25B 27/10* (2006.01)
(Continued)

(52) U.S. Cl.
CPC .......... *B25B 23/1456* (2013.01); *B25B 27/10* (2013.01); *B21D 39/048* (2013.01); *B23D 17/06* (2013.01); *H01R 43/0427* (2013.01)

(58) Field of Classification Search
CPC ... B21B 31/32; B25B 23/145; B25B 23/1456; B25B 27/10; B25B 27/146; B21D 1/14;
(Continued)

(56) References Cited

U.S. PATENT DOCUMENTS 3,882,305 A 5/1975 Johnstone
4,545,106 A 10/1985 Juengel
(Continued)

FOREIGN PATENT DOCUMENTS

CN 1413801 A 4/2003
CN 101968924 A 2/2011
(Continued)

OTHER PUBLICATIONS

International Search Report and Written Opinion for Application No. PCT/US2016/037678 dated Sep. 9, 2016 (17 pages).
(Continued)

*Primary Examiner* — Robert J Scruggs
(74) *Attorney, Agent, or Firm* — Michael Best & Friedrich LLP

(57) ABSTRACT

A power tool system includes a hydraulic power tool. The hydraulic power tool includes a hydraulic drive, a sensor, and a first electronic processor. The sensor is configured to detect an operational parameter of the hydraulic drive during an operation by the hydraulic drive. The first electronic processor is configured to store a plurality of data points based on the operational parameter detected during the operation and send the plurality of data points to an external device. The external device includes a display screen and a second electronic processor configured to receive the plurality of data points from the hydraulic power tool, control the display screen to display an expected data point for the operational parameter for the operation, and control the display screen to display an actual data curve based on the plurality of data points, the actual data curve overlaid on the expected data point.

18 Claims, 39 Drawing Sheets

Related U.S. Application Data

(60) Provisional application No. 62/175,958, filed on Jun. 15, 2015.

(51) Int. Cl.
  *B21D 39/04* (2006.01)
  *B23D 17/06* (2006.01)
  *H01R 43/042* (2006.01)

(58) Field of Classification Search
  CPC ...... B21D 39/04; B21D 39/048; B21D 55/00; B23D 17/06; H01R 43/0427; B30B 1/32; G01M 99/005; G01N 3/10; G01L 1/02
  See application file for complete search history.

(56) References Cited

U.S. PATENT DOCUMENTS

| | | | |
|---|---|---|---|
| 4,680,862 | A | 7/1987 | Wieland et al. |
| 4,685,050 | A | 8/1987 | Polzer et al. |
| 4,854,786 | A | 8/1989 | Alexander et al. |
| 5,113,949 | A | 5/1992 | Ohkubo et al. |
| 5,277,261 | A | 1/1994 | Sakoh |
| 5,315,501 | A | 5/1994 | Whitehouse |
| 5,592,396 | A | 1/1997 | Tambini et al. |
| 5,727,417 | A * | 3/1998 | Moffatt ............ B21F 15/06 72/453.03 |
| 5,903,462 | A | 5/1999 | Wagner et al. |
| 5,942,975 | A | 8/1999 | Sørensen |
| 6,028,669 | A | 2/2000 | Tzeng |
| 6,055,484 | A | 4/2000 | Lysaght |
| 6,123,241 | A | 9/2000 | Walter et al. |
| 6,157,313 | A | 12/2000 | Emmermann |
| 6,161,629 | A | 12/2000 | Hohmann et al. |
| 6,279,668 | B1 | 8/2001 | Mercer |
| 6,349,266 | B1 | 2/2002 | Lysaght et al. |
| 6,390,205 | B2 | 5/2002 | Wallgren et al. |
| 6,405,598 | B1 | 6/2002 | Bareggi |
| 6,424,799 | B1 | 7/2002 | Gilmore |
| 6,431,425 | B1 | 8/2002 | Moorman et al. |
| 6,446,482 | B1 | 9/2002 | Heskey et al. |
| 6,469,615 | B1 | 10/2002 | Kady et al. |
| 6,508,313 | B1 | 1/2003 | Carney et al. |
| 6,520,270 | B2 | 2/2003 | Wissmach et al. |
| 6,522,949 | B1 | 2/2003 | Ikeda et al. |
| 6,547,014 | B2 | 4/2003 | McCallops et al. |
| 6,598,684 | B2 | 7/2003 | Watanabe |
| 6,668,212 | B2 | 12/2003 | Colangelo, II et al. |
| 6,675,196 | B1 | 1/2004 | Kronz |
| 6,768,994 | B1 | 1/2004 | Howard et al. |
| 6,687,567 | B2 | 2/2004 | Watanabe |
| 6,784,801 | B2 | 8/2004 | Watanabe et al. |
| 6,836,614 | B2 | 12/2004 | Gilmore |
| 6,848,516 | B2 | 2/2005 | Giardino |
| 6,863,502 | B2 | 3/2005 | Bishop et al. |
| 6,868,351 | B1 | 3/2005 | Schoch et al. |
| 6,872,121 | B2 | 3/2005 | Wiener et al. |
| 6,913,087 | B1 | 7/2005 | Brotto et al. |
| 6,923,285 | B1 | 8/2005 | Rossow et al. |
| 6,938,689 | B2 | 9/2005 | Farrant et al. |
| 6,954,048 | B2 | 10/2005 | Cho |
| 6,968,908 | B2 | 11/2005 | Tokunaga et al. |
| 6,981,311 | B2 | 1/2006 | Seith et al. |
| 6,986,274 | B2 | 1/2006 | Lefavour et al. |
| 7,034,711 | B2 | 4/2006 | Sakatani et al. |
| 7,035,710 | B2 | 4/2006 | Balling |
| 7,036,703 | B2 | 5/2006 | Grazioli et al. |
| 7,062,998 | B2 | 6/2006 | Hohmann et al. |
| 7,086,483 | B2 | 8/2006 | Arimura et al. |
| 7,102,303 | B2 | 9/2006 | Brotto et al. |
| 7,112,934 | B2 | 9/2006 | Gilmore |
| 7,137,541 | B2 | 11/2006 | Baskar et al. |
| 7,174,324 | B2 | 2/2007 | Kakuhari et al. |
| 7,211,972 | B2 | 5/2007 | Garcia et al. |
| 7,243,440 | B2 | 7/2007 | DeKeyser |
| 7,298,240 | B2 | 11/2007 | Lamar |
| 7,328,086 | B2 | 2/2008 | Perry et al. |
| 7,328,757 | B2 | 2/2008 | Davies |
| 7,330,129 | B2 | 2/2008 | Crowell et al. |
| 7,343,764 | B2 | 3/2008 | Solfronk |
| 7,346,406 | B2 | 3/2008 | Brotto et al. |
| 7,346,422 | B2 | 3/2008 | Tsuchiya et al. |
| 7,359,762 | B2 | 4/2008 | Etter et al. |
| 7,382,272 | B2 | 6/2008 | Feight |
| 7,383,882 | B2 | 6/2008 | Lerche et al. |
| 7,437,204 | B2 | 10/2008 | Lev-Ami et al. |
| 7,464,769 | B2 | 12/2008 | Nakazawa et al. |
| 7,496,852 | B2 | 2/2009 | Eichorn et al. |
| 7,501,778 | B2 | 3/2009 | Hashimoto et al. |
| 7,540,334 | B2 | 6/2009 | Gass et al. |
| 7,613,590 | B2 | 11/2009 | Brown |
| 7,646,155 | B2 | 1/2010 | Woods et al. |
| RE41,185 | E | 3/2010 | Gilmore et al. |
| 7,690,569 | B2 | 4/2010 | Swanson et al. |
| 7,750,811 | B2 | 7/2010 | Puzio et al. |
| 7,772,850 | B2 | 8/2010 | Bertness |
| 7,784,104 | B2 | 8/2010 | Innami et al. |
| 7,787,981 | B2 | 8/2010 | Austin et al. |
| 7,795,829 | B2 | 9/2010 | Seiler et al. |
| 7,809,495 | B2 | 10/2010 | Leufen |
| 7,817,062 | B1 | 10/2010 | Li et al. |
| 7,834,566 | B2 | 11/2010 | Woods et al. |
| 7,850,071 | B2 | 12/2010 | Sakamoto et al. |
| 7,868,591 | B2 | 1/2011 | Phillips et al. |
| 7,898,403 | B2 | 3/2011 | Ritter et al. |
| 7,900,524 | B2 | 3/2011 | Calloway et al. |
| 7,911,379 | B2 | 3/2011 | Cameron |
| 7,928,673 | B2 | 4/2011 | Woods et al. |
| 7,931,096 | B2 | 4/2011 | Saha |
| 7,942,084 | B2 | 5/2011 | Wilson, Jr. et al. |
| 7,942,211 | B2 | 5/2011 | Scrimshaw et al. |
| 7,953,965 | B2 | 5/2011 | Qin et al. |
| 7,982,624 | B2 | 7/2011 | Richter et al. |
| 8,004,397 | B2 | 8/2011 | Forrest et al. |
| 8,004,664 | B2 | 8/2011 | Etter et al. |
| 8,005,647 | B2 | 8/2011 | Armstrong et al. |
| 8,044,796 | B1 | 10/2011 | Carr, Sr. |
| 8,049,636 | B2 | 11/2011 | Buckingham et al. |
| 8,056,473 | B2 | 11/2011 | Frenken |
| 8,161,613 | B2 | 4/2012 | Schuele et al. |
| 8,171,828 | B2 | 5/2012 | Duvan et al. |
| 8,210,275 | B2 | 7/2012 | Suzuki et al. |
| 8,255,358 | B2 | 8/2012 | Ballew et al. |
| 8,260,452 | B2 | 9/2012 | Austin et al. |
| 8,264,374 | B2 | 9/2012 | Obatake et al. |
| 8,281,871 | B2 | 10/2012 | Cutler et al. |
| 8,286,723 | B2 | 10/2012 | Puzio et al. |
| 8,294,424 | B2 | 10/2012 | Bucur |
| 8,306,836 | B2 | 11/2012 | Nichols et al. |
| 8,310,206 | B2 | 11/2012 | Bucur |
| 8,316,958 | B2 | 11/2012 | Schell et al. |
| 8,330,426 | B2 | 12/2012 | Suzuki et al. |
| 8,344,879 | B2 | 1/2013 | Harmon et al. |
| 8,351,982 | B2 | 1/2013 | Rofougaran |
| 8,406,697 | B2 | 3/2013 | Arimura et al. |
| 8,412,179 | B2 | 4/2013 | Gerold et al. |
| 8,438,955 | B2 | 5/2013 | Wilson, Jr. et al. |
| 8,464,808 | B2 | 6/2013 | Leü |
| 8,485,049 | B2 | 7/2013 | Yokoyama et al. |
| 8,576,095 | B2 | 11/2013 | Harmon et al. |
| 8,611,250 | B2 | 12/2013 | Chen et al. |
| 8,645,176 | B2 | 2/2014 | Walton et al. |
| 8,657,482 | B2 | 2/2014 | Malackowski et al. |
| 8,666,936 | B2 | 3/2014 | Wallace |
| 8,678,106 | B2 | 3/2014 | Matsunaga et al. |
| 8,818,617 | B2 | 8/2014 | Miller et al. |
| 8,823,322 | B2 | 9/2014 | Noda et al. |
| 8,890,449 | B2 | 11/2014 | Suzuki et al. |
| 8,919,456 | B2 | 12/2014 | Ng et al. |
| 8,954,222 | B2 | 2/2015 | Costantino |
| 8,954,227 | B2 | 2/2015 | Bertosa et al. |
| 8,965,841 | B2 | 2/2015 | Wallace |
| 8,981,680 | B2 | 3/2015 | Suda et al. |
| 8,996,237 | B2 | 3/2015 | Bertosa et al. |

(56) References Cited

U.S. PATENT DOCUMENTS

| | | | |
|---|---|---|---|
| 9,002,572 B2 | 4/2015 | Lipscomb et al. | |
| 9,030,145 B2 | 5/2015 | Brennenstuhl et al. | |
| 9,031,585 B2 | 5/2015 | Kahle et al. | |
| 9,038,743 B2 | 5/2015 | Aoki | |
| 9,061,392 B2 | 6/2015 | Forgues et al. | |
| 9,073,134 B2 | 7/2015 | Koeder et al. | |
| 9,111,234 B2 | 8/2015 | Wallace et al. | |
| 9,126,317 B2 | 9/2015 | Lawton et al. | |
| 9,144,875 B2 | 9/2015 | Schlesak et al. | |
| 9,194,917 B2 | 11/2015 | Brochhaus | |
| 9,216,505 B2 | 12/2015 | Rejman et al. | |
| 9,232,614 B2 | 1/2016 | Hiroi | |
| 9,233,457 B2 | 1/2016 | Wanek et al. | |
| 9,242,356 B2 | 1/2016 | King et al. | |
| 9,256,988 B2 | 2/2016 | Wenger et al. | |
| 9,257,865 B2 | 2/2016 | Hiuggins et al. | |
| 9,281,770 B2 | 3/2016 | Wood et al. | |
| 10,618,151 B2 * | 4/2020 | Kanack | B25B 27/10 |
| 2001/0052416 A1 | 12/2001 | Wissmach et al. | |
| 2002/0033267 A1 | 3/2002 | Schweizer et al. | |
| 2003/0009262 A1 | 1/2003 | Colangelo, III et al. | |
| 2003/0121677 A1 | 3/2003 | Kady et al. | |
| 2003/0079513 A1 * | 5/2003 | Miyamoto | H01R 43/0428 72/19.9 |
| 2004/0182587 A1 | 9/2004 | May et al. | |
| 2005/0035659 A1 | 2/2005 | Hahn et al. | |
| 2005/0217097 A1 * | 10/2005 | Solfronk | B21J 15/285 29/243.521 |
| 2006/0009879 A1 | 1/2006 | Lynch et al. | |
| 2006/0076385 A1 | 4/2006 | Etter et al. | |
| 2008/0084334 A1 | 4/2008 | Ballew | |
| 2008/0086320 A1 | 4/2008 | Ballew | |
| 2008/0086323 A1 | 4/2008 | Petrie et al. | |
| 2008/0086349 A1 | 4/2008 | Petrie et al. | |
| 2008/0086427 A1 | 4/2008 | Wallace | |
| 2008/0086428 A1 | 4/2008 | Wallace | |
| 2008/0086685 A1 | 4/2008 | Janky et al. | |
| 2008/0252446 A1 | 10/2008 | Dammertz | |
| 2009/0056467 A1 | 3/2009 | Newman | |
| 2009/0250364 A1 | 10/2009 | Gerold et al. | |
| 2009/0251330 A1 | 10/2009 | Gerold et al. | |
| 2010/0096151 A1 | 4/2010 | Östling | |
| 2010/0101785 A1 | 4/2010 | Khvoshchev et al. | |
| 2010/0116519 A1 | 5/2010 | Gareis | |
| 2010/0154599 A1 | 6/2010 | Gareis | |
| 2010/0176766 A1 | 7/2010 | Brandner et al. | |
| 2011/0056716 A1 | 3/2011 | Jönsson et al. | |
| 2011/0067895 A1 | 3/2011 | Nobe et al. | |
| 2011/0073343 A1 | 3/2011 | Sawano et al. | |
| 2011/0162858 A1 | 7/2011 | Coste | |
| 2011/0186353 A1 | 8/2011 | Turner et al. | |
| 2011/0309931 A1 | 12/2011 | Rose | |
| 2012/0167721 A1 | 7/2012 | Fluhrer | |
| 2012/0168189 A1 | 7/2012 | Eckert | |
| 2012/0267134 A1 | 10/2012 | Matthias et al. | |
| 2012/0284981 A1 | 11/2012 | Bungter et al. | |
| 2012/0292070 A1 | 11/2012 | Ito et al. | |
| 2012/0325507 A1 | 12/2012 | Fluhrer et al. | |
| 2013/0024245 A1 | 1/2013 | Nichols et al. | |
| 2013/0062086 A1 | 3/2013 | Ito et al. | |
| 2013/0071815 A1 | 3/2013 | Hudson et al. | |
| 2013/0087355 A1 | 4/2013 | Oomori et al. | |
| 2013/0109375 A1 | 5/2013 | Zeiler et al. | |
| 2013/0118767 A1 | 5/2013 | Cannaliato et al. | |
| 2013/0126202 A1 | 5/2013 | Oomori et al. | |
| 2013/0133907 A1 | 5/2013 | Chen et al. | |
| 2013/0133911 A1 | 5/2013 | Ishikawa et al. | |
| 2013/0138465 A1 | 5/2013 | Kahle et al. | |
| 2013/0138606 A1 | 5/2013 | Kahle et al. | |
| 2013/0153250 A1 | 6/2013 | Eckert | |
| 2013/0187587 A1 | 7/2013 | Knight et al. | |
| 2013/0188058 A1 | 7/2013 | Nguyen et al. | |
| 2013/0255980 A1 | 10/2013 | Linehan et al. | |
| 2013/0327552 A1 | 12/2013 | Lovelass et al. | |
| 2013/0328512 A1 | 12/2013 | Oazki | |
| 2013/0328513 A1 | 12/2013 | Odenthal et al. | |
| 2014/0006295 A1 | 1/2014 | Zeiler et al. | |
| 2014/0015389 A1 | 1/2014 | Vatterott et al. | |
| 2014/0069672 A1 | 3/2014 | Mashiko et al. | |
| 2014/0107853 A1 | 4/2014 | Ashinghurst et al. | |
| 2014/0122143 A1 | 5/2014 | Fletcher et al. | |
| 2014/0151079 A1 | 6/2014 | Furui et al. | |
| 2014/0158389 A1 | 6/2014 | Ito et al. | |
| 2014/0159662 A1 | 6/2014 | Furui et al. | |
| 2014/0159919 A1 | 6/2014 | Furui et al. | |
| 2014/0159920 A1 | 6/2014 | Furui et al. | |
| 2014/0166324 A1 | 6/2014 | Puzio et al. | |
| 2014/0184397 A1 | 7/2014 | Volpert | |
| 2014/0259597 A1 | 9/2014 | Lavalley et al. | |
| 2014/0266024 A1 | 9/2014 | Chinnadurai et al. | |
| 2014/0284070 A1 | 9/2014 | Ng et al. | |
| 2014/0292245 A1 | 10/2014 | Suzuki et al. | |
| 2014/0324194 A1 | 10/2014 | Larsson et al. | |
| 2014/0331830 A1 | 11/2014 | King et al. | |
| 2014/0334270 A1 | 11/2014 | Kusakawa | |
| 2014/0336810 A1 | 11/2014 | Li et al. | |
| 2014/0336955 A1 | 11/2014 | Li et al. | |
| 2014/0350716 A1 | 11/2014 | Fly et al. | |
| 2014/0365259 A1 | 12/2014 | Delplace et al. | |
| 2014/0367134 A1 | 12/2014 | Phillips et al. | |
| 2014/0379136 A1 | 12/2014 | Schlegel et al. | |
| 2015/0000944 A1 | 1/2015 | Dusselberg et al. | |
| 2015/0002089 A1 | 1/2015 | Rejman et al. | |
| 2015/0014058 A1 | 1/2015 | Wassell et al. | |
| 2015/0042247 A1 | 2/2015 | Kusakawa | |
| 2015/0122524 A1 | 5/2015 | Papp | |
| 2015/0127205 A1 | 5/2015 | Brochhaus | |
| 2015/0135306 A1 | 5/2015 | Winkler et al. | |
| 2015/0135907 A1 | 5/2015 | Hirabayashi et al. | |
| 2015/0137721 A1 | 5/2015 | Yamamoto et al. | |
| 2015/0158157 A1 | 6/2015 | Hirabayashi et al. | |
| 2015/0158170 A1 | 6/2015 | Nitsche et al. | |
| 2015/0171654 A1 | 6/2015 | Horie et al. | |
| 2015/0179036 A1 | 6/2015 | Heine et al. | |
| 2015/0191096 A1 | 7/2015 | Becker et al. | |
| 2015/0340921 A1 | 11/2015 | Suda et al. | |
| 2017/0008159 A1 | 1/2017 | Boeck et al. | |

FOREIGN PATENT DOCUMENTS

| | | |
|---|---|---|
| CN | 102480096 | 5/2012 |
| CN | 102822752 A | 12/2012 |
| CN | 104295233 A | 1/2015 |
| DE | 4337796 A1 | 5/1995 |
| DE | 10309703 | 9/2004 |
| DE | 202006014606 | 1/2007 |
| EP | 2147750 | 1/2010 |
| JP | 2000176850 | 6/2000 |
| JP | 2004072563 | 3/2004 |
| JP | 2006123080 | 5/2006 |
| WO | 2002030624 | 4/2002 |
| WO | 2007090258 | 8/2007 |
| WO | 2013116303 | 8/2013 |
| WO | 2014104025 A1 | 7/2017 |

OTHER PUBLICATIONS

European Patent Office Search Report for Application No. 16812361.0 dated Jan. 18, 2019 (7 pages).

Chinese Patent Office Action for Application No. 201680048494.8 dated Dec. 17, 2018 (13 pages, English translation included).

Chinese Patent Office Action for Application No. 201680048494.8 dated Sep. 9, 2019 (12 pages, partial English translation included).

* cited by examiner

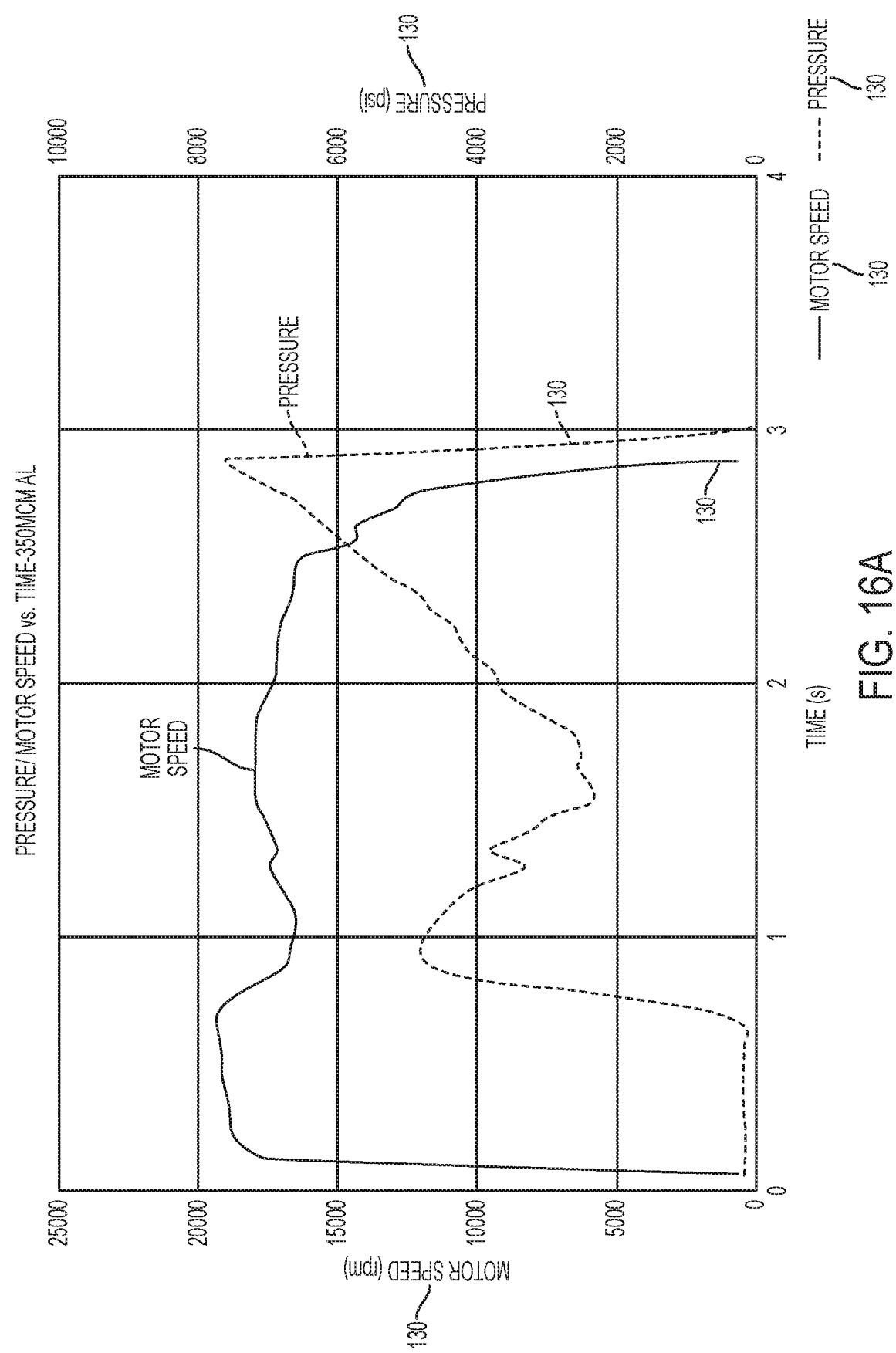

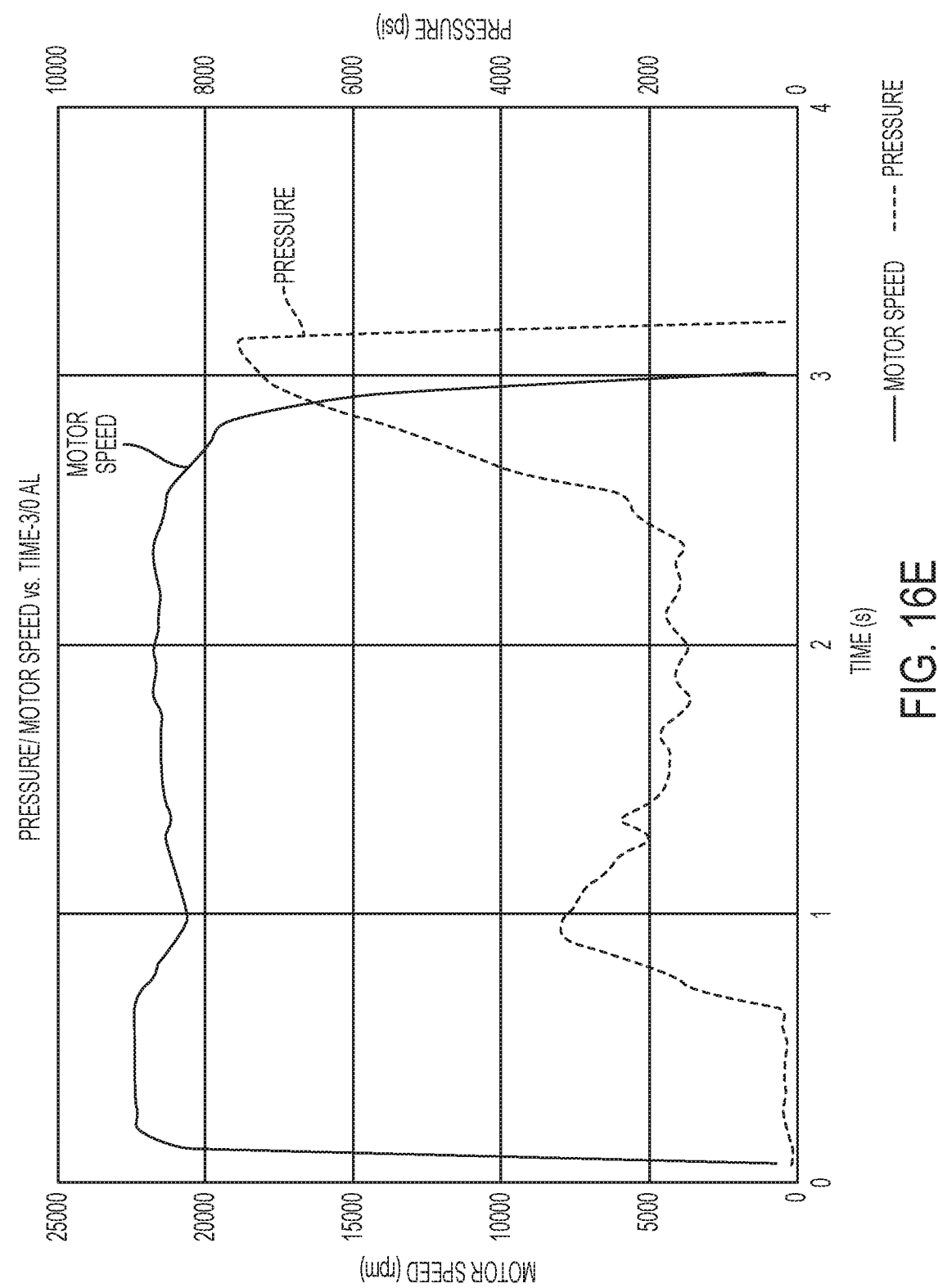

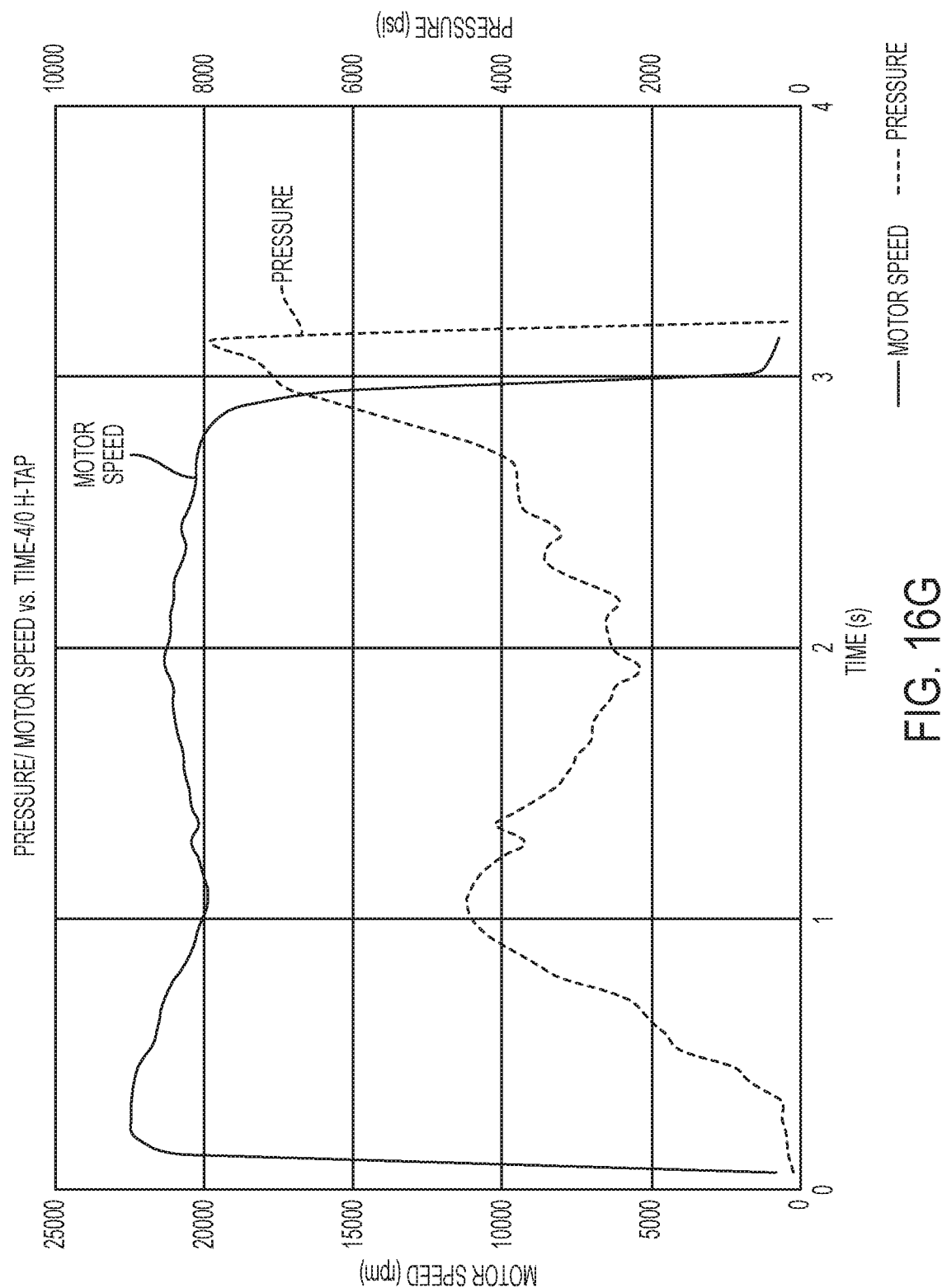

HYDRAULIC CRIMPER TOOL

CROSS-REFERENCE TO RELATED APPLICATIONS

This application is a division of U.S. patent application Ser. No. 15/183,603, filed on Jun. 15, 2016, now U.S. Pat. No. 10,618,151, which claims priority to U.S. Provisional Application No. 62/175,958 filed on Jun. 15, 2015, the entire contents of all of which are hereby incorporated by reference.

FIELD OF THE INVENTION

The present invention relates to power tools, such as hand-held hydraulic power tools, that communicate with an external device.

BACKGROUND OF THE INVENTION

Hydraulic crimpers and cutters are different types of hydraulic power tools for performing work (e.g., crimping or cutting) on a workpiece. In such tools, a hydraulic pump is utilized for pressurizing hydraulic fluid and transferring it to a cylinder in the tool, causing an extensible piston to be displaced. The piston exerts a force on the head of the power tool, which may include opposed jaws with crimping or cutting features, depending upon the particular configuration of the power tool. In this case, the force exerted by the piston may be used for closing the jaws to perform work on a workpiece.

SUMMARY OF THE INVENTION

Embodiments of the invention relate to a power tool (e.g., a hydraulic crimper or cutter) that captures tool operational data and exports the captured data to an external device, such as a smart phone, and to a remote server. In some instances, the tool operational data includes one or more data curves of pressure versus time, current versus time, motor speed versus time, and force versus time, which are captured over the course of the tool action (e.g., a cutting or a crimping action). The captured tool operational data may be monitored and analyzed by the tool, external device, and/or server to confirm that the tool is operating correctly before performing a tool action (e.g., a crimp or a cut), to provide early notification of tool performance degradation, to assess whether the tool action reached full pressure, and/or to assess whether the action was acceptable based on curve data.

One embodiment of the invention provides a method of operating a hydraulic power tool. The method includes performing an operation by a hydraulic drive of the hydraulic power tool, detecting, with a sensor, an operational parameter of the hydraulic drive during the operation, and storing a plurality of data points based on the operational parameter detected during the operation. The method also includes sending, via a transceiver on the hydraulic power tool, the plurality of data points to an external device, displaying, on a display screen of the external device, an expected data point for the operational parameter, and displaying, on the display screen of the external device, an actual data curve based on the plurality of data points. The actual data curve is displayed overlaid on the expected data point.

Another embodiment of the invention provides a power tool system including a hydraulic power tool and an external device. The hydraulic power tool includes a hydraulic drive, a sensor, and a first electronic processor. The hydraulic drive includes a pump and a motor configured to drive the pump. The sensor is configured to detect an operational parameter of the hydraulic drive during an operation by the hydraulic drive. The first electronic processor is configured to store a plurality of data points based on the operational parameter detected during the operation, and send, via a transceiver on the hydraulic power tool, the plurality of data points to the external device. The external device includes a display screen and a second electronic processor. The second electronic processor is coupled to the display screen and is configured to receive the plurality of data points from the hydraulic power tool, control the display screen to display an expected data point for the operational parameter, and control the display screen to display an actual data curve based on the plurality of data points. The actual data curve is displayed overlaid on the expected data point.

In another embodiment of the invention, a method of operating a hydraulic power tool is provided. The method includes performing an operation by a hydraulic drive of the hydraulic power tool and detecting, with a sensor, an operational parameter of the hydraulic drive during the operation. The method further includes comparing, with an electronic processor, the operational parameter to a threshold to determine that the operation of the hydraulic power tool was successful when the operational parameter exceeds the threshold. The method also includes providing an indication that the operation of the hydraulic power tool was successful based on the determination.

Other features and aspects of the invention will become apparent by consideration of the following detailed description and accompanying drawings.

BRIEF DESCRIPTION OF THE DRAWINGS

FIGS. 16A-16G illustrate pressure and motor speed profiles for various dies of a hydraulic crimper tool.

DETAILED DESCRIPTION

Figure 1:
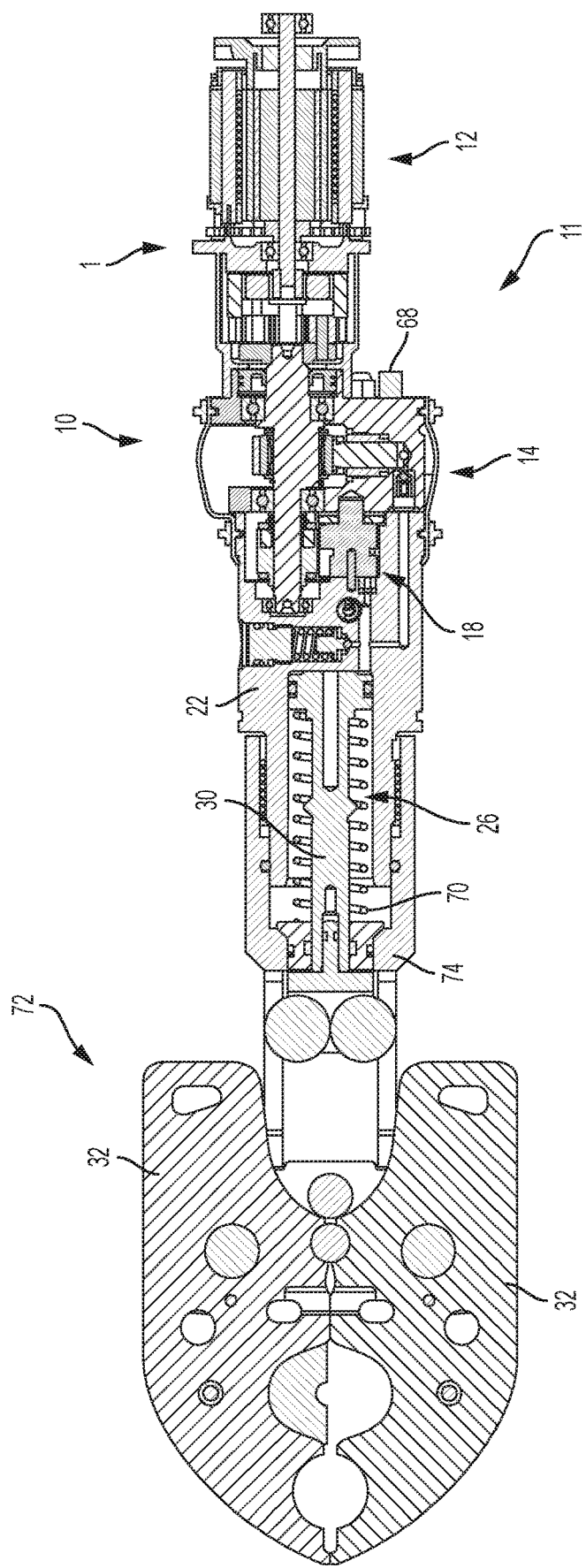
FIG. 1 is a cross-sectional view of a hydraulic power tool in accordance with an embodiment of the invention, illustrating a crimping head coupled to a body of the tool.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

FIG. 1 illustrates an embodiment of a hydraulic power tool, shown as a crimper 10, including a hydraulic drive 11. The hydraulic drive 11 includes an electric motor 12, and a pump 14 driven by the motor 12. In some embodiments, the hydraulic drive 11 also includes a cylinder housing 22 defining a cylinder 26 therein, and an extensible piston 30 disposed within the cylinder 26. The crimper 10 also includes electronic control and monitoring circuitry (not shown) for controlling and/or monitoring various functions of the hydraulic power tool. As is described in more detail below, the pump 14 provides pressurized hydraulic fluid to the piston cylinder 26, causing the piston 30 to extend from the cylinder housing 22 and thereby actuate a pair of jaws 32 for crimping a workpiece. The jaws 32 are a part of a crimper head 72, which also includes a clevis 74 for attaching the head 72 to a body 1 of the crimper 10, which otherwise includes the motor 12, pump 14, cylinder housing 22, and piston 30. The crimper head 72 can include different types of dies depending on the size, shape, and material of the workpiece. For example, the dies can be used for electrical applications (e.g., wire and couplings) or plumbing applications (e.g., pipe and couplings). The size of the die can depend on the size of the wire, pipe, or coupling. The shape formed by the die can be circular or another shape. The dies can be configured to crimp various malleable materials and metals, such as copper (Cu) and aluminum (Al). Although FIG. 1 illustrates a hydraulic crimper 10, the inventions described herein are applicable to a wide range of hydraulic power tools (e.g., cutters, knockout punches, etc.).

Figure 2:
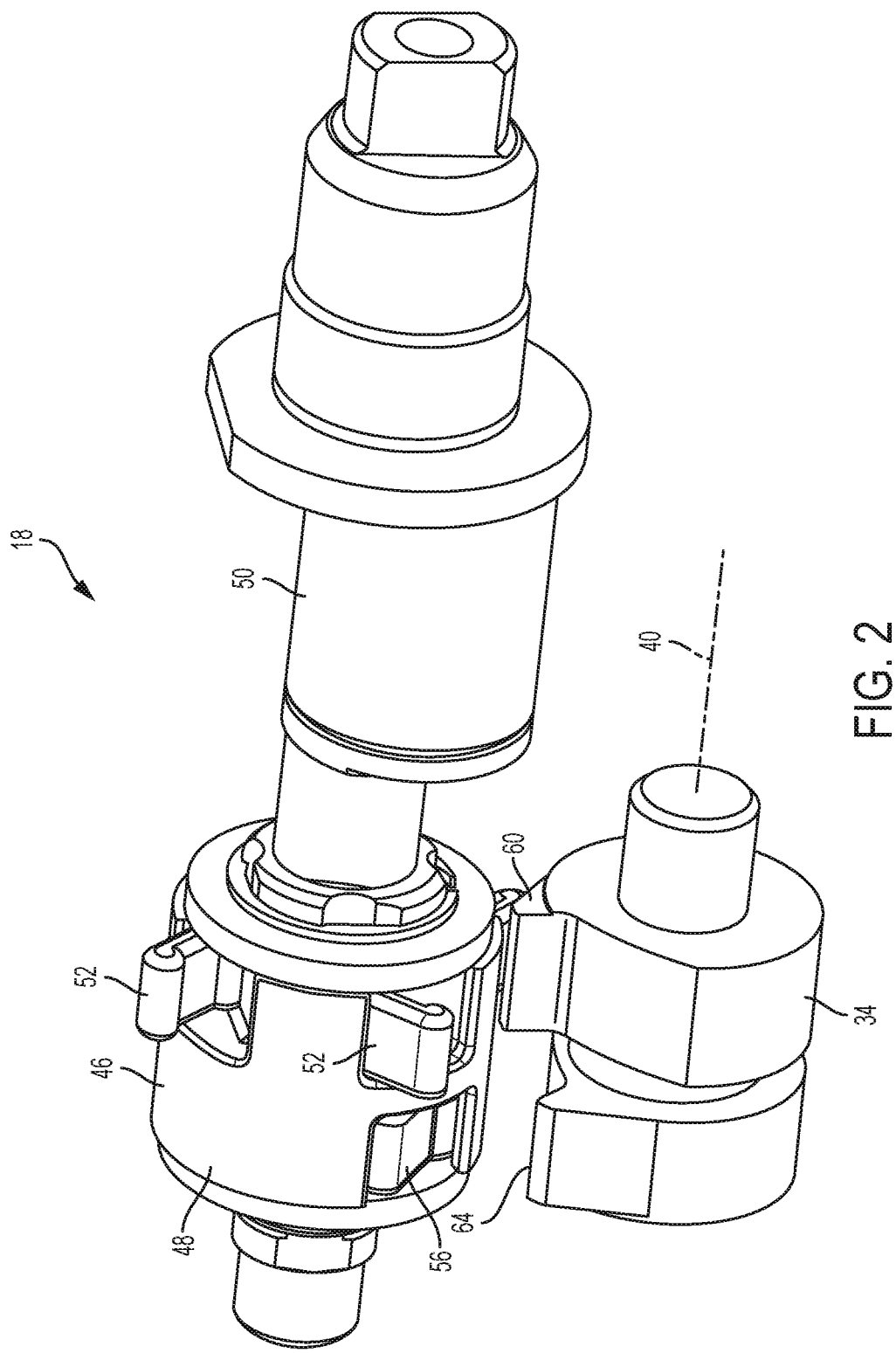
FIG. 2 is a perspective view of a rotary return valve of the power tool of FIG. 1.
Figure 3:
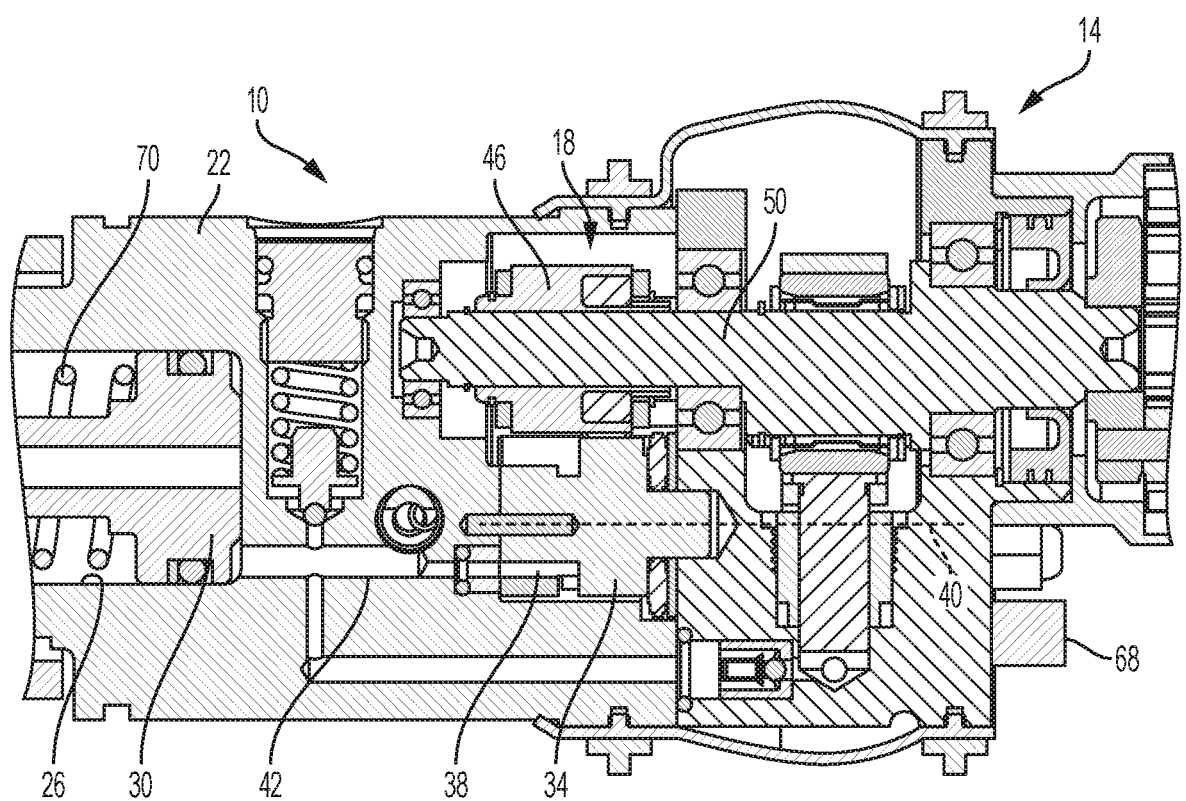
FIG. 3 is a portion of the power tool of FIG. 1, illustrating the rotary return valve in an open position.

Referring to FIGS. 1-3, the crimper 10 includes an auto return valve assembly 18. The assembly 18 includes a rotary return valve 34 having a return port 38 (FIG. 3) offset from a rotational axis 40 of the valve 34. The return port 38 is in selective alignment with a return passageway 42 in the cylinder housing 22 which, in turn, is in fluid communication with the cylinder 26.

Figure 4A:
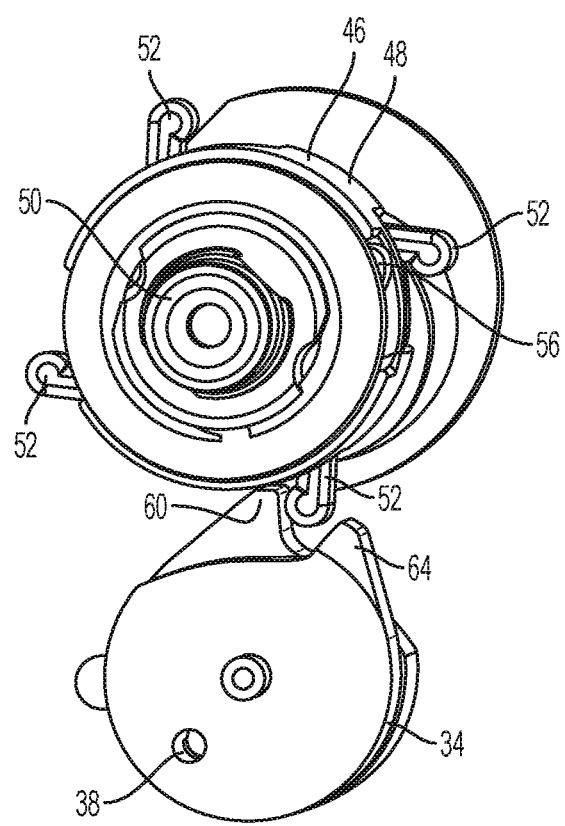
FIG. 4A is a perspective view of the rotary return valve immediately prior to being opened.
Figure 4B:
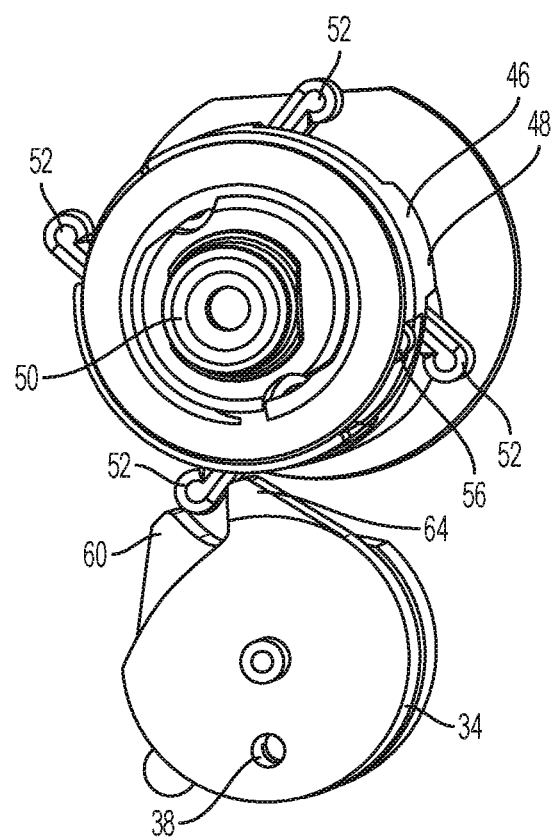
FIG. 4B is a perspective view of the rotary return valve just after being opened.
Figure 6A:
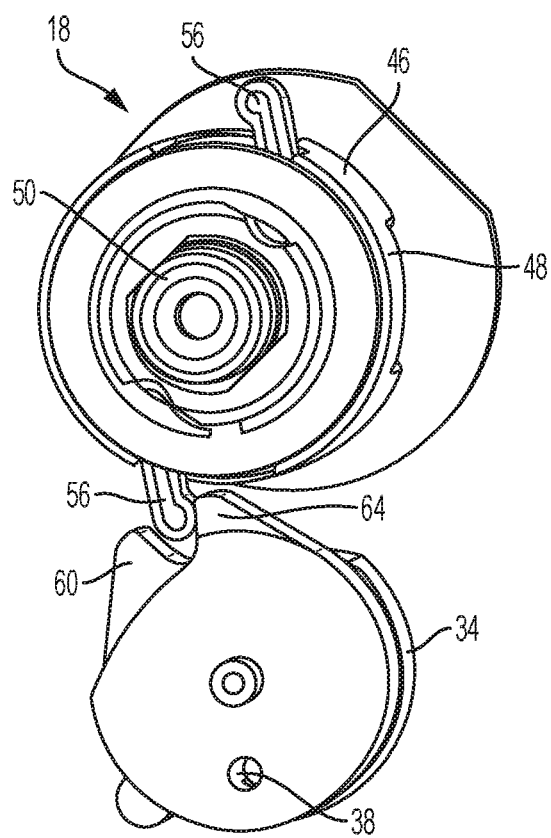
FIG. 6A is a perspective view of the rotary return immediately prior to being closed.
Figure 6B:
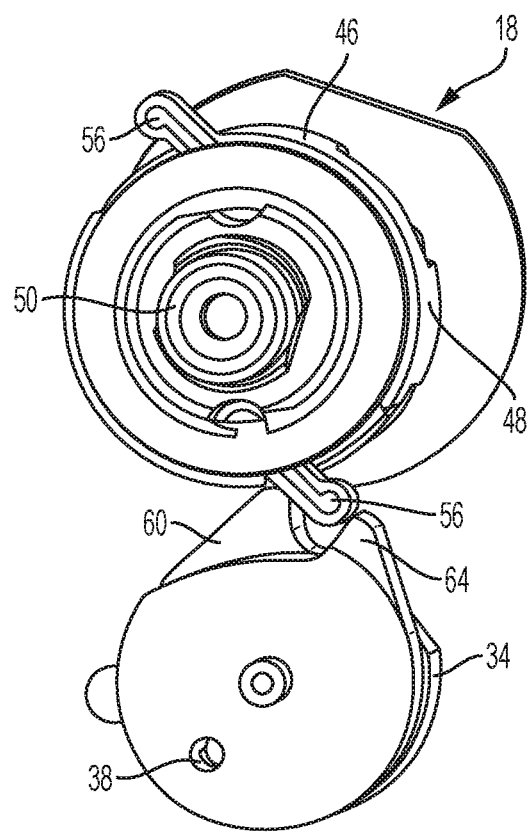
FIG. 6B is a perspective view of the rotary return valve just after being closed.

With reference to FIG. 2, the assembly 18 also includes a valve actuator 46 driven by an input shaft 50 of the pump 14 for selectively closing the return valve 34 (i.e., when the return port 38 is misaligned with the return passageway 42) and opening the return valve 34 (i.e., when the return port 38 is aligned with the return passageway 42). The valve actuator 46 includes a generally cylindrical body 48 that accommodates a first set of pawls 52 and a second set of pawls 56. In the illustrated embodiment, the first set of pawls 52 includes four pawls 52 offset from one another by about 90 degrees (FIGS. 4A-4B), and the second set of pawls 56 includes two pawls 56 offset from one another by about 180 degrees (FIGS. 6A-6B). In other embodiments, the sets of pawls 52, 56 may include any other number of pawls.

The pawls 52, 56 are pivotally coupled to the body 48 and extend and retract from the body 48 in response to rotation of the input shaft 50. The pawls 52 extend when the input shaft 50 is driven in a clockwise direction from the frame of reference of FIGS. 4A and 4B, and the pawls 52 retract when the input shaft 50 is driven in a counter-clockwise direction. Conversely, the pawls 56 extend when the input shaft 50 is driven in the counter-clockwise direction from the frame of reference of FIGS. 6A and 6B, and retract when the input shaft 50 is driven in the clockwise direction. The pawls 52, 56 are selectively engageable with corresponding first and second radial projections 60, 64 on the return valve 34 to open and close the valve 34.

Prior to initiating a crimping operation, the return valve 34 is in an open position shown in FIG. 3, in which the return port 38 is aligned with the return passageway 42 to fluidly communicate the piston cylinder 26 and the reservoir. In the open position, the pressure in the piston cylinder 26 is at approximately zero pounds per square inch (psi), the speed of the motor 12 is at zero revolutions per minute (rpm), and the current supplied to the motor is zero amperes (A or amps).

Figure 7A:
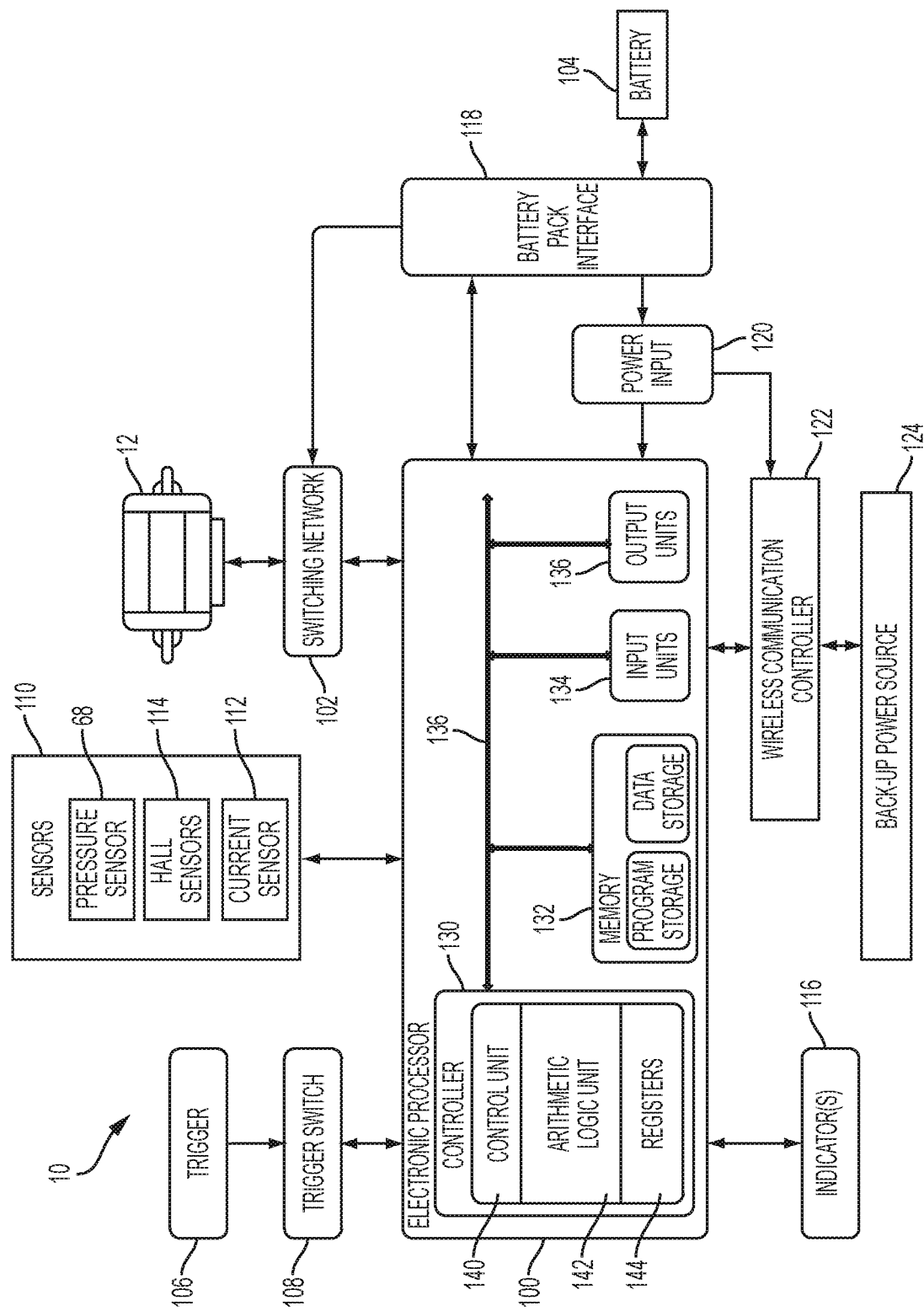
FIGS. 7A-B are block circuit diagrams of the power tool of FIG. 1.

The pressure in the piston cylinder 26 is sensed by a pressure sensor 68 (FIG. 1) and the signals from the pressure sensor 68 are sent to the electronic control and monitoring circuitry (see, e.g. electronic processor 100 of FIG. 7A). The pressure sensor 68 can be referred to as a pressure transducer, a pressure transmitter, a pressure sender, a pressure indicator, a piezometer and a manometer. The pressure sensor 68 can be an analog or digital pressure sensor. The pressure sensor 68 can be a force collector type of pressure sensor, such as piezoresistive strain gauge, capacitive, electromagnetic, piezoelectric, optical, and potentiometric. The pressure sensor can be manufactured out of piezoelectric materials, such as quartz. Alternatively, the pressure sensor 68 can be a resonant, thermal, or ionization type of pressure sensor.

The speed of the motor 12 is sensed by a speed sensor (see, e.g. Hall sensors 114 of FIG. 7A) that detects the position and movement of a rotor relative to stator and generates signals indicative of motor position, speed, and/or acceleration to the electronic control and monitoring circuitry. In an example, the speed sensor includes a Hall effect sensor to detect the position and movement of the rotor magnets.

The electric current flow through the motor 12 is sensed by an ammeter (see, e.g., current sensor 112 of FIG. 7A) and the signals from the ammeter are sent to the electronic control and monitoring circuitry. Alternatively, the current flow through the motor 12 can be derived from voltage, using a voltmeter (not shown), taken across the resistance of the windings in the motor. Other methods can also be used to calculate the electric current flow through the motor 12 with other types of sensors. The hydraulic power tool can include other sensors to control and monitor other characteristics of the other movable components of the hydraulic power tool, such as the motor 12, pump 14, or piston 30.

At this time when the return valve 34 is in an open position, the piston 30 is biased toward the retracted position, shown in FIG. 1, by a compression spring 70. When a crimping operation is initiated (e.g., by pressing a motor activation trigger of the crimper 10), the input shaft 50 is driven by the motor in a counter-clockwise direction from the frame of reference of FIGS. 6A and 6B, thereby rotating the valve actuator 46 counter-clockwise. The electric current flow through the motor 12 initially increases with in rush current and then drops to a steady state current flow. As the valve actuator 46 rotates counter-clockwise, rotational or centrifugal forces cause the second set of pawls 56 to extend from the body 48 and the first set of pawls 52 to retract into the body 48. As the input shaft 50 continues to rotate, one of the pawls 56 engages the second radial projection 64, rotating the return valve 34 clockwise from the open position shown in FIG. 6A to a closed position shown in FIGS. 5 and 6B in which the return port 38 is misaligned with the return passageway 42.

The valve actuator 46 will continue to co-rotate with the input shaft 50 after the return valve 34 reaches the closed position; however, a sufficient gap is created between the pawls 56 and the projection 64 such that they will not come into contact during subsequent rotations of the input shaft 50. The pump 14 draws hydraulic fluid from the reservoir and discharges it under pressure to the piston cylinder 26, causing the piston 30 to extend against the bias of the spring 70. The extension or contraction motion of the piston 30 in a cycle of reciprocation is a stroke. The time the piston takes to extend or contract is the stroke time. The closed return valve 34 prevents the pressurized fluid in the piston cylinder 26 and the return passageway 42 from returning to the reservoir. In the illustrated embodiment of the crimper 10, the piston 30 acts on the jaws 32 as it extends, thereby pivoting the jaws 32 to a closed position. The pressure in the piston cylinder 26, the speed of the motor 12, and the electric current flow through the motor varies based on different positions of the jaws, the position of the jaws in relation to the workpiece, the die used by the crimper head 72, and/or the material of the workpiece. The workpiece provides a resistance against the jaws that increases the force against the jaws. For example, as a crimp is made on the workpiece, the pressure in the piston cylinder 26 increases. Alternatively, in different hydraulic tools in which the auto return valve assembly 18 and valve actuator 46 are incorporated, the piston 30 may act on different portions of the tool for performing work on a workpiece. FIGS. 1-6B provide one example of a rotary auto return valve assembly in a hydraulic power tool. Other rotary auto return valve assemblies may also be used to provide similar functionality.

When a pressure in excess of a predetermined pressure threshold is detected in the piston cylinder 26 (e.g., by a pressure sensor 68; FIG. 1), the counter-clockwise rotation of the input shaft 50 is stopped, and the input shaft 50 is then rotated in a clockwise direction (from the frame of reference of FIGS. 4A and 4B) for at least one full revolution of the input shaft 50 during which time the rotational or centrifugal forces cause the first set of pawls 52 to extend from the body 48 and the second set of pawls 56 to retract into the body 48. One of the pawls 52 engages the first radial projection 60, rotating the return valve 34 counter-clockwise from the closed position shown in FIG. 4A to the open position shown in FIGS. 3 and 4B. When the return valve 34 is opened, the return port 38 is aligned with the return passageway 42, permitting pressurized fluid in the piston cylinder 26 to be returned to the reservoir via the return passageway 42 and the return port 38, and permitting the piston 30 to retract into the cylinder 26 by action of the rebounding spring 70. So after the crimp is made on the workpiece the pressure in the piston cylinder 26 again drops down to zero psi, the motor stops turning (i.e., returns to zero rpms), and the current stops flowing (i.e., returns to zero amps). The return valve 34 remains in the open position after the piston 30 reaches the fully retracted position shown in FIG. 1, ready for the next crimping operation.

The extension and retraction of the piston 30 in the cylinder 26 is referred to as a pressure cycle (or a cycle). Completion of a full pressure cycle occurs when the pressure detected by the pressure sensor 68 exceeds the predetermined pressure threshold. Detection of a full pressure cycle can provide one indication that a satisfactory crimp was performed. Full pressure results in a full output force that causes the piston to push forward (or extend), which in turn causes the jaws 32 to close around a workpiece. If a proper jaw is installed in the hydraulic power tool and proper dies have been used on the proper connector, the dies within jaws 32 close the appropriate distance around the workpiece and a normal crimp is made.

Each type of die (e.g., size and shape) for a particular hydraulic power tool along with the type of workpiece material (e.g., malleable metal) can have different piston cylinder pressure, motor speed, motor current, and other characteristics over the time the crimp is being performed (i.e., the crimper head 72 is closing and opening). These characteristics (e.g., piston cylinder pressure, motor speed, or motor current) are used to monitor and analyze the activity of the hydraulic power tool. For instance, monitored characteristics are compared with the expected characteristics of good crimps for a particular die and material to determine if the crimp is acceptable and if hydraulic power tool is operating properly, which is explained below in greater detail.

Figure 10:
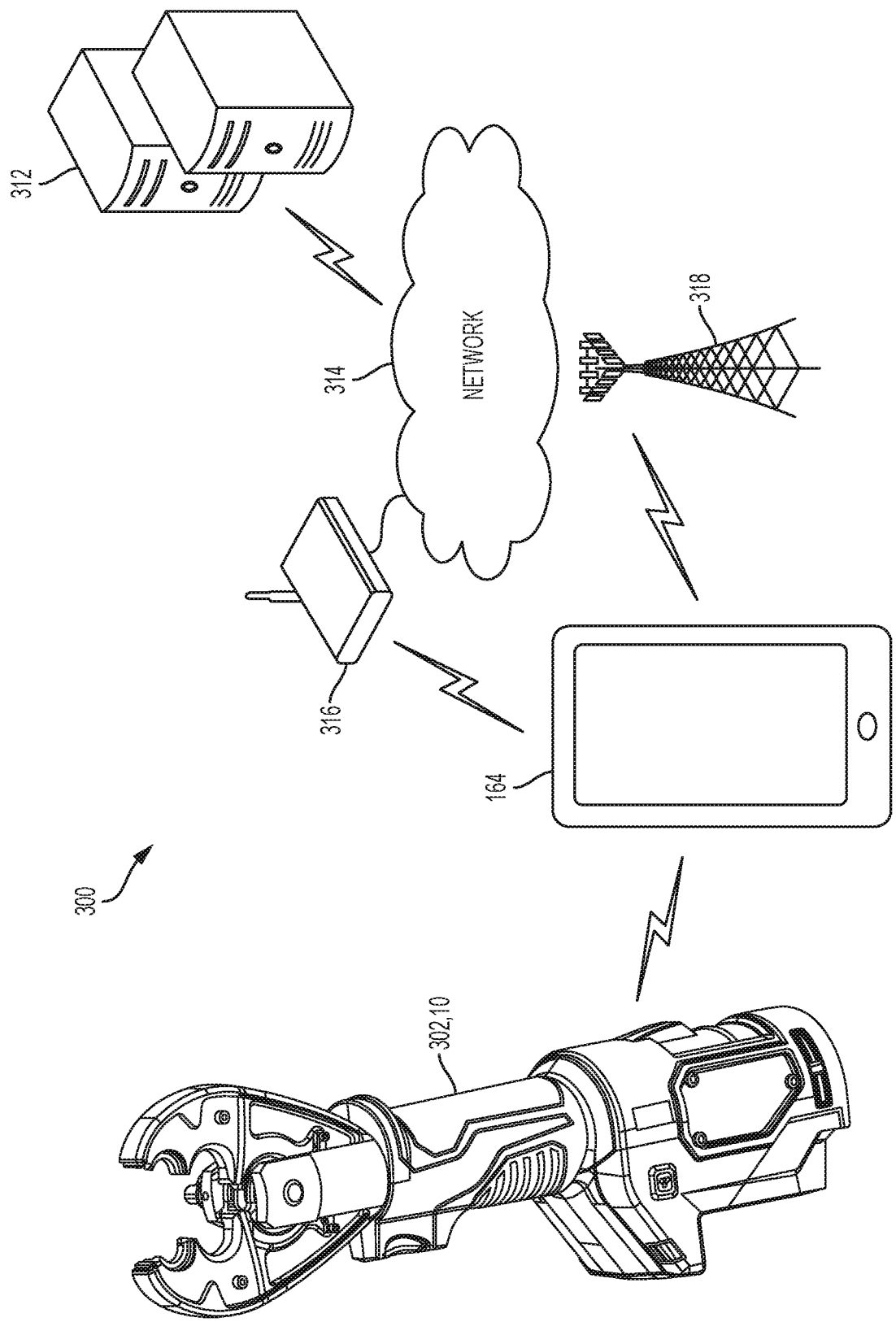
FIG. 10 illustrates a communication system with a power tool (e.g., hydraulic crimper tool) and an external device (e.g., smart phone).

FIG. 7A illustrates a block circuit diagram of the crimper 10. As shown in FIG. 10, the crimper 10 includes an electronic processor 100 that controls a switching network 102 including, e.g., field effect transistors (FETs), to drive the motor 12. A primary power source (e.g., a battery pack) 104 couples to the crimper 10 and provides electrical power to energize the motor 12. The electronic processor 100 drives the motor 12 to perform a crimp in response to a user's actuation of the activation trigger 106. Depression of the activation trigger 106 actuates a trigger switch 108 (e.g., a pushbutton), which outputs a signal to the electronic processor 100 to actuate the crimp. When the activation trigger 106 is released, the trigger switch 108 no longer outputs the actuation signal (or outputs a released signal) to the electronic processor 100. The electronic processor 100 may cease a crimp action when the trigger 106 is released and the pressurized fluid may be returned to the reservoir. The electronic processor 100 is further coupled to sensors 110, including a pressure sensor 68, a current sensor 112, and Hall sensors 114, for receiving pressure, current, and motor position and speed information, respectively, as noted above. Sensors 110 may include further sensing components, such as temperature sensors and voltage sensors, providing further sensed data to the electronic processor 100.

As also shown in FIG. 7A, the crimper 10 further includes indicators 116, a battery pack interface 118, a power input unit 120, a wireless communication controller 122, and a back-up power source 124. The battery pack interface 118 is coupled to the electronic processor 100 and couples to the battery pack 104. The battery pack interface 118 includes a combination of mechanical (e.g., a battery pack receiving portion) and electrical components configured to and operable for interfacing (e.g., mechanically, electrically, and communicatively connecting) the crimper 10 with the battery pack 104. The battery pack interface 118 is coupled to the power input unit 120. The battery pack interface 118 transmits the power received from the battery pack 104 to the power input unit 120. The power input unit 120 includes active and/or passive components (e.g., voltage step-down controllers, voltage converters, rectifiers, filters, etc.) to regulate or control the power received through the battery pack interface 118 and to the wireless communication controller 122 and electronic processor 100.

The indicators 116 are also coupled to the electronic processor 100 and receive control signals from the electronic processor 100 to turn on and off or otherwise convey information based on different states of the crimper 10. The indicators 116 include, for example, one or more light-emitting diodes (LEDs), or a display screen. The indicators 116 can be configured to display conditions of, or information associated with, the crimper 10. In addition or in place of visual indicators, the indicators 116 may also include speaker or vibratory elements to convey information to a user through audible or tactile outputs.

As described above, the electronic processor 100 is electrically and/or communicatively connected to a variety of modules or components of the crimper 10. In some embodiments, the electronic processor 100 includes a plurality of electrical and electronic components that provide power, operational control, and protection to the components and modules within the electronic processor 100 and/or crimper 10. For example, the electronic processor 100 includes, among other things, a controller 130 (e.g., a microprocessor, a microcontroller, or another suitable programmable device), a memory 132, input units 134, and output units 136. The controller 130 (herein, controller 130) includes, among other things, a control unit 140, an arithmetic logic unit ("ALU") 142, and a plurality of registers 144 (shown as a group of registers in FIG. 7A). In some embodiments, the electronic processor 100 is implemented partially or entirely on a semiconductor (e.g., a field-programmable gate array ["FPGA"] semiconductor) chip, such as a chip developed through a register transfer level ("RTL") design process.

The memory 132 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The controller 130 is connected to the memory 132 and executes software instructions that are capable of being stored in a RAM of the memory 132 (e.g., during execution), a ROM of the memory 132 (e.g., on a generally permanent basis), or another non-transitory computer readable medium such as another memory or a disc. Software included in the implementation of the crimper 10 can be stored in the memory 132 of the electronic processor 100. The software includes, for example, firmware, one or more applications, program data, filters, rules, one or more program modules, and other executable instructions. The electronic processor 100 is configured to retrieve from memory and execute, among other things, instructions related to the control processes and methods described herein. The electronic processor 100 is also configured to store crimper information on the memory 132 including operational data, information identifying the type of tool, a unique identifier for the particular tool, and other information relevant to operating or maintaining the crimper 10. The tool usage information may be captured or inferred from data output by the sensors 110.

Figure 7B:
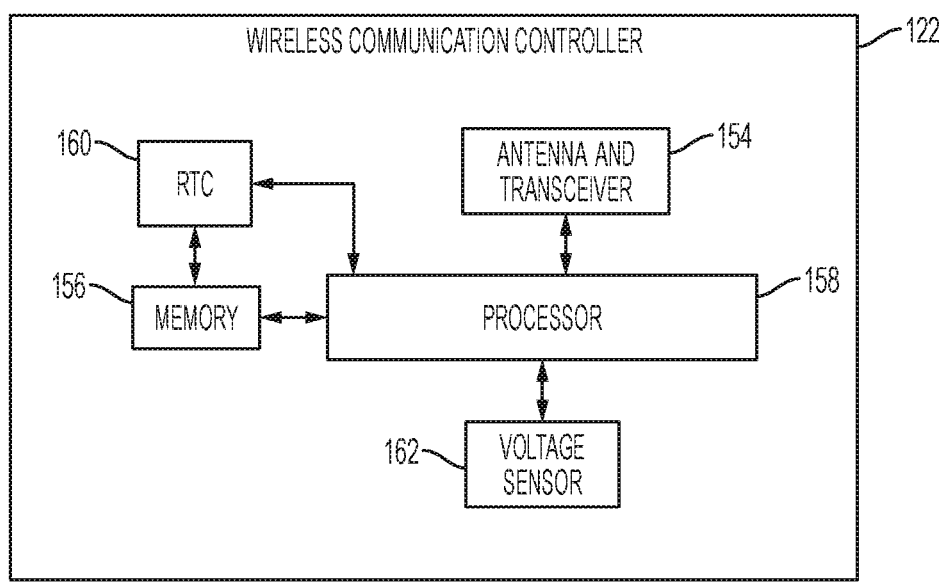

As shown in FIG. 7B, the wireless communication controller 122 includes a radio antenna and transceiver 154, a memory 156, a processor 158, a real-time clock 160, and a voltage sensor 162. The wireless communication controller 122 enables the crimper 10 to communicate with an external device 164 (see, e.g., FIG. 10). The radio antenna and transceiver 154 operate together to send and receive wireless messages to and from the external device 164 and the processor 158. The memory 156 can store instructions to be implemented by the processor 158 and/or may store data related to communications between the crimper 10 and the external device 164 or the like. The processor 158 for the wireless communication controller 122 controls wireless communications between the crimper 10 and the external device 164. For example, the processor 158 associated with the wireless communication controller 122 buffers incoming and/or outgoing data, communicates with the electronic processor 100, and determines the communication protocol and/or settings to use in wireless communications.

In the illustrated embodiment, the wireless communication controller 122 is a Bluetooth® controller. The Bluetooth® controller communicates with the external device 164 employing the Bluetooth® protocol. Therefore, in the illustrated embodiment, the external device 164 and the crimper 10 are within a communication range (i.e., in proximity) of each other while they exchange data. In other embodiments, the wireless communication controller 122 communicates using other protocols (e.g., Wi-Fi, cellular protocols, a proprietary protocol, etc.) over different type of wireless networks. For example, the wireless communication controller 122 may be configured to communicate via Wi-Fi through a wide area network such as the Internet or a local area network, or to communicate through a piconet (e.g., using infrared or NFC communications). The communication via the communication controller 122 may be encrypted to protect the data exchanged between the crimper 10 and the external device/network 164 from third parties.

The wireless communication controller 122 is configured to receive data from the electronic processor 100 and relay the information to the external device 164 via the antenna and transceiver 154. In a similar manner, the wireless communication controller 122 is configured to receive information (e.g., configuration and programming information) from the external device 164 via the antenna and transceiver 154 and relay the information to the electronic processor 100.

The RTC 160 increments and keeps time independently of the other power tool components. The RTC 160 receives power from the battery pack 104 when the battery pack 104 is connected to the crimper 10 and receives power from the back-up power source 124 when the battery pack 104 is not connected to the crimper 10. Having the RTC 160 as an independently powered clock enables time stamping of operational data (stored in memory 132 for later export) and a security feature whereby a lockout time is set by a user (e.g., via the external device 164) and the tool is locked-out when the time of the RTC 160 exceeds the set lockout time.

The processor 158 for the wireless communication controller 122 switches between operating in a connected (e.g., full power) state and operating in an advertisement state. In the illustrated embodiment, the wireless communication controller 122 switches between operating in the connected state and the advertisement state based on whether the battery pack 104 is connected to the crimper 10 and whether the battery pack 104 holds sufficient power to operate the wireless communication controller 122 in connected state. When the battery pack 104 is connected to the crimper 10 and holds sufficient charge, the wireless communication controller 122 is powered by the battery pack 104 and operates in the connected state. When the battery pack 104 is not connected to the crimper 10, the wireless communication controller 122 receives power from the back-up power source 124 and the crimper 10 operates in the advertisement state.

When the wireless communication controller 122 operates in the advertisement state, the crimper 10 identifies itself to the external device 164, but data exchange between the crimper 10 and the external device 164 is limited to select information. In other words, in the advertisement state, the wireless communication controller 122 outputs an advertisement message to the external device 164. The advertisement message includes identification information regarding the tool identity, remaining capacity of the back-up power source 124, and other limited amount of crimper information. The advertisement message also identifies the product as being from a particular manufacturer or brand via a unique binary identification UBID identifying the type of power tool and uniquely identifying the particular power tool. Thus, even when operating in the advertisement state, the external device 164 can identify the crimper 10 and determine that the crimper 10 is within a communication range of the external device 164 (e.g., locate the crimper), but further data between the external device 164 and the crimper 10 is not exchanged.

When the wireless communication controller 122 operates in the connected state, full wireless communication between the crimper 10 and the external device 164 is enabled. In the connected state, the wireless communication controller 122 obtains and exports crimper usage data to the external device 164 and receives configuration data from the external device 164.

Figure 8A:
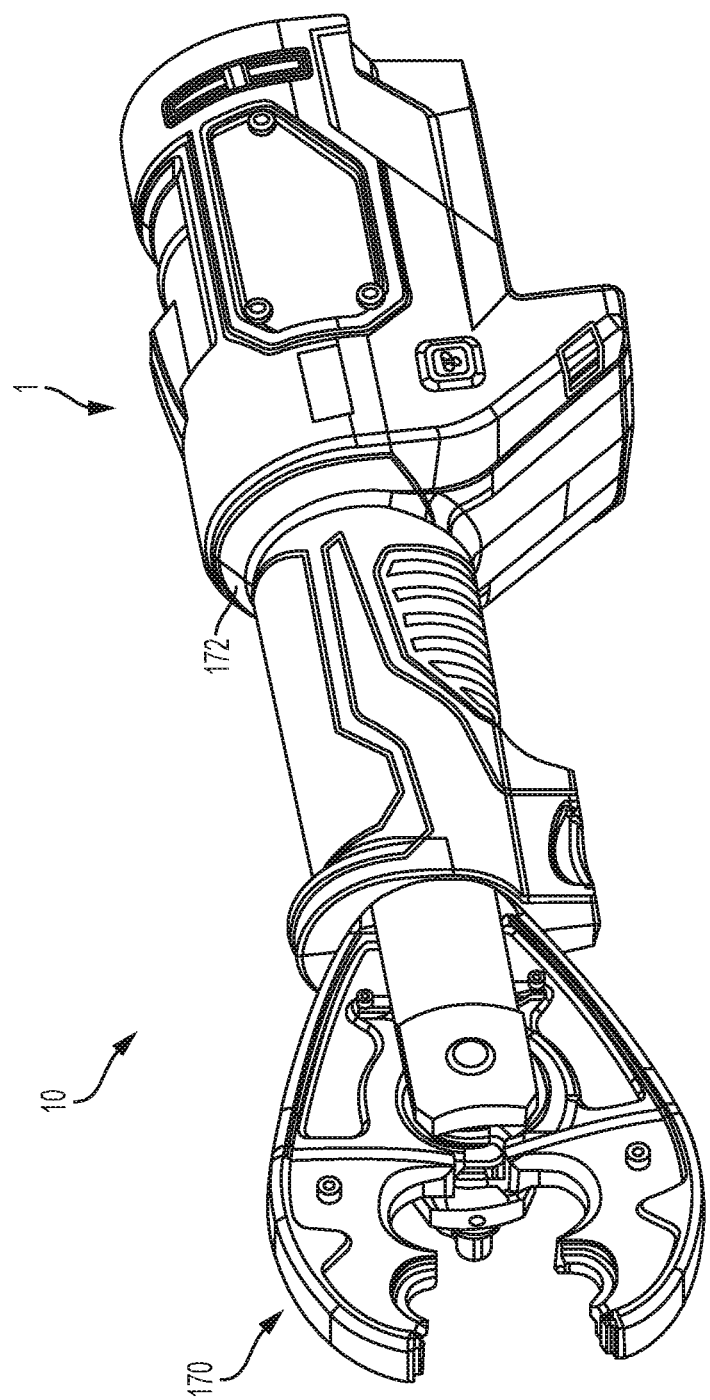
FIGS. 8A-F provide additional views of the power tool of FIG. 1.
Figure 8B:
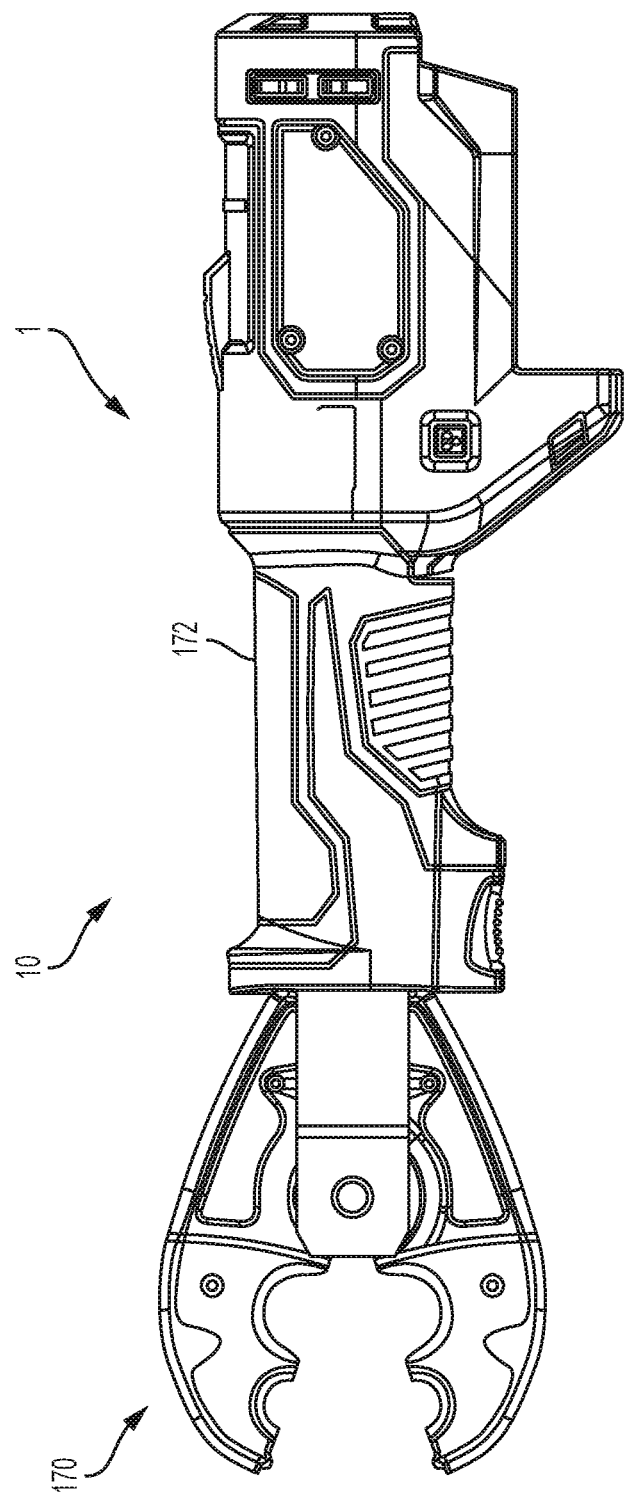
Figure 8C:
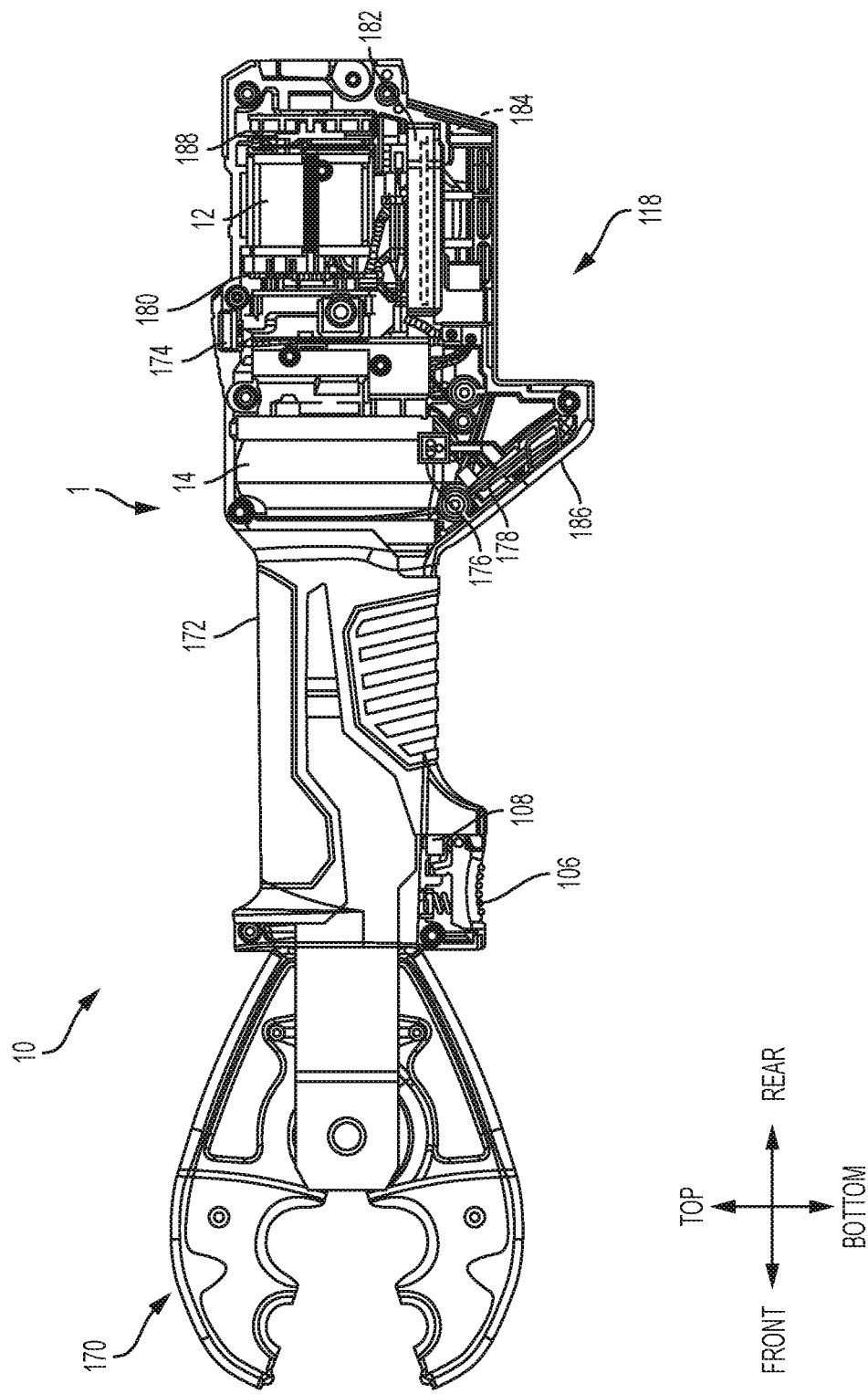

FIGS. 8A-8F illustrate additional views of the crimper 10 having a crimper head 170. FIG. 8A is a perspective view of the crimper 10 having a housing 172. FIG. 8B is a side view of the crimper 10. FIG. 8C illustrates the crimper 10 with a portion of the housing 172 removed to expose circuitry and other components of the crimper 10. More particularly, FIG. 8C illustrates the motor 12, the trigger 106 and trigger switch 108, the indicators 116 including cycle feedback indicators 174 and wireless indicator 176, the battery pack interface 118, a communication control board 178 having the wireless communication controller 122 and back-up power source 124, a motor board 180 having the Hall sensors 114, and a potting boat 182 having therein a control board 184. The control board 184 includes the electronic processor 100, switching network 102, and power input unit 120.

In the illustrated embodiment, from the frame of reference of FIG. 8C, the communication control board 178 is located below and frontward of the motor 12, below the pump 14 and between the battery pack interface 118 and the trigger 106 (and also the cylinder 26, looking to FIG. 1). Further, the communication control board 178 is positioned on an incline such that the mounting surfaces thereof are at an oblique angle with respect to the mounting surfaces of the control board 184, which face the motor 12 and battery pack interface 118, respectively. The mounting surfaces of the communication control board 178 are also at an oblique angle with respect to the mounting surfaces of the motor board 180, which are generally perpendicular (within about 15 degrees of being perpendicular) to the mounting surfaces of the control board 184. The inclined communication control board 178 is located in a projection 186 of the housing 172 below the pump 14 and frontward of the battery pack interface 118. The projection 186 includes a rear portion against which an inserted battery pack 104 abuts and a front portion having an incline generally parallel (within about 15 degrees of parallel) to the communication control board 178. The location of the communication control board 178 is spaced from the motor 12 and current-carrying power lines to the motor 12 to avoid electromagnetic interference that can be disruptive of wireless communication between the wireless communication controller 122 and the external device 164. However, the communication control board 178 is spaced near the control board 184 (e.g., as opposed to being located near the trigger switch 108 or a top-side of the crimper) to reduce wiring quantity and complexity.

In other embodiments, the components of the communication control board 178 are located on the control board 184, and the communication control board 178 is not included as a separate board in the crimper 10. In further embodiments, the communication control board 178 is located in other positions within the crimper 10, such as near the trigger switch 108, above the motor 12, or behind the motor 12 on a side having the cooling fan 188. In such further embodiments, a further projection of the housing 172 may be provided to accommodate the communication control board 178.

Figure 8D:
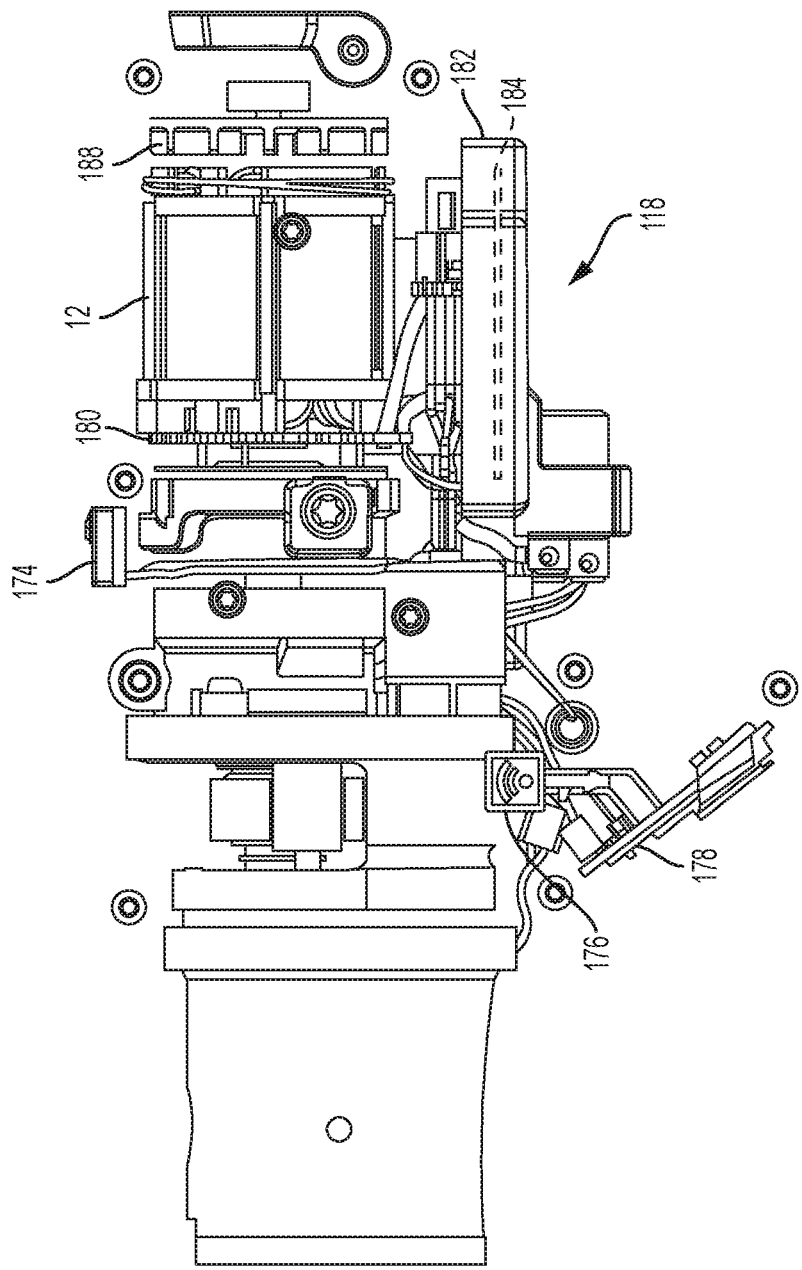
Figure 8E:
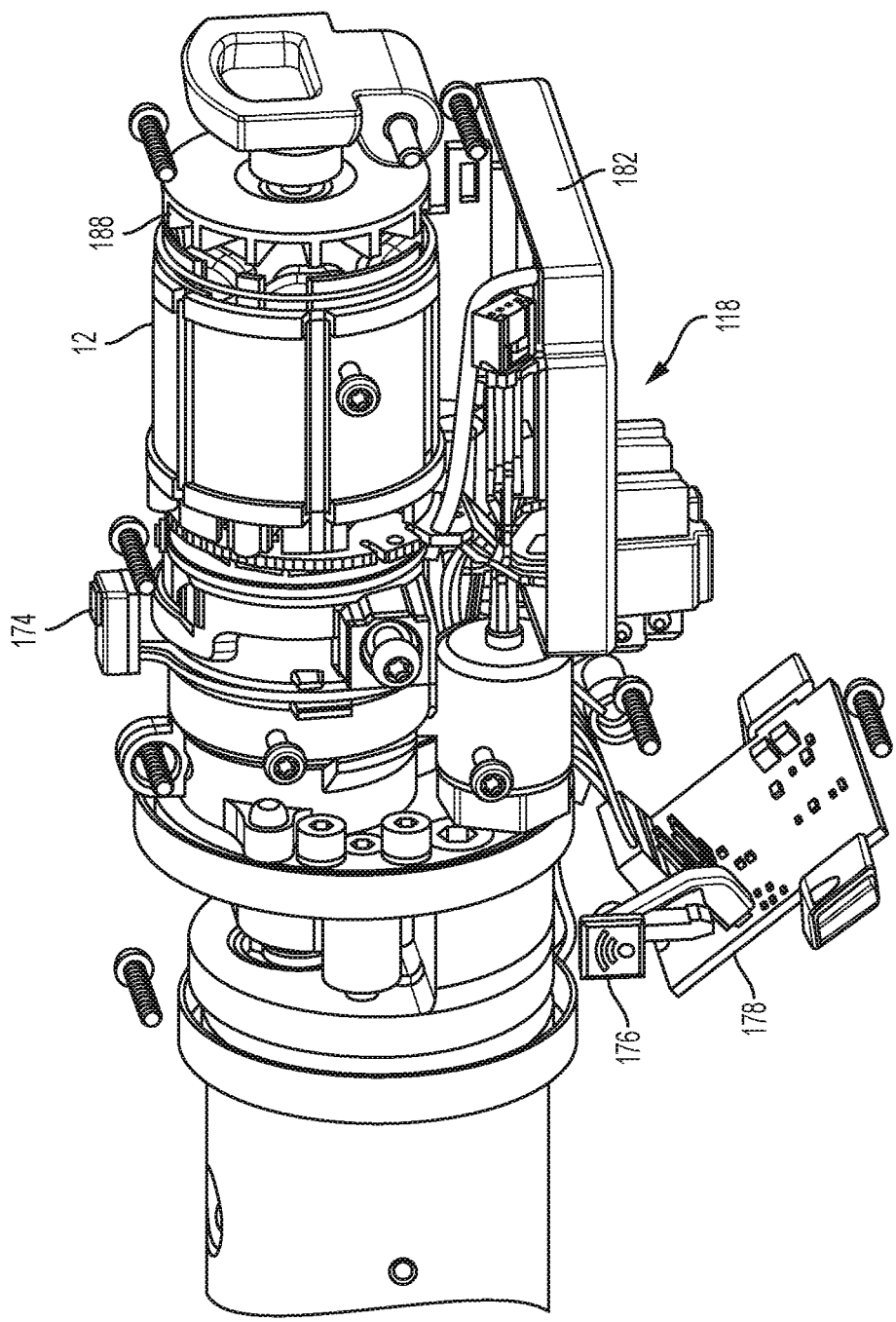
Figure 8F:
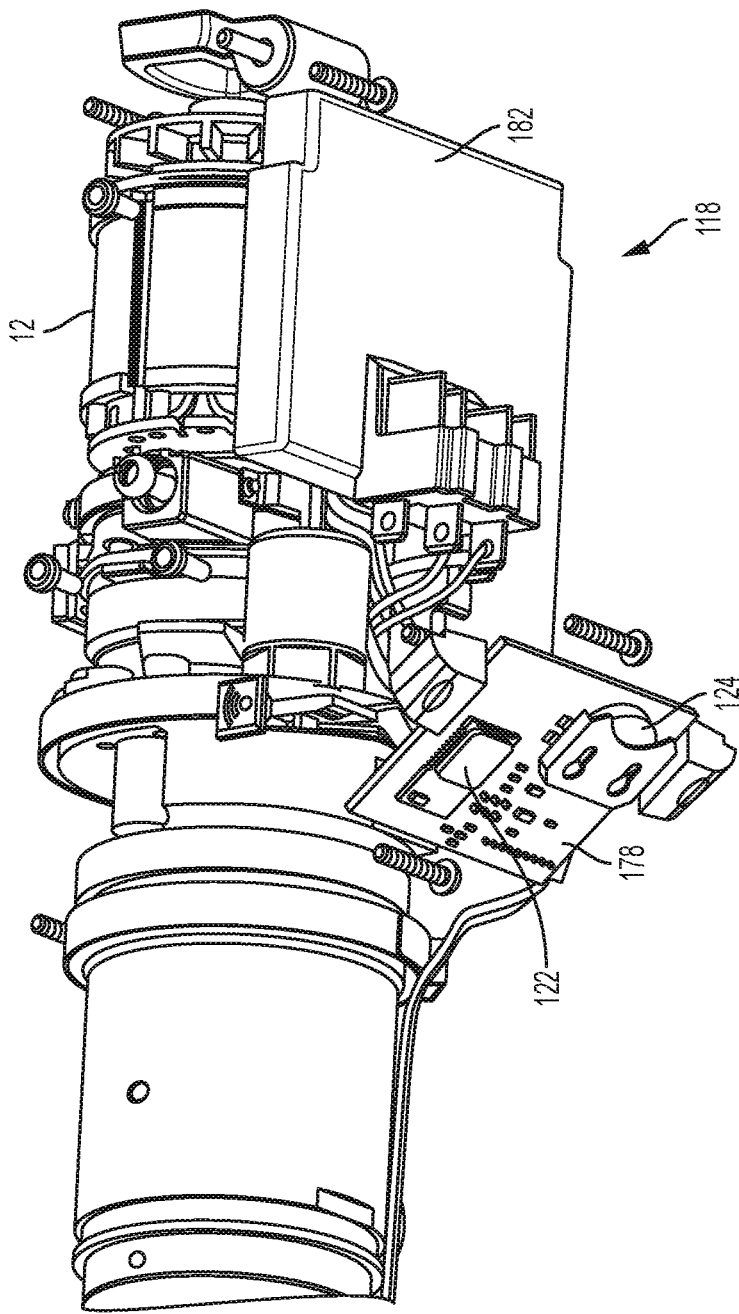

FIG. 8D illustrates a side view of a rear portion of the body 1 having the housing 172 removed. FIG. 8E illustrates a rear perspective view of the rear portion of the body 1. FIG. 8F illustrates a bottom perspective view of the rear portion of the body 1. In FIG. 8F, the wireless communication controller 122 and back-up power source 124 are visible on the communication control board 178. Communication interference can be further reduced by positioning the wireless communication controller 122, including the antenna and transceiver 154, on the outward facing mounting surface of the communication control board 178. The back-up power source 124, as illustrated, is a primary coin cell battery. As the communication by the wireless communication controller 122 is limited when the battery pack 104 is not present, the primary coin cell battery has sufficient power to meet the communication demands of the crimper 10 for several years before replacement is needed. In other embodiments, the back-up power source 124 includes a secondary (rechargeable) battery cell or a capacitor. In such embodiments, the battery pack 104 provides charging power to recharge the secondary battery cell or the capacitor. The rechargeable cell and capacitor may be sized to provide power for several days or weeks before needing to recharge.

Figure 9A:
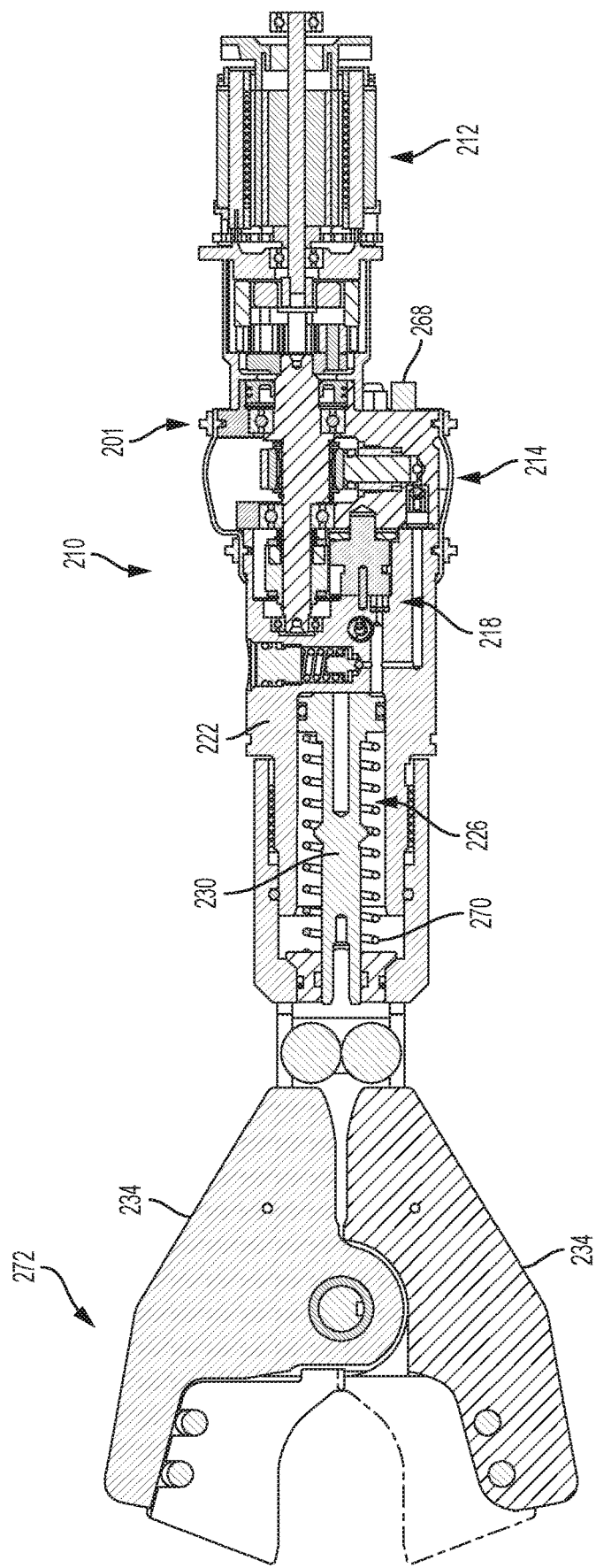
FIG. 9A is a cross-sectional view of a hydraulic power tool in accordance with yet another embodiment of the invention, illustrating a cutter head coupled to a body of the tool.
Figure 9B:
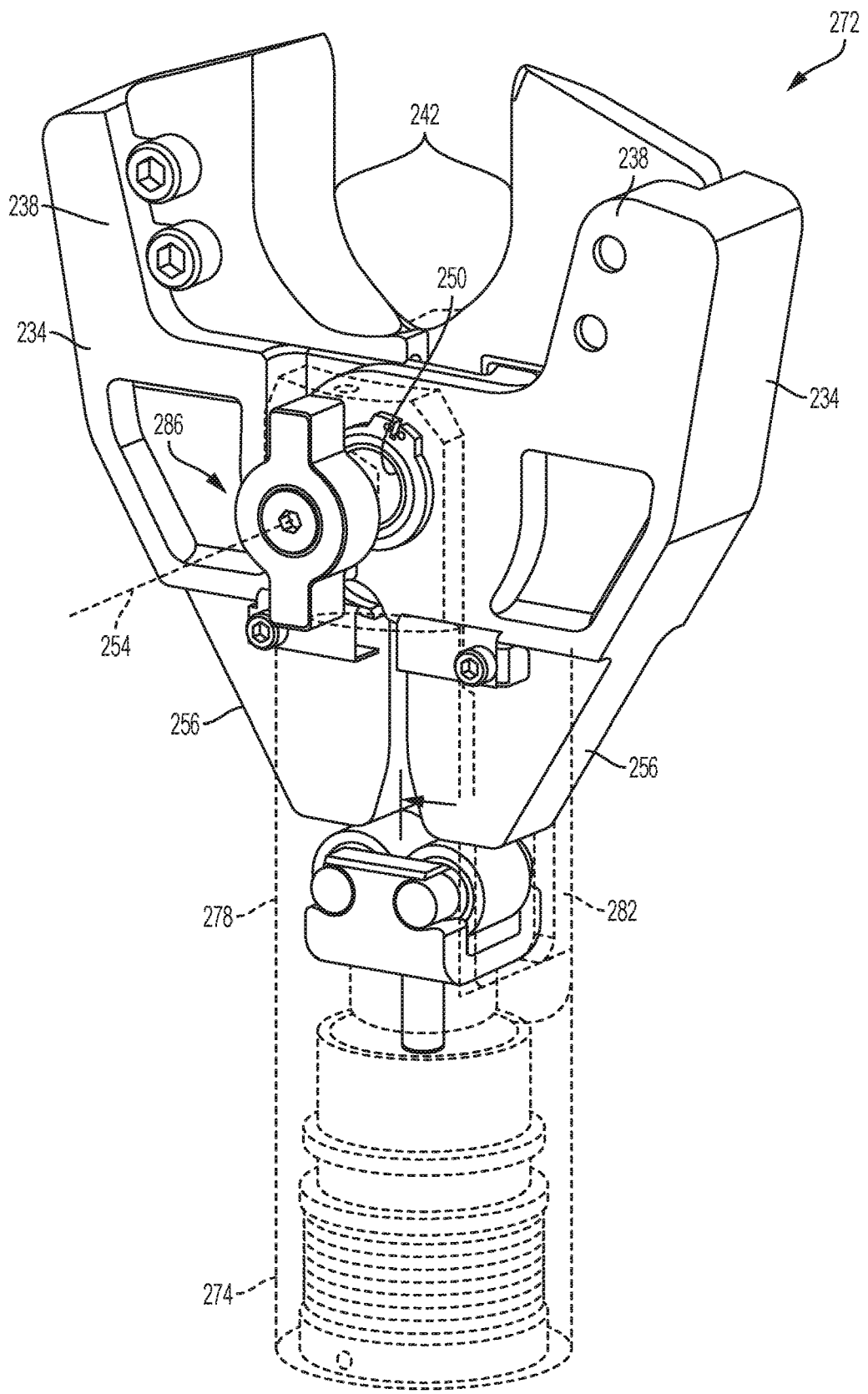
FIG. 9B is a perspective view of the cutter head of the hydraulic power tool of FIG. 1, illustrating a quick-release assembly of the cutter head.

FIGS. 9A-B illustrate a hydraulic power tool in accordance with another embodiment of the invention, configured as a hydraulic cutter 210. The cutter 210 includes a body 201 that is substantially similar or identical to the body 1 described above in connection with the crimper 10 and illustrated in FIG. 1, and a cutter head 272 that is removably coupled to the body 201. Accordingly, like features with the body 1 of the crimper 10 are shown with like reference numerals plus "200." The structure and manner of attaching the cutter head 272 to the body 201 is identical to that for attaching the crimper head 72 to the body 1; therefore, the heads 72, 272 are interchangeable on the identical bodies 1, 201 shown in FIGS. 1 and 9A, respectively. Specifically, the clevis 74, 274 is threadably engageable with the cylinder housing 22, 222. In the embodiments shown, the clevis 74, 274 has an internally threaded portion to accept an outer threaded portion of the cylinder housing 22, 222. To attach and remove the heads 72, 272 from the body 1, 201, a user rotates the heads 72, 272 relative to the body 1, 201 to engage or disengage the threaded portions of the clevis 74, 274 and the cylinder housing 22, 222. Alternatively, the clevis 74, 274 may be detachably coupled to the cylinder housing 22, 222 in any of a number of different ways (e.g., by a detent system, etc.). The head 170 of FIG. 8A attaches to the body 1 in a similar manner as heads 72 and 272 attaching to bodies 1 and 201, respectively.

With reference to FIG. 9A, the cutter 210 includes an electric motor 212, a pump 214 driven by the motor 212, the cylinder housing 222 defining a cylinder 226 therein, and an extensible piston 230 disposed within the cylinder 226. The pump 214 provides pressurized hydraulic fluid to the piston cylinder 226, causing the piston 230 to extend from the cylinder housing 222 and thereby actuate a pair of jaws 234 for cutting a workpiece. The cutter 210 also includes electronic control and monitoring circuitry similar to that of the crimper 10 (see, e.g., FIGS. 7A-B), such as processors and sensors, for controlling and/or monitoring various functions of the hydraulic power tool.

With reference to FIG. 9B, the cutter 210 includes jaws 234, each having a blade mount 238 supporting a blade 242, a pivot arm 246 extending from the blade mount 238, and a bearing eye 250. When the jaws 234 are assembled together, the bearing eyes 250 are coaxial and define a common pivot axis 254 of the jaws 234. The cutter 210 further includes head 272, which includes the jaws 234 and a clevis 274 having first and second, longitudinally-extending legs 278, 282 between which the head 272 is supported. A quick-release mechanism 286 removably couples the head 272 to the clevis 274. The quick-release mechanism 286 permits the head 272 to be removed from and inserted into the clevis 274 without requiring the use of external tools (e.g., wrenches, pliers, etc.).

As discussed in greater detail below, the hydraulic power tool (e.g., crimper 10 and cutter 210) also includes communication interface and/or circuitry (e.g., wireless communication controller 122) that communicates with external devices (e.g., external device 164) and interfaces with the electronic control and monitoring circuitry (e.g., electronic processor 100). The electronic control and monitoring circuitry can monitor and log various parameters (e.g., piston cylinder pressure, motor speed, or motor current) of the hydraulic power tool sensed by sensor to verify and confirm that the tool is operating correctly before performing a crimp or a cut. The various parameters also provide early notification if tool performance is degrading. The various parameters of the hydraulic power tool can be provided to external devices via the communication interface.

FIG. 10 illustrates a communication system 300. The communication system 300 includes at least one power tool device 302 (illustrated as the crimper 10) and an external device 164. Each power tool device 302 (e.g., crimper 10, cutter 210, battery powered impact driver, power tool battery pack, and mains-powered hammer drill) and the external device 164 can communicate wirelessly while they are within a communication range of each other. Each power tool device 302 may communicate power tool status, power tool operation statistics, power tool identification, power tool sensor data, stored power tool usage information, power tool maintenance data, and the like.

More specifically, the power tool 302 can monitor, log, and/or communicate various tool parameters that can be used for confirmation of correct tool performance, detection of a malfunctioning tool, and determination of a need or desire for service. Taking, for example, the crimper 10 or cutter 210 as the power tool 302, the various tool parameters detected, determined, and/or captured by the electronic processor 100 and output to the external device 164 can include a no load stroke time (i.e., stroke time of the tool 302 when the tool does not act on a workpiece), loaded stroke time (i.e., stroke time of the tool 302 when the tool does act on a workpiece, a time (e.g., a number of seconds) that the power tool 202 is on, a number of overloads (i.e., a number of times the tool 202 exceeded the pressure rating for the die, the jaws 32, and/or the tool 202), a total number of cycles performed by the tool, a number of cycles performed by the tool since a reset and/or since a last data export, a number of full pressure cycles (e.g., number of acceptable crimps performed by the tool 202), a number of remaining service cycles (i.e., a number of cycles before the tool 202 should be serviced, recalibrated, repaired, or replaced), a number of transmissions sent to the external device 208, a number of transmissions received from the external device 208, a number of errors generated in the transmissions sent to the external device 208, a number of errors generated in the transmissions received from the external device 208, a code violation resulting in a master control unit (MCU) reset, a short in the power circuitry (e.g., a metal-oxide-semiconductor field-effect transistor (MOSFET) short), a hot thermal overload condition (i.e., a prolonged electric current exceeding a full-loaded threshold that can lead to excessive heating and deterioration of the winding insulation until an electrical fault occurs), a cold thermal overload (i.e., a cyclic or in-rush electric current exceeding a zero load threshold that can also lead to excessive heating and deterioration of the winding insulation until an electrical fault occurs), a motor stall condition (i.e., a locked or non-moving rotor with an electrical current flowing through the windings), a bad Hall sensor, a non-maskable interrupt (NMI) hardware MCU Reset (e.g., of the electronic processor 100), an over-discharge condition of the battery pack 104, an overcurrent condition of the battery pack 104, a battery dead condition at trigger pull, a tool FETing condition, gate drive refresh enabled indication, thermal and stall overload condition, a malfunctioning pressure sensor condition for the pressure sensor 68, trigger pulled at tool sleep condition, Hall sensor error occurrence condition for one of the Hall sensors 114, heat sink temperature histogram data, MOSFET junction temperature histogram data, peak current histogram data (from current sensor 112), average current histogram data (from current sensor 112), and the number of Hall errors indication.

Using the external device 164, a user can access the tool parameters obtained by the power tool 302. With the tool parameters (i.e., tool operational data), a user can determine how the power tool device 302 has been used (e.g., crimps performed), whether maintenance is recommended or has been performed in the past, and identify malfunctioning components or other reasons for certain performance issues. The external device 164 can also transmit data to the power tool device 302 for power tool configuration, firmware updates, or to send commands. The external device 164 also allows a user to set operational parameters, safety parameters, select dies used, select tool modes, and the like for the power tool 302.

The external device 164 may be, for example, a smart phone (as illustrated), a laptop computer, a tablet computer, a personal digital assistant (PDA), or another electronic device capable of communicating wirelessly with the power tool device 302 and providing a user interface. The external device 164 provides the user interface and allows a user to access and interact with the power tool device 302. The external device 164 can receive user inputs to determine operational parameters, enable or disable features, and the like. The user interface of the external device 164 provides an easy-to-use interface for the user to control and customize operation of the power tool device 302. The external device 164, therefore, grants the user access to the tool operational data of the power tool device 302, and provides a user interface such that the user can interact with the controller of the power tool device 302.

In addition, as shown in FIG. 10, the external device 164 can also share the tool operational data obtained from the power tool device 302 with a remote server 312 connected by a network 314. The remote server 312 may be used to store the tool operational data obtained from the external device 164, provide additional functionality and services to the user, or a combination thereof. In one embodiment, storing the information on the remote server 312 allows a user to access the information from a plurality of different locations. In another embodiment, the remote server 312 may collect information from various users regarding their power tool devices and provide statistics or statistical measures to the user based on information obtained from the different power tools. For example, the remote server 312 may provide statistics regarding the experienced efficiency of the power tool device 302, typical usage of the power tool device 302, and other relevant characteristics and/or measures of the power tool device 302. The network 314 may include various networking elements (routers 316, hubs, switches, cellular towers 318, wired connections, wireless connections, etc.) for connecting to, for example, the Internet, a cellular data network, a local network, or a combination thereof. In some embodiments, the power tool device 302 may be configured to communicate directly with the server 312 through an additional wireless interface or with the same wireless interface that the power tool device 302 uses to communicate with the external device 164.

Figure 11:
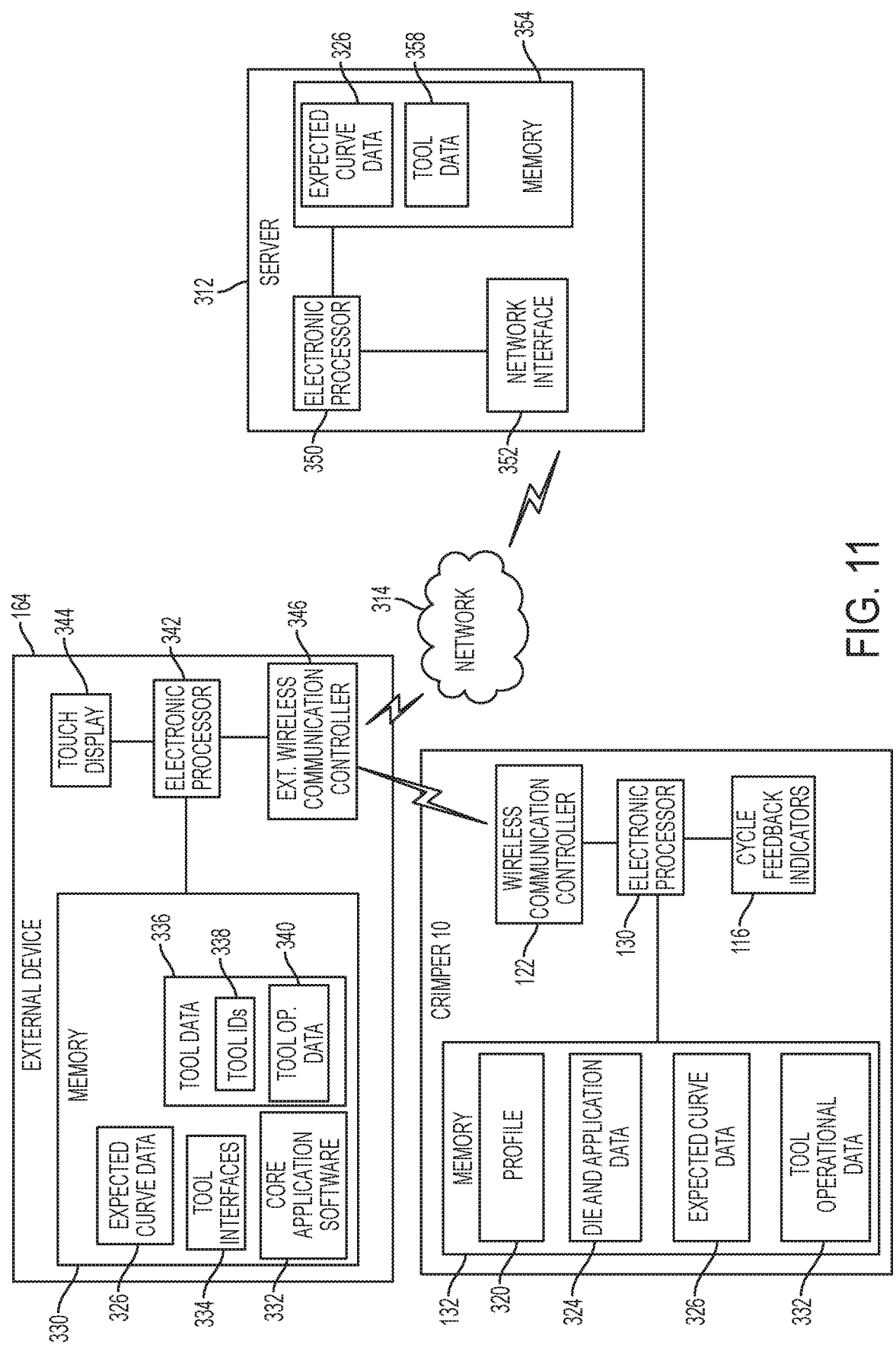
FIG. 11 illustrates a block diagram of the communication system including the power tool.

FIG. 11 illustrates a block diagram of the components of the communication system 300. The crimper 10 is illustrated as an exemplary power tool device 302 that is in communication with the external device 164. A similar arrangement, however, is applicable to the cutter 210 and other hydraulic power tools. The memory 232 of the crimper 10 includes a profile 320, which includes configuration data that defines the operation of the crimper 10 when activated by the user (e.g., upon depressing the trigger 106). The controller 130 controls the switching network 102 to drive the motor 12 (see FIG. 7A) in accordance with the profile 320. For instance, the profile 320 may specify the motor speed and direction at various stages of operation, the predetermined pressure threshold indicative that a full pressure cycle has been reached, among other operational characteristics.

Also stored in the memory 232 is tool operational data 322, which includes the tool operational data noted above such as information regarding the usage of the crimper 10 (e.g., obtained via the sensors 110), information regarding the maintenance of the crimper 10 (e.g., last service date), and power tool trigger event information (e.g., whether and when the trigger is depressed and the amount of depression).

The memory 232 further includes die and application data 324, which specifies one or more of the type of die attached to the body 1, the workpiece size, the workpiece shape, the workpiece material, and the application type (e.g., electrical or plumbing). The memory 232 also includes expected curve data 326, which is described in more detail below. The die and application data 324 may be communicated to and stored in the memory 232 by a user via the external device 164.

The external device 164 includes a memory 330 storing core application software 332, tool interfaces 334, tool data 336 including received tool identifiers 338 and received tool operational data 340, and the expected curve data 326. The external device further includes an electronic processor 342, a touch screen display 344, and an external wireless communication controller 346. The electronic processor 342 and memory 330 may be part of a controller having similar components as electronic processor 100. The touch screen display 344 allows the external device 164 to output visual data to a user and receive user inputs. Although not illustrated, the external device 164 may include further user input devices (e.g., buttons, dials, toggle switches, and a microphone for voice control) and further user outputs (e.g., speakers and tactile feedback elements). Additionally, in some instances, the external device 164 has a display without touch screen input capability and receives user input via other input devices, such as buttons, dials, and toggle switches. The external device 164 communicates wirelessly with the wireless communication controller 122 via the external wireless communication controller 346, e.g., using a Bluetooth® or Wi-Fi® protocol. The external wireless communication controller 346 further communicates with the network 314. In some instances, the external wireless communication controller 346 includes two separate wireless communication controllers, one for communicating with the wireless communication controller 122 (e.g., using Bluetooth® or Wi-Fi® communications) and one for communicating with the network 314 (e.g., using Wi-Fi or cellular communications).

The server 312 includes a processor 350 that communicates with the external device 164 over the network 314 using a network interface 352. The communication link between the network interface 352, the network 314, and the external wireless communication controller 346 may include various wired and wireless communication pathways, various network components, and various communication protocols. The server 312 further includes a memory 354 including the expected curve data 326 and tool data 358.

Returning to the external device 164, the core application software 332 is executed by the electronic processor 342 to generate a graphical user interface (GUI) on the touch screen display 344 enabling the user to interact with the crimper 10 and server 312. In some embodiments, a user may access a repository of software applications (e.g., an "app store" or "app marketplace") using the external device 164 to locate and download the core application software 332, which may be referred to as an "app." The tool interfaces 334 may be bundled for downloading with the core application software 332. In some embodiments, the app is obtained using other techniques, such as downloading from a website using a web browser on the external device 164.

Figure 12:
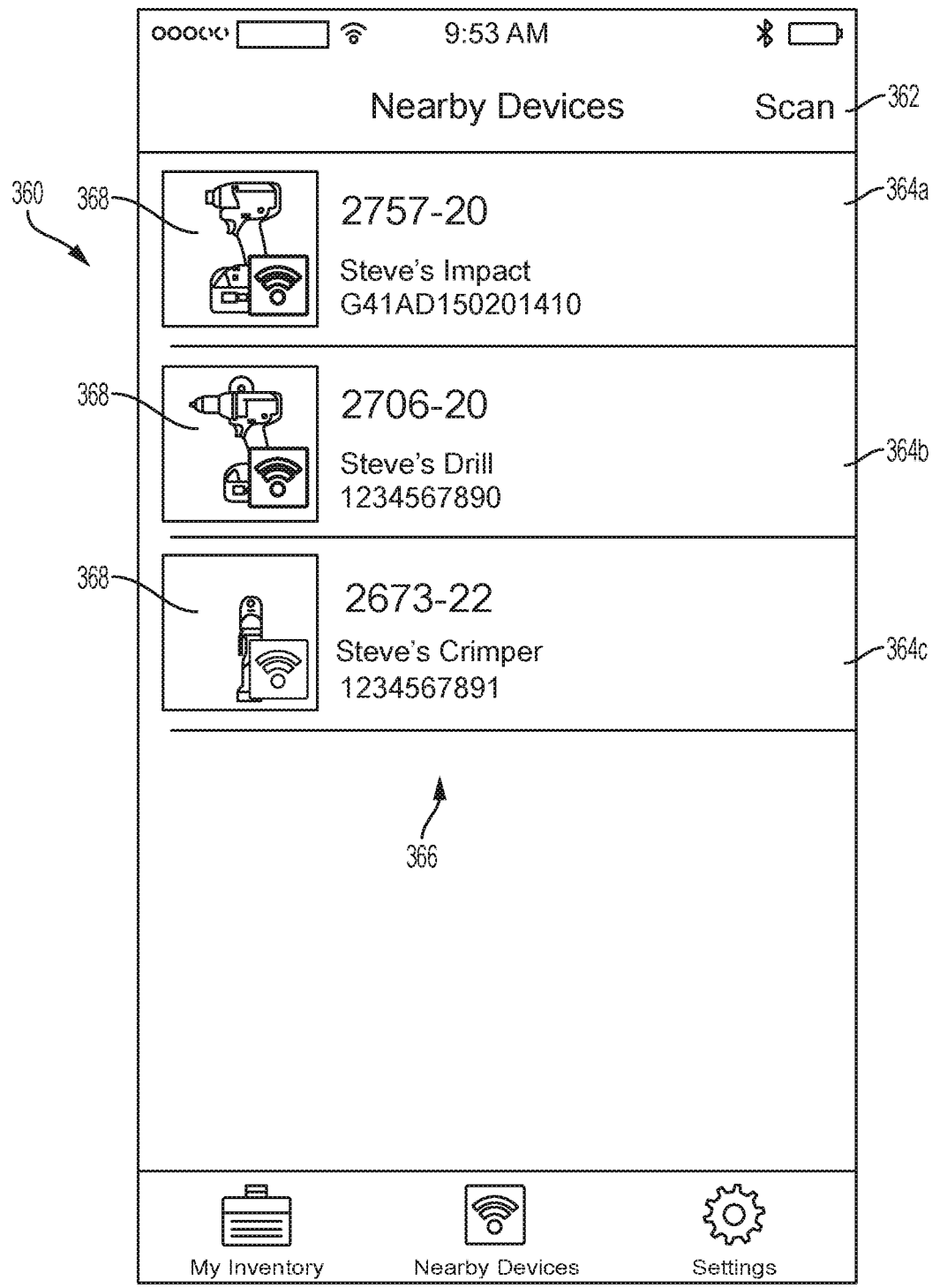
FIGS. 12-14 illustrate exemplary screenshots of a user interface of an external device of the communication system.

FIG. 12 illustrates a nearby devices screen 360 of the GUI on the touch screen display 344, which is used to identify and communicatively pair with power tools 302 within wireless range of the external device 164. For instance, in response to a user selecting the "scan" input 362, the external wireless communication controller 346 scans a radio wave communication spectrum used by the power tools 302 and identifies any power tools 302 within range that are advertising (e.g., broadcasting their UBID and other limited information). The identified power tools 302 that are advertising are then listed on the nearby devices screen 360. As shown in FIG. 12, in response to a scan, three power tools 302 that are advertising (advertising tools 364-c) are listed in the identified tool list 366.

The advertising tools 364 may be in either an advertising state or a connectable state, depending on whether a charged power tool battery pack 104 is coupled to the respective tool. More particularly, when a charged power tool battery pack 104 is coupled to a power tool 302, the power tool 302 is in the connectable state and has essentially full communication capabilities. In contrast, when no battery pack or a discharged battery pack 104 is coupled to the power tool 302, the power tool 302 is in the advertising state and is generally limited to broadcasting an advertisement message that includes its UBID, an indication that a charged power tool battery pack 104 is not present, and the state of charge of the back-up power source 124. In some embodiments, further information is provided by the power tool 302 to the external device 164 in the advertising state, although this additional data transmission may increase power usage and reduce the life of the back-up power source 124.

The external device 164 provides a visual state indication 368 in the identified tool list 366 of whether an advertising tool 364 is in the connectable state or the advertising state. For instance, the advertising tools 364 that are in a connectable state are shown normally with full color and boldness, while the advertising tools 364 in the advertising state are shown grayed-out. The external device 164 is operable to pair with advertising tools 364 that are in the connectable state, but not those advertising tools 364 that are in the advertising state. When one of the advertising tools 364 in the connectable state is paired with the external device 164, the tool is in the connected state.

The UBID received from the advertising tools 364 is used by the external device 164 to identify the tool type of each advertising tool 364. The external device 164 displays the tool type for example, by catalog number (e.g., "2757-20" and "7206-20") or in another form or language (e.g., "impact driver" or "circular saw"). Additionally, UBIDs received from advertising tools 364 in response to a scan are used to obtain further information about the tools, if available. For instance, the UBID is sent to the server 312 and used as an index or search term for a database of tool information that is part of the tool data 358. For instance, the database may store and respond to the external device 164 with the ASCII nickname (e.g., "Steve's Crimper"), other tool identifiers, and an icon. In some instances, this further information is available as part of the tool data 336 of the external device 164.

From the nearby devices screen 360, a user can select one of the advertising tools 364 from the identified tool list 366 to communicatively pair with the selected advertising tool 364. Each type of power tool 302 with which the external device 164 can communicate includes an associated tool graphical user interface (tool interface) stored in the tool interfaces 334. Once a communicative pairing occurs, the core application software 332 accesses the tool interfaces 334 (e.g., using the UBID) to obtain the applicable tool interface for the type of tool that is paired. The touch screen display 344 then shows the applicable tool interface. A tool interface includes a series of screens enabling a user to obtain and display tool operational data, configure the tool, or both. While some screens and options of a tool interface are common to multiple tool interfaces of different tool types, generally, each tool interface includes screens and options particular to the associated type of tool.

Figure 13:
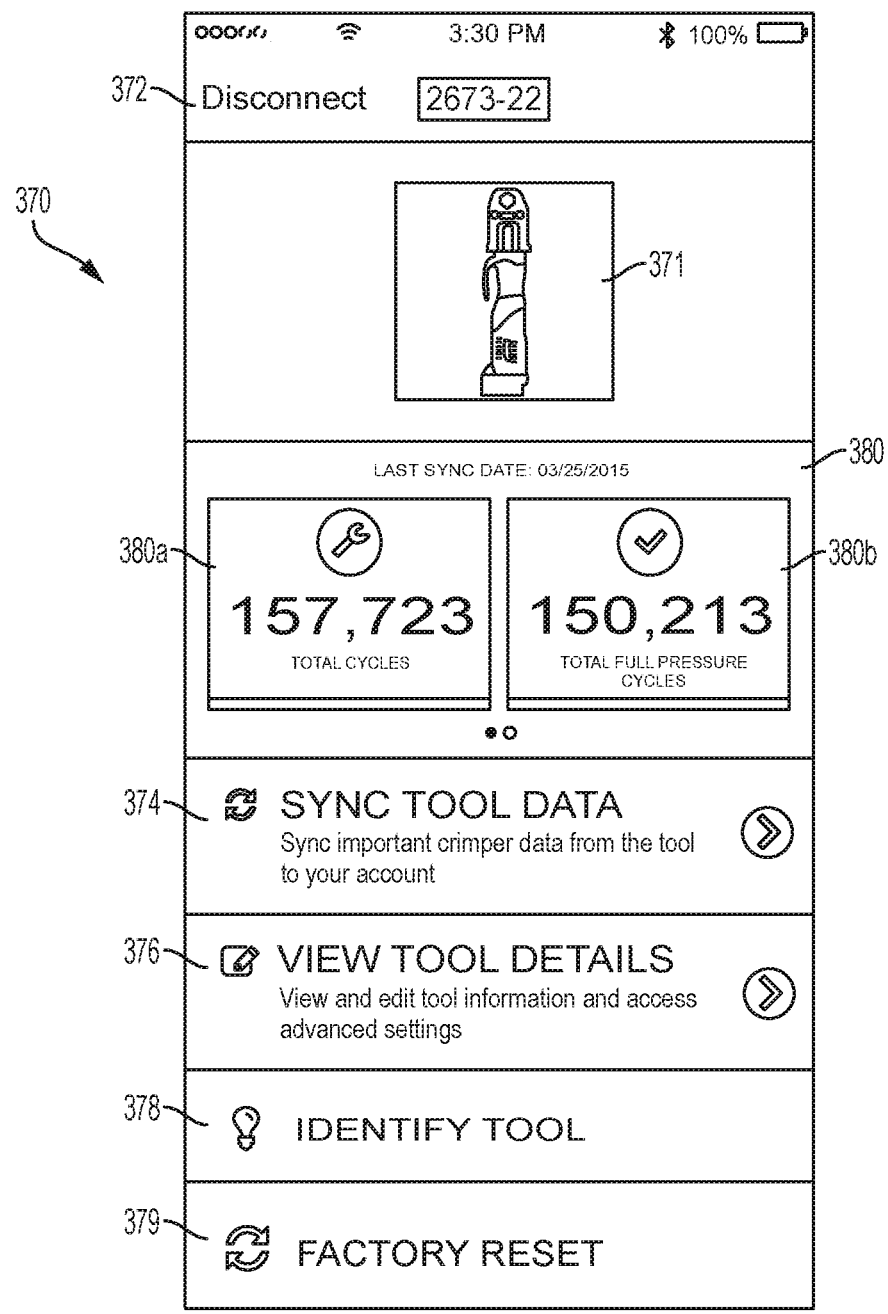

FIG. 13 illustrates a home screen 370 of the tool interface when the power tool 302 is the crimper 10. The home screen 370 includes an icon 371 for the crimper 10, which may be the same as the icon shown in the list 366. The home screen 370 also includes a disconnect input 372 enabling the user to break the communicative pairing between the external device 164 and the paired power tool 302. The home screen 370 further includes four selectable options: sync tool data 374, view tool details 376, identify tool 378, and factory reset 379. Selecting identify tool 378 sends a command to the crimper 10 requesting that the paired crimper 10 provide a user-perceptible indication, such as flashing the cycle feedback indicators 174, making an audible beep using a speaker (not shown), and/or using the motor 12 to vibrate the tool. Selecting factory reset 379 resets various configurable data on the crimper 10 to the manufacturer-set default values. Generally, the factory reset does not reset the cycle counts displayed on the home screen 370 (described below).

Figure 14:
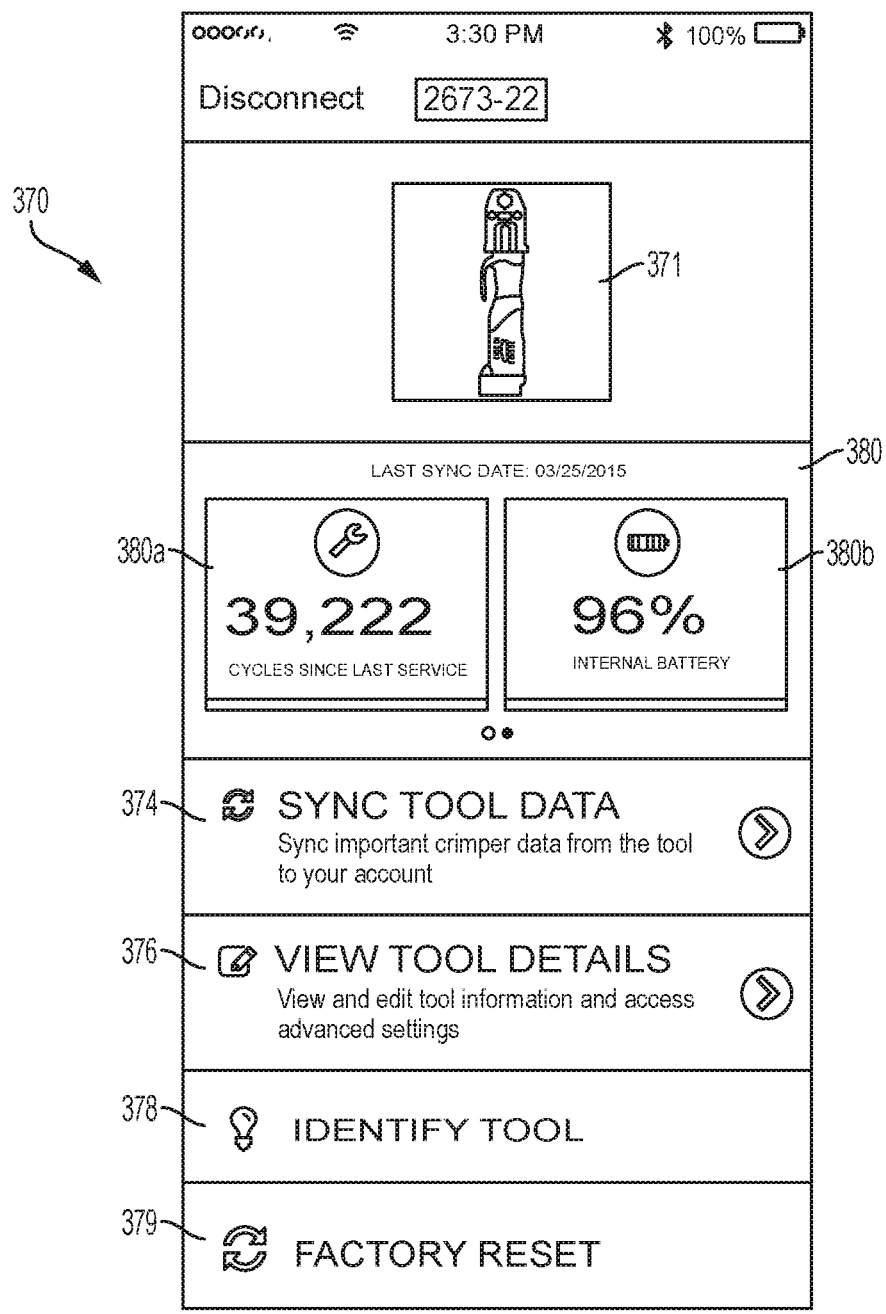

The home screen 370 also provides some overview information regarding the crimper 10. In particular, the home screen 370 includes a crimper data overview window 380. As shown in FIG. 13, the window 380 includes sub-windows 380a and 380b respectively indicating the total number of cycles that the crimper 10 has performed and the total number of full pressure cycles that the crimper 10 has performed. In response to receipt of a user swipe gesture across the window 380, the sub-windows 380c and 380d are shown, as illustrated in FIG. 14, which respectively indicate the number of cycles since the last service on the crimper 10 and the battery voltage/energy remaining on the back-up power source 124. The sub-window 380c may further indicate whether a time for service is nearing depending on the number of cycles since the last service. For instance, the background of sub-window 380c may turn yellow when the number of cycles exceeds a first warning threshold and red when the number of cycles exceeds a second, time-for-service threshold.

When initially paired with the crimper 10, the data displayed in the window 380 may be obtained from the tool data 358 of the server 312 or from the tool operational data 340 of the external device 164. Upon the external device 164 receiving a user selection of the sync tool data input 374, the external device 164 requests the crimper 10 to transmit the tool operational data 322 to the external device 164. Upon receipt of the tool operational data 322, the window 380 is updated with the received data. In some embodiments, the crimper 10 sends the tool operational data 322 to the external device 164 automatically upon pairing (i.e., independent of the user selecting the sync tool data input 374). The window 380 also lists the last sync date, which is updated when new tool operational data is received from the crimper 10.

As a particular example, in response to selecting the sync tool data 374, the crimper 10 sends pressure, current, motor speed, and other sensor data captured during each crimping operation that the crimper 10 performed (e.g., since the last data synchronization). Additionally, the external device 164 receives the sensor data from the crimper 10 and forwards the data to the server 312 for storage in the tool data 358.

In response to receiving a user selection of the view tool details input 376, the external device 164 provides a GUI screen allowing the user to change tool information, such as a tool nickname displayed in the list 366. In some embodiments, the view tool details input 376 also enables the user to reach a GUI screen to configure the profile 320 and change the die and application data 324 of the crimper 10.

Figure 15:
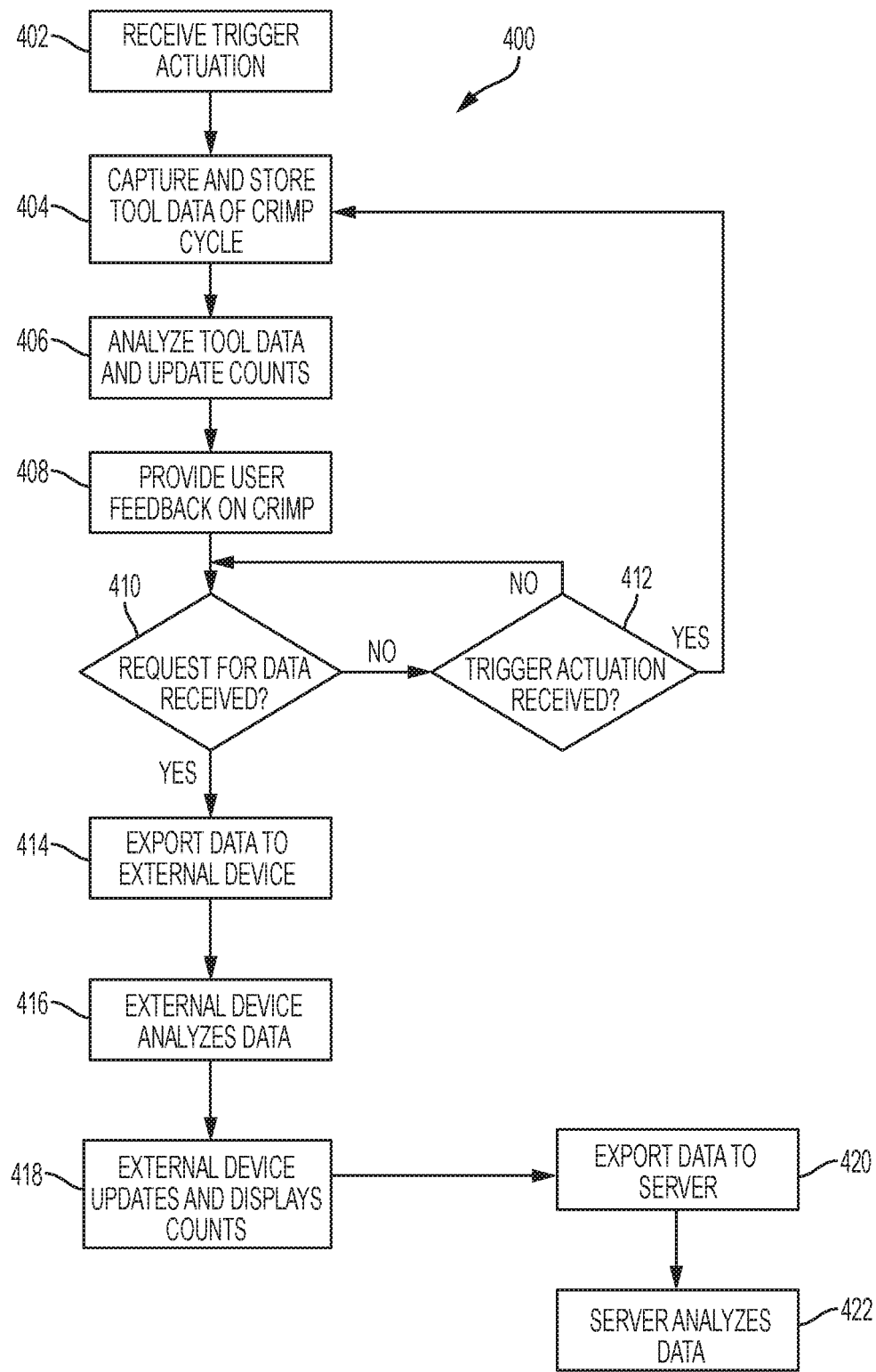
FIG. 15 illustrates a method of obtaining and analyzing tool data.

FIG. 15 illustrates a method of capturing and analyzing crimper data 400. In step 402, the crimper 10 is actuated by a user depressing the trigger 106. In step 404, the crimper 10 performs a crimp cycle and the electronic processor 100 captures data during the cycle. In some embodiments, the crimper 10 captures and stores, as part of the tool operational data 322, a limited data set, such as the maximum pressure or current value observed by the pressure sensor 68 during the cycle along with a time stamp. In other embodiments, additional data is captured during each cycle in step 404. For instance, in these embodiments, data obtained by the sensors 110 are captured to produce the tool operational data described above. To capture some tool operational data, in step 404, the electronic processor 100 increments or decrements values after a cycle (e.g., total number of cycles, cycles remaining before recommended service), while for other tool operational data, data (e.g., raw, conditioned, or averaged) from sensors 110 is captured and stored, and for still other tool operational data, values are inferred from sensor data generated and stored (e.g., temperature during the cycle based on detected current).

In some embodiments, curve data over a crimp cycle is captured for certain tool parameters, rather than a single maximum, minimum, or average value for the tool parameter. For example, in step 404, the electronic processor 100 captures (e.g., store) a data curve for one or more of motor speed, motor revolutions (and, thus, pump 14 activations), pressure, and motor current over time during a crimp cycle. A data curve includes a plurality of sensor data sample points over time, such as a sample per millisecond (ms), per 8 ms, per 10 ms, per 16 ms, per 32 ms, per 50 ms, per 64 ms, per 100 ms, per 128 ms, or another sample rate (e.g., between a sample/ms and a sample/128 ms).

Figure 16B:
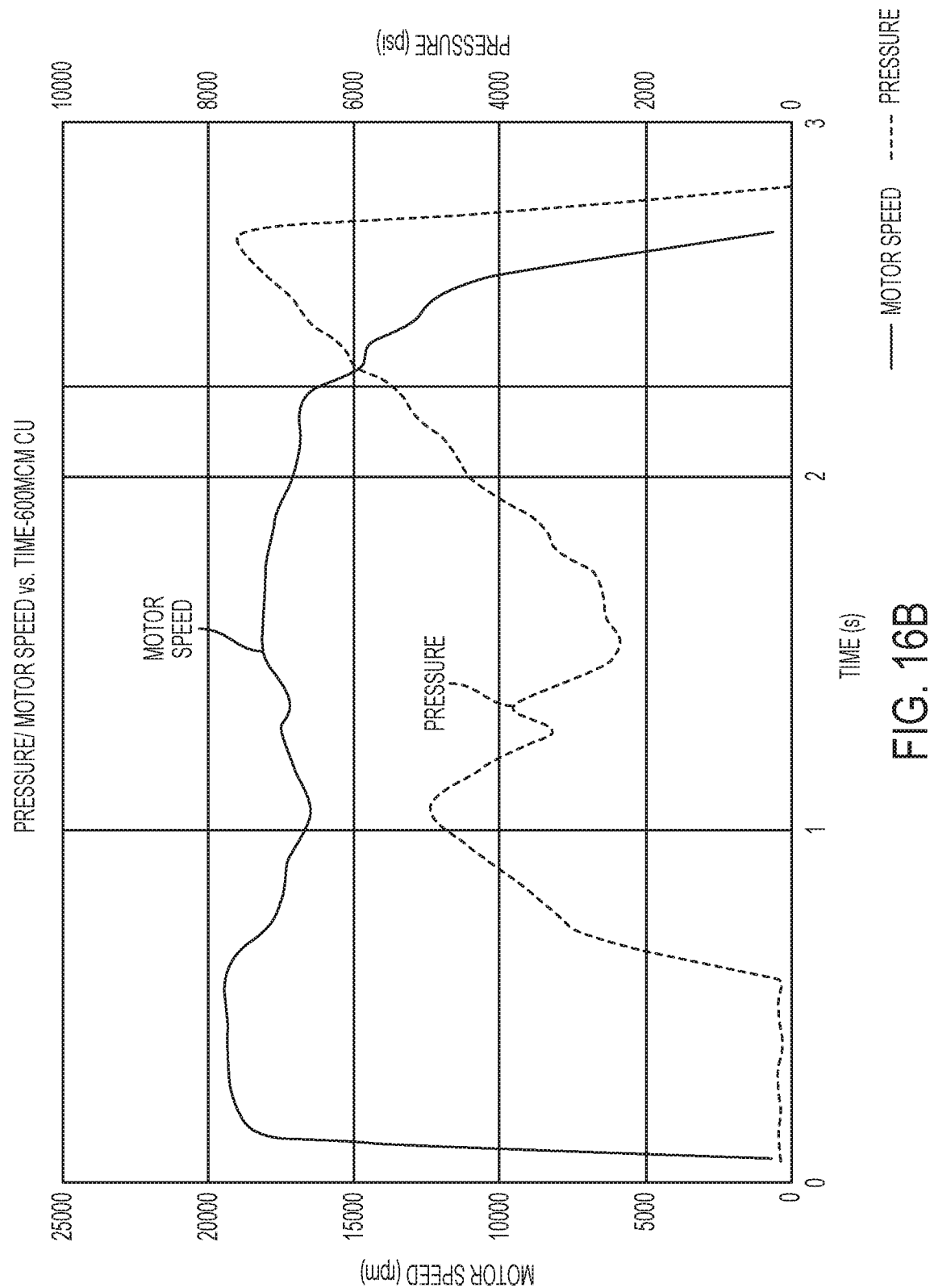
Figure 16C:
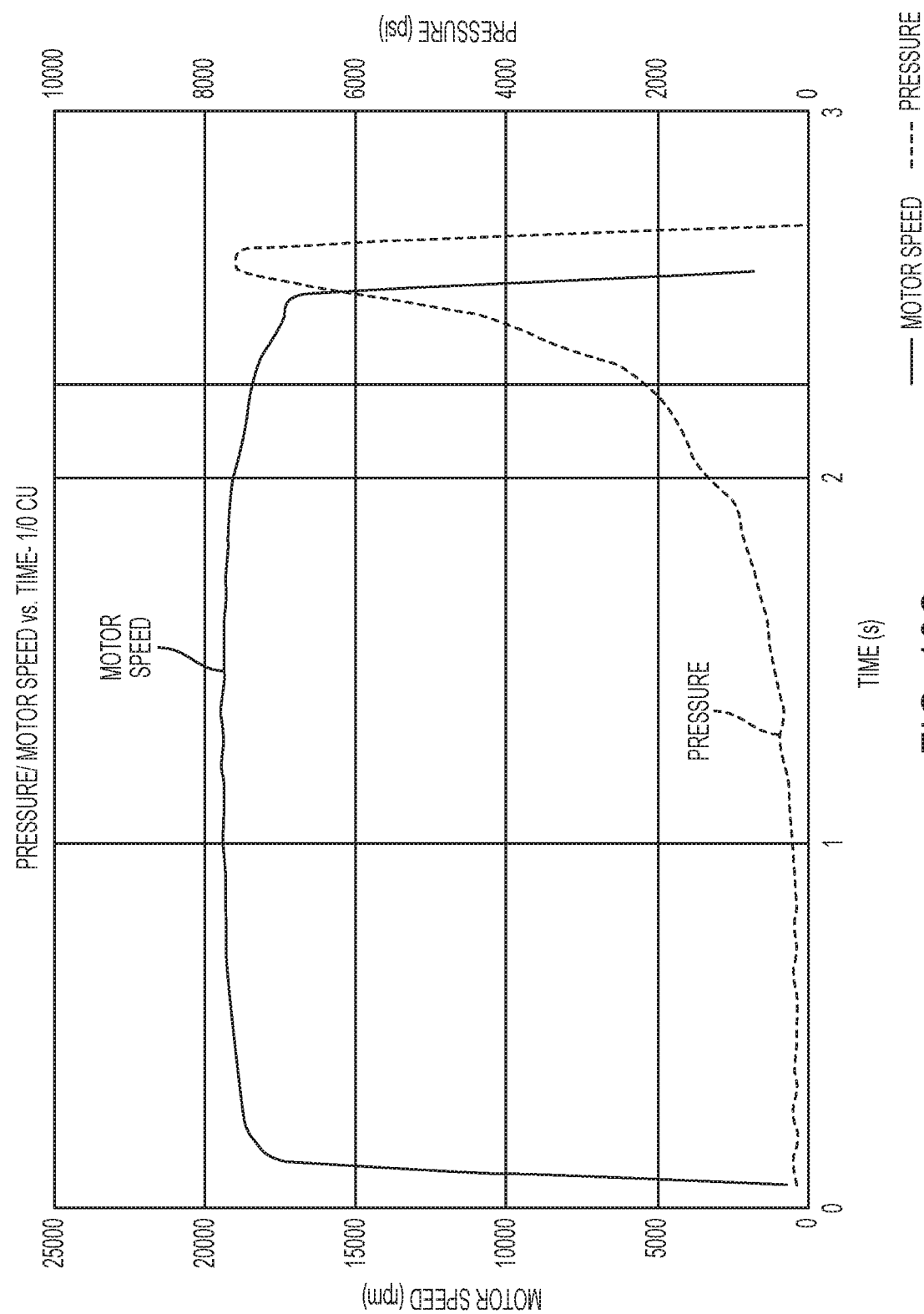
Figure 16D:
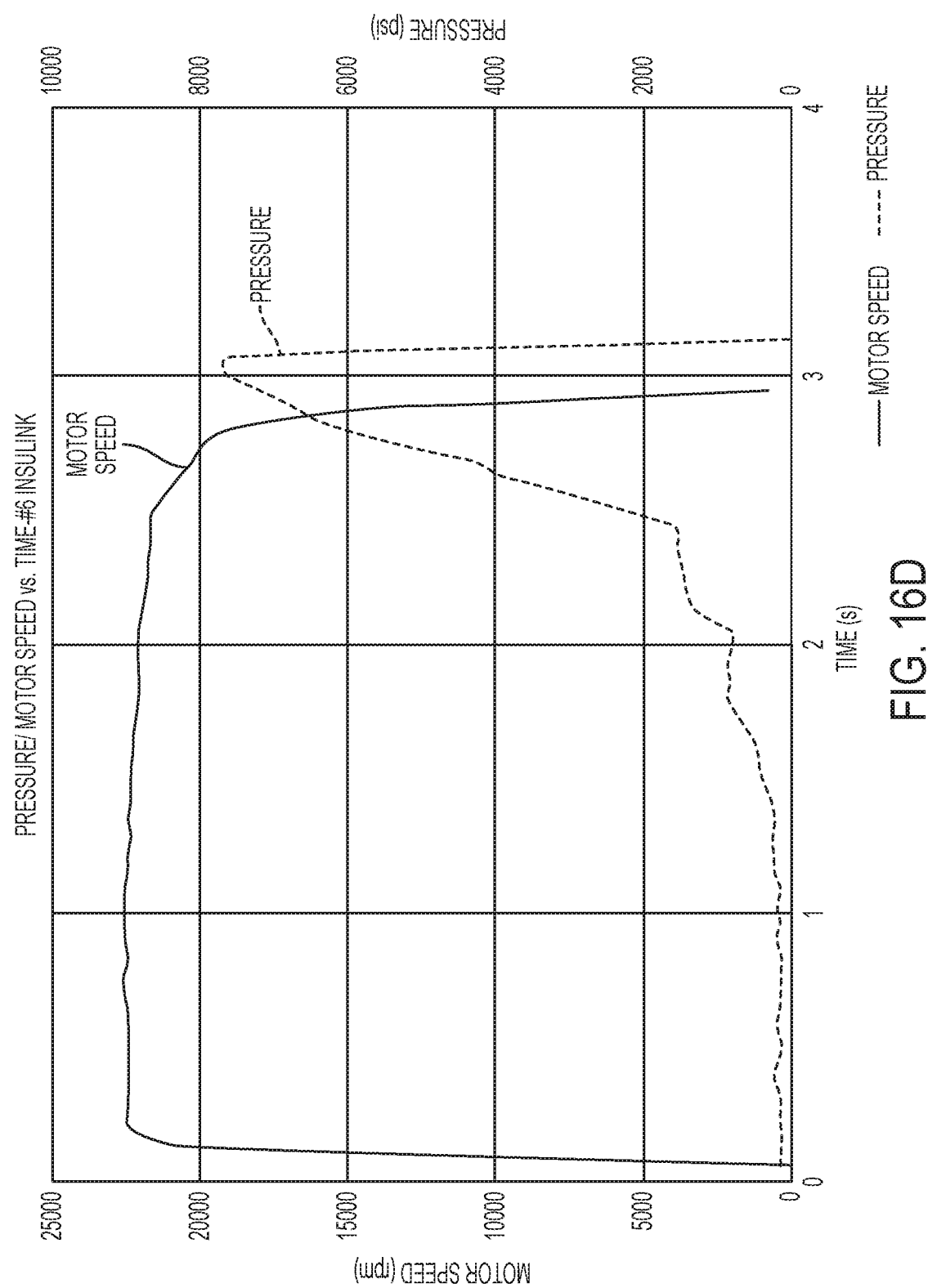
Figure 16F:
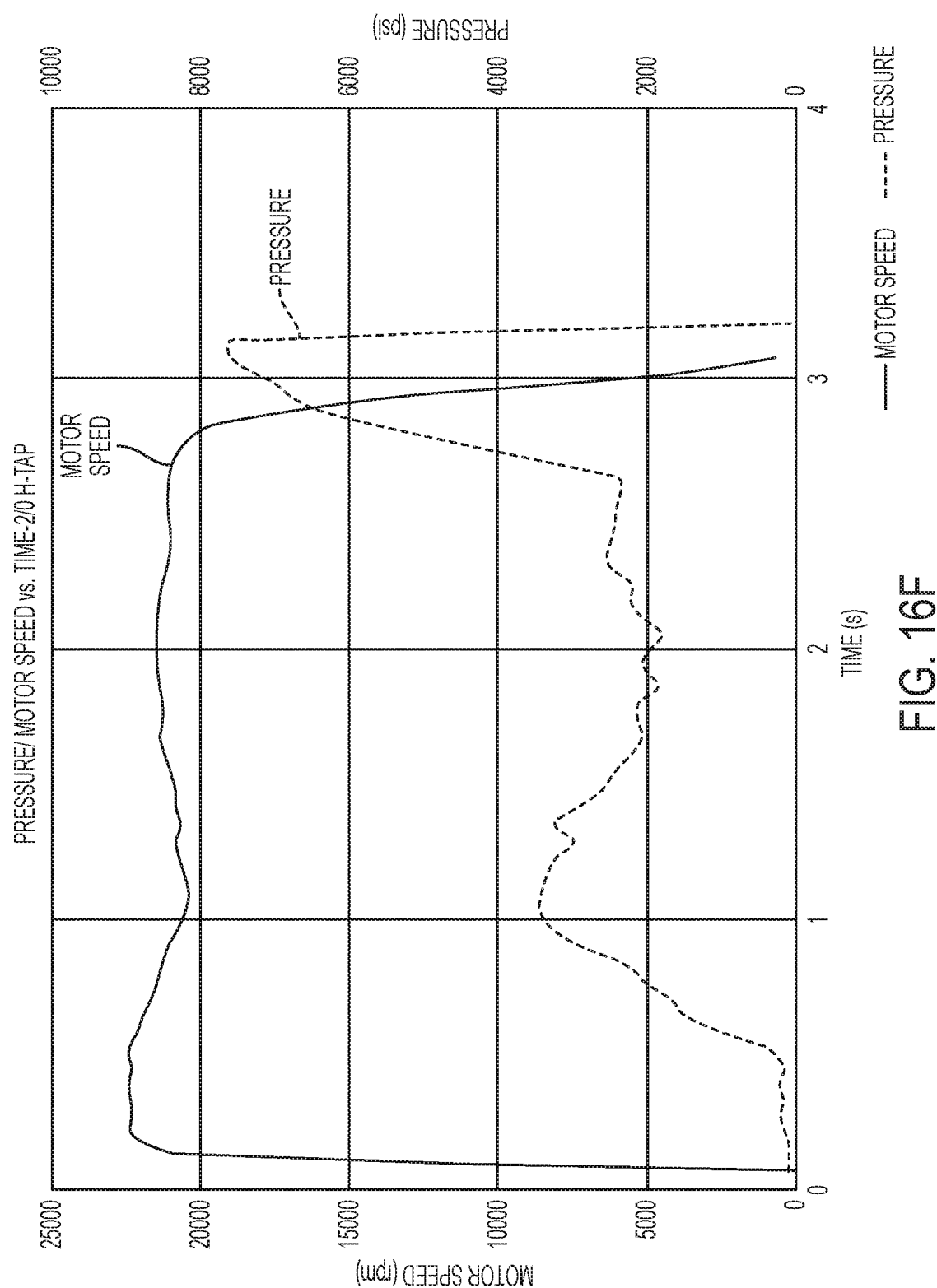

FIGS. 16A-G illustrate various data curves, each obtained over a different crimp cycle of the crimper 10. The data curves vary depending on the head type, die type, and the workpiece of the crimp. FIG. 16A illustrates pressure and motor speed profiles for the hydraulic crimper tool using a die to crimp 350MCM or kcmil (thousands of circular mils) aluminum (Al) wire. FIG. 16B illustrates pressure and motor speed profiles for the hydraulic crimper tool using a die to crimp 600MCM copper (Cu) wire. FIG. 16C illustrates pressure and motor speed profiles for the hydraulic crimper tool using a die to crimp I/O "one Aught" copper wire. FIG. 16D illustrates pressure and motor speed profiles for the hydraulic crimper tool using a die to crimp an Insulink™ compression splicers for 6 American wire gauge (AWG) wire (#6 INSULINK). FIG. 16E illustrates pressure and motor speed profiles for the hydraulic crimper tool using a die to crimp 3/0 aluminum wire. FIG. 16F illustrates pressure and motor speed profiles for the hydraulic crimper tool using a die to crimp an H-tap for 2/0 wire. An H-tap is an "H" shaped conductive (e.g., copper or aluminum) coupling for joining two wires together. One opening of the H-tap receives a first wire and the other opening of the H-tap receives the second wire. FIG. 16G illustrates pressure and motor speed profiles for the hydraulic crimper tool using a die to crimp an H-tap for 4/0 wire.

Figure 17:
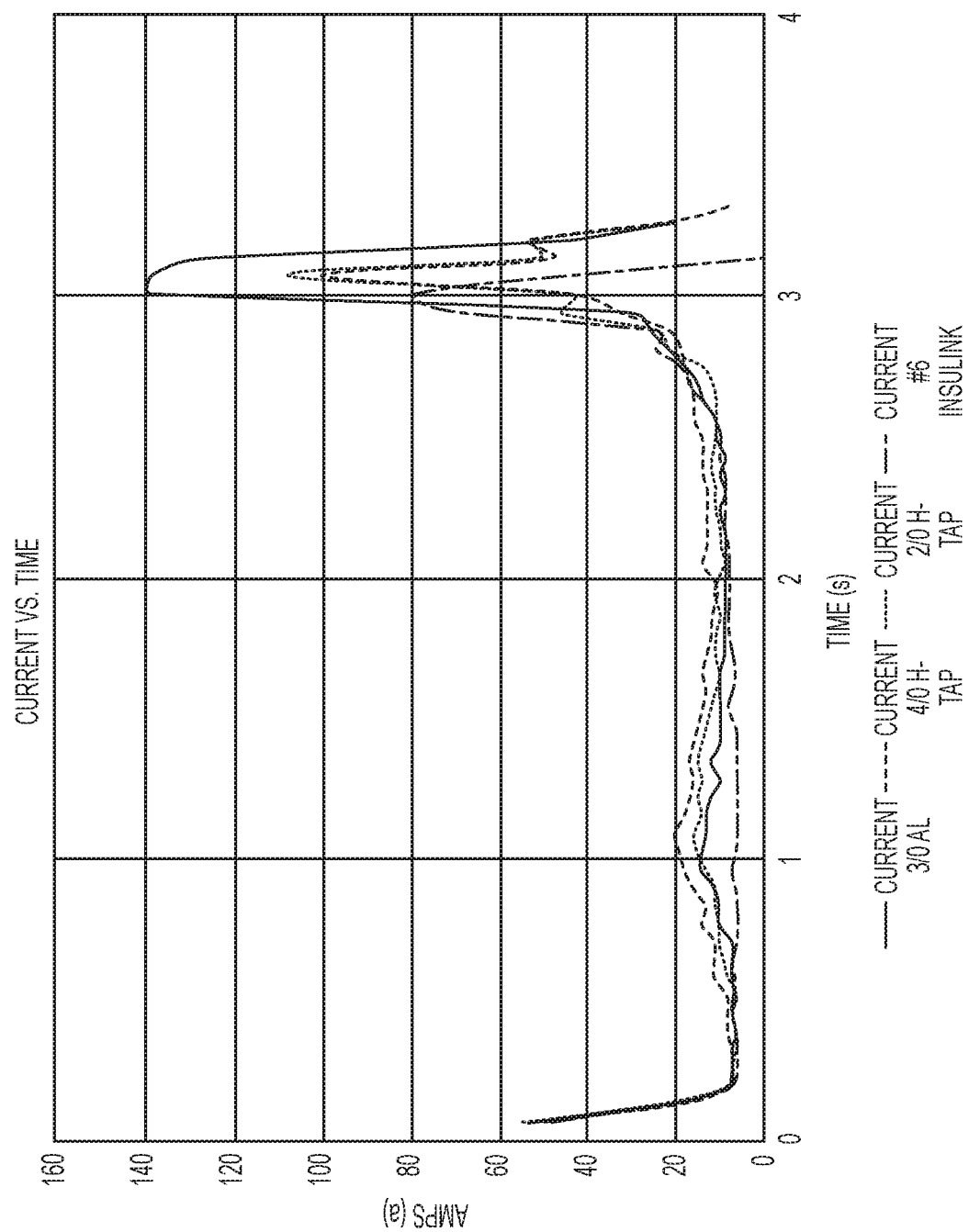
FIG. 17 illustrates current profiles for various dies of a hydraulic crimper tool.

FIG. 17 illustrate four current versus time data curves, each obtained over a different crimp cycle of the crimper 10 and each depending on the die and workpiece of the crimp. More particularly, each of the current versus time data curves of FIG. 17 is associated with one pair of the pressure and motor data curves of FIGS. 16D, 16E, 16F, and 16G. That is, FIG. 17 includes current versus time data curves for a crimp of an Insulink™ compression splicer for 6 AWG wire, a crimp of an H-tap for 2/0 wire, a crimp of 3/0 aluminum wire, and a crimp of an H-tap for 4/0 wire. FIGS. 16A-G and 17 illustrate exemplary data curves and not necessarily the only or preferred data curves for the particular crimp types described. For instance, a crimp of 350MCM as shown in FIG. 16A may change with a different head and/or die type.

The electronic processor 100 then analyzes the data curves obtained for various different operational parameters (step 406). For example, the electronic processor 100 compares the maximum pressure or current value to a predetermined threshold to determine whether full pressure was achieved in the cycle. After the analysis technique of step 406, in step 408, the electronic processor 100 provides an indication via the feedback indicators 174 whether the obtained curve data was within acceptable parameters. For instance, a green LED is illuminated if full pressure was achieved, and a red LED is illuminated if full pressure was not achieved In step 410, the electronic processor 100 determines whether a request for data has been received from the external device 164. If no request has been received, in step 412, the electronic processor 100 determines whether a further trigger actuation has been received. If so, the method returns to step 402 to capture further data on the next crimp cycle. If not, the method returns to step 410 to determine whether a request for data has been received. Accordingly, the crimper 10 cycles between steps 410 and 412 until either a data request is received or the user actuates the trigger 106. In some embodiments, the method 400 begins at step 410, rather than step 402.

Upon receipt of a data request, the electronic processor 100 exports the tool operational data 322, including the data obtained in each instance of step 404 since a previous export, to the external device 164 in step 414. While the external device 164 is operable to obtain the data after each crimp cycle, commonly, the external device 164 will obtain tool operational data covering a plurality of crimp cycles (e.g., at the end of a shift or project). The external device 164 stores the received data in the tool operational data 340 portion of the memory 330.

In step 416, the external device 164 compares the received tool operational data to thresholds to analyze the operation of the crimper 10. In step 418, the various cycle counts being tracked by the external device 164 are updated in the tool data 336, including those counts displayed in the crimper data overview window 380 of the home screen 370 (total cycles, total full pressure cycles, cycles since last service). Additionally, the state of charge of the back-up power source 124 displayed in the sub-window 380*d* is updated based on data obtained in step 404 and provided to the external device 164 in step 414.

In step 420, the data obtained by the external device 164 is forwarded to the server 312. The server 312, in turn, stores the received data in the memory 354 as part of the tool data 358. In step 422, the server 312 analyzes the data. For instance, instead of or in addition to one or both of the comparison steps 406 and 416, the server 312 may perform similar comparisons in step 422 to analyze the data from the crimper 10.

In some instances, the controller 130 uses one data curve to generate a data curve of another parameter type. For instance, the controller 130 is operable to take pressure versus time data curve from a cycle and generate a characteristic output force versus time data curve deduced from a relationship between pressure and force.

With the additional data points from the pressure, current, motor speed, and force data curves, a more thorough analysis of a crimp cycle is achieved. For example, the expected curve data 326 stores a plurality of expected data curves that the electronic processor 100 is expected to capture during a successful crimp. The expected data curves may include a plurality (e.g., at least one) expected data points over time at a granularity similar to an obtained data curve. Each expected data curve is associated with a particular die and workpiece characteristics because, as illustrated in FIGS. 16A-G, the data curves may vary significantly based on these factors.

Figure 18:
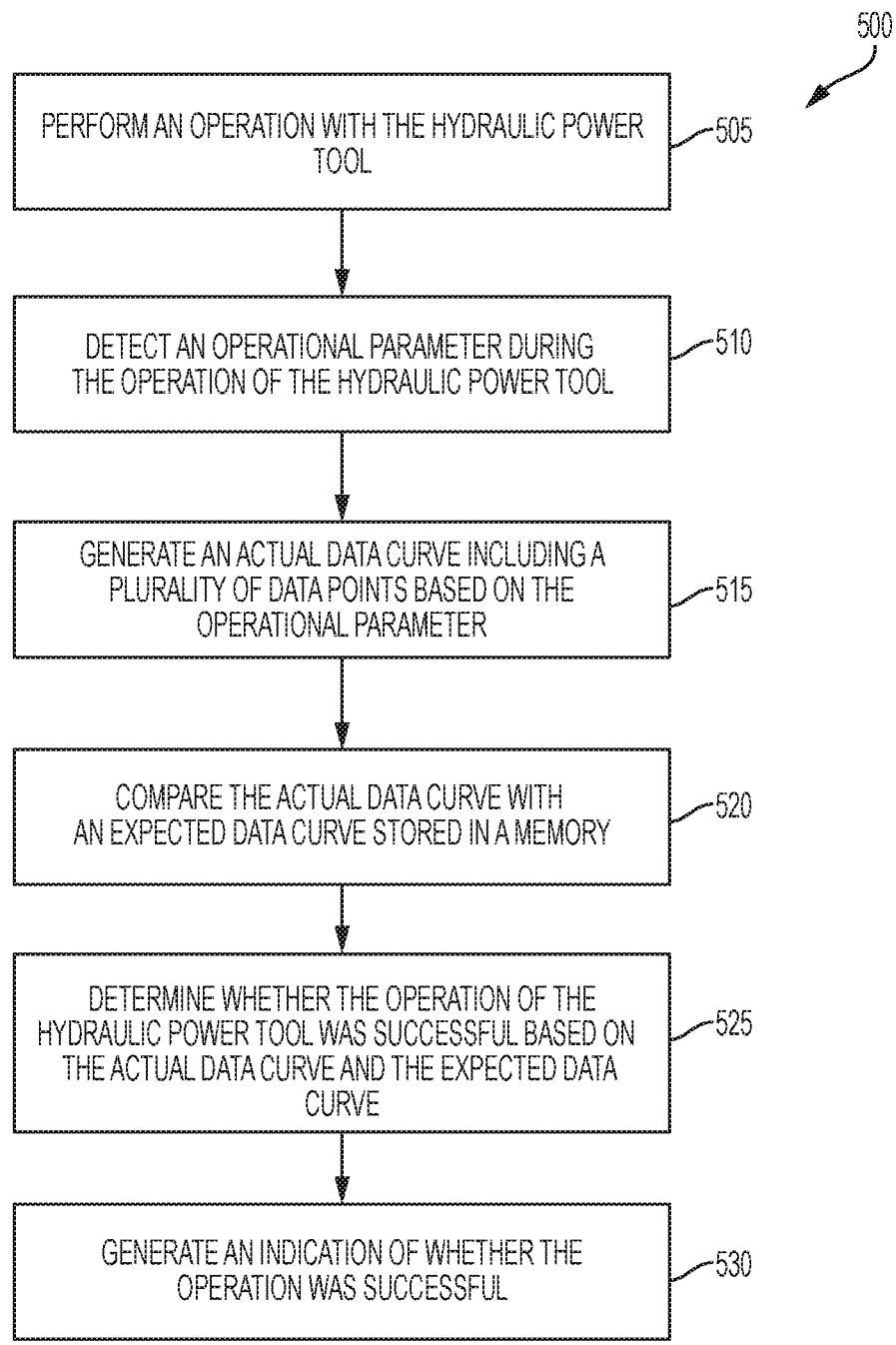
FIG. 18 illustrates a method of operating a hydraulic power tool.

FIG. 18 is a flowchart illustrating a method 500 of operating the crimper 10 (or another hydraulic power tool such as the cutter 210), and in particular, of analyzing the data curves with respect to the expected data curves. As shown in FIG. 18, the hydraulic power tool (e.g., the crimper 10, the cutter 210, or a different hydraulic power tool) performs an operation (step 505). For example, the crimper 10 may complete a crimp cycle, the cutter 210 may complete a cutter cycle, and the like. The operation performed by the hydraulic power tool changes based on the specific hydraulic power tool used to complete the operation. During operation of the hydraulic power tool (e.g., during the completion of a crimp cycle), a sensor detects an operational parameter (step 510), as is described, for example, with respect to step 404 of FIG. 15. The sensor may be, for example, the pressure sensor 68 to detect an output pressure of the piston 30, the hall sensors 114 to detect a motor speed, the current sensor 112 to detect a motor current, or a similar sensor to detect another operational parameter of the hydraulic power tool.

Based on the operational parameter, the electronic processor 100 generates an actual data curve (step 515), as described above with respect to FIGS. 16A-17. Each actual data curve includes a plurality of data points over time as described above. The electronic processor 100 then compares the actual data curve with an expected data curve that is stored in memory 132, 330, and/or 354 as expected curve data 326 (step 520). The electronic processor 100 then determines whether the operation of the hydraulic power tool (e.g., the crimper 10, cutter 210, or another hydraulic power tool) was successful based on the actual data curve and the expected data curve (step 525). In other words, the electronic processor 100 determines whether the operation of the hydraulic drive 11 was successful. In particular, the electronic processor 100 generates an indication of whether the crimp cycle was successful dependent on the amount of deviation between the expected data curve and the obtained data curve. Determining the amount of deviation and/or determining whether the crimp cycle was successful is described in more detail in FIGS. 19-21. In response to determining whether the operation of the hydraulic power tool was successful, an indication is generated of whether the operation of the hydraulic power tool (e.g., the hydraulic drive 11) was successful (step 530). In some embodiments, the indication includes an alert that is generated when the operation of the hydraulic power tool was unsuccessful. In other embodiments, the indication includes a confirmation indication that the operation of the hydraulic power tool was successful. In some embodiments, the indication is generated on the hydraulic power tool itself (e.g., the crimper 10, the cutter 210, or another hydraulic power tool). In other embodiments, the indication is generated on the external device 164 via, for example, the touch display 344 and/or speakers (not shown) included on the external device 164. In yet other embodiments, the indication is generated on both the hydraulic power tool (e.g., the crimper 10, the cutter 210, and the like) and on the external device 164.

Figure 19:
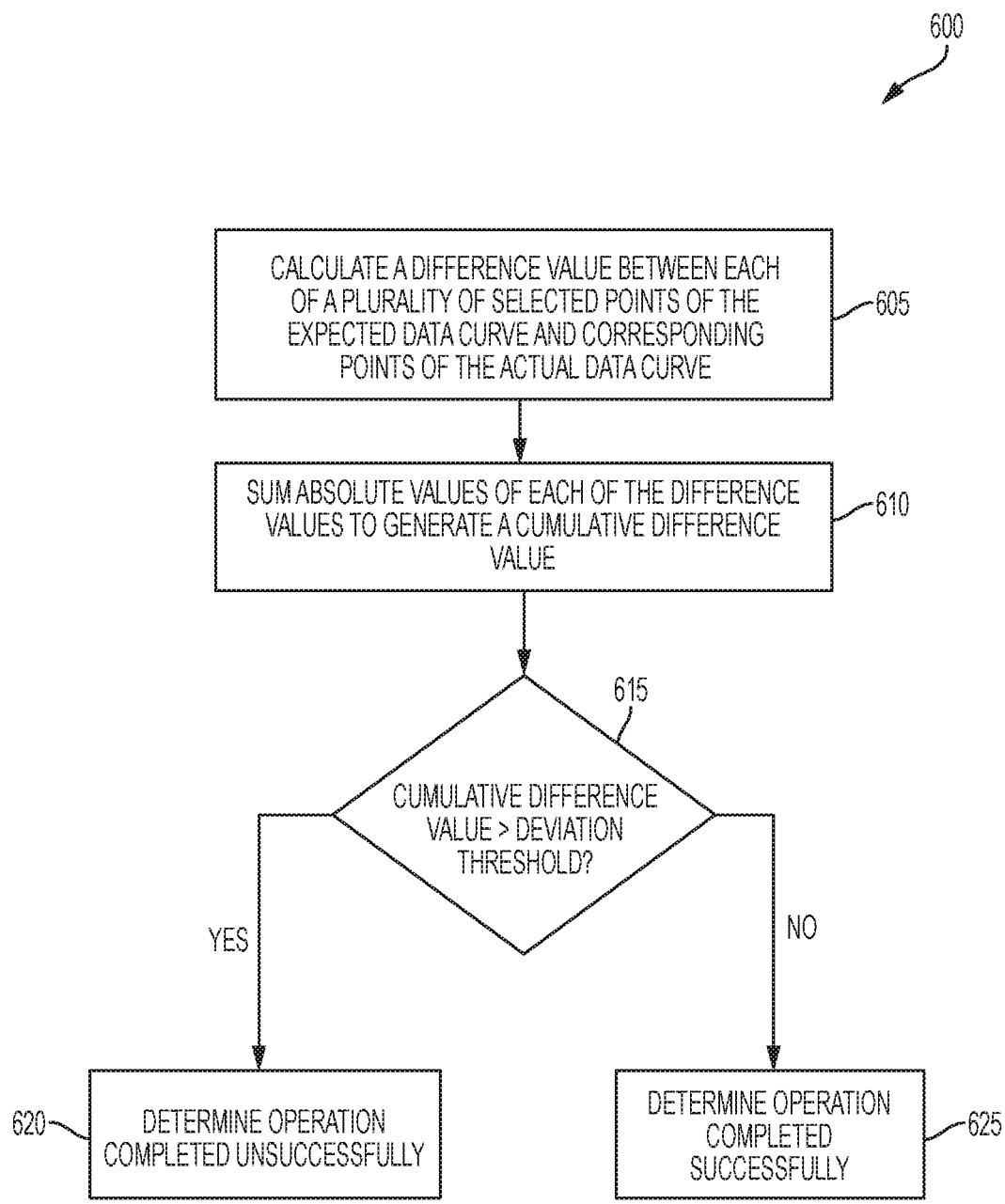
FIG. 19 illustrates a first method of comparing an actual data curve with an expected data curve.

FIG. 19 illustrates a first method 600 of comparing the actual data curve with the expected data curve as described with respect to step 520 of FIG. 18. Generally, the method 600 describes how the electronic processor 100 generates an indication of whether the crimp cycle was successful dependent on the amount of deviation between the expected data curve and the obtained data curve. The amount of deviation may be a sum of the absolute value of the difference between each (or select) data point(s) of the two curves. If the sum exceeds a deviation threshold value, the crimp cycle is considered unsuccessful. If the sum is less than the deviation threshold value, the crimp cycle is considered successful.

In the first method 600, the electronic processor 100 calculates a difference value between each of a plurality of selected point of the expected data curve and corresponding points of the actual data curve (step 605). In other words, certain data points are selected from the expected data curve. These selected data points are then compared to the data points of the actual data curve that correspond to the selected data points from the expected data curve. In some embodiments, the selected data points may include all the data points of the expected data curve. In other embodiments, the selected data points only include a portion of the data points that define the expected data curve. Generally, the more data points that are selected the more complex the calculations become and the more processing power that is required. After calculating the plurality of difference values, the electronic processor 100 sums absolute values of each of the difference values to generate a cumulative difference value (step 610). By summing the absolute values of each of the difference values, the electronic processor 100 considers both deviations from the expected data curve (i.e., when the actual data curve exceeds the expected data curve and when the actual data curve is lower than the expected data curve).

As shown in FIG. 19, the electronic processor 100 then determines whether the cumulative difference value exceeds a deviation threshold (step 615). When the cumulative difference value exceeds the deviation threshold, the electronic processor 100 determines that the operation was completed unsuccessfully, for example, the crimp cycle is considered unsuccessful (step 620). In some embodiments, an alert is generated when the operation is considered unsuccessful. As discussed above, the alert or indication may be generated by the crimper 10, the external device 164, or both. On the other hand, when the cumulative difference does not exceed the deviation threshold, the electronic processor 100 determines that the operation (e.g., the crimp cycle) was completed successfully (step 625).

Figure 20:
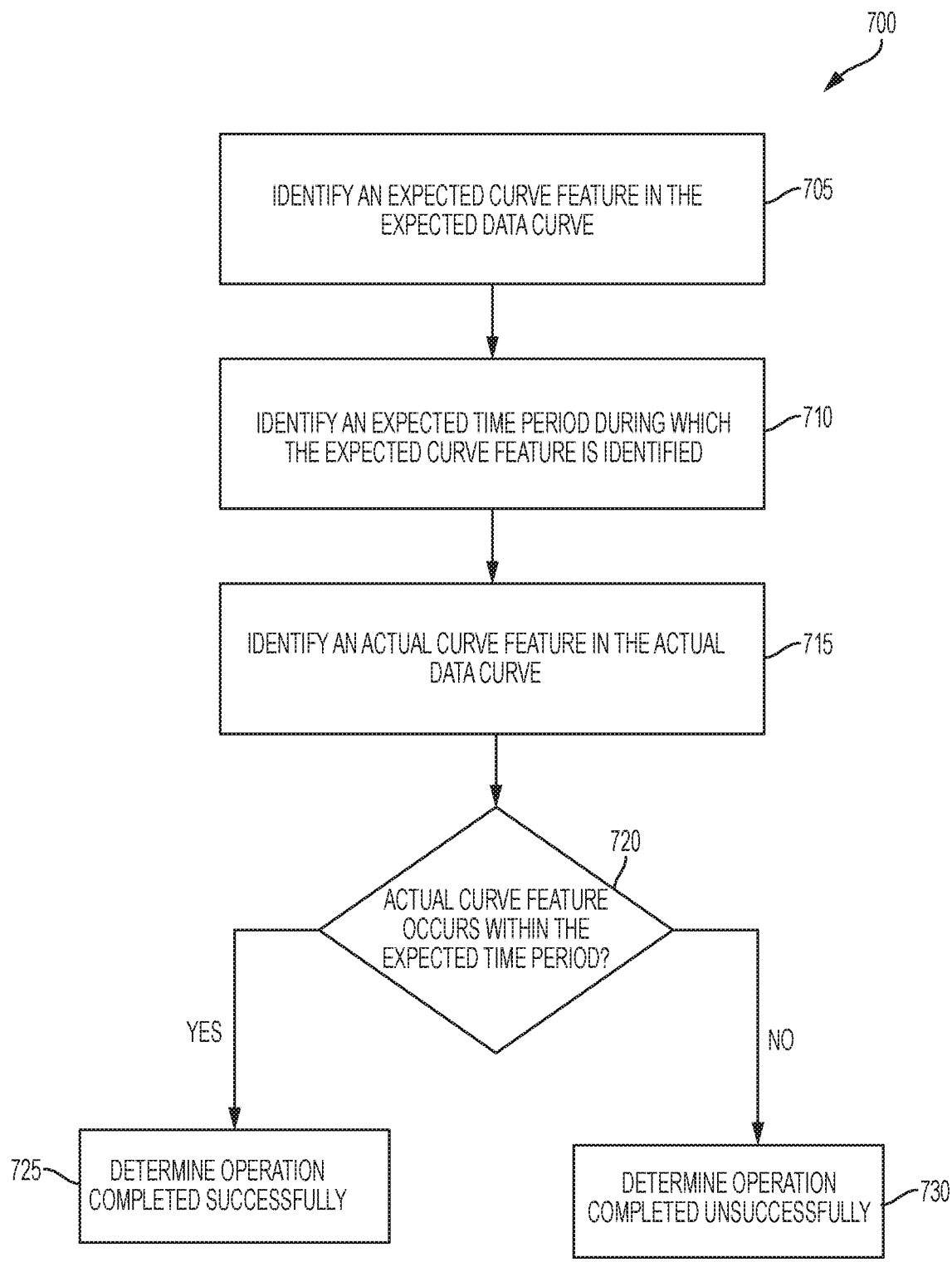
FIG. 20 illustrates a second method of comparing an actual data curve with an expected data curve.
Figure 21:
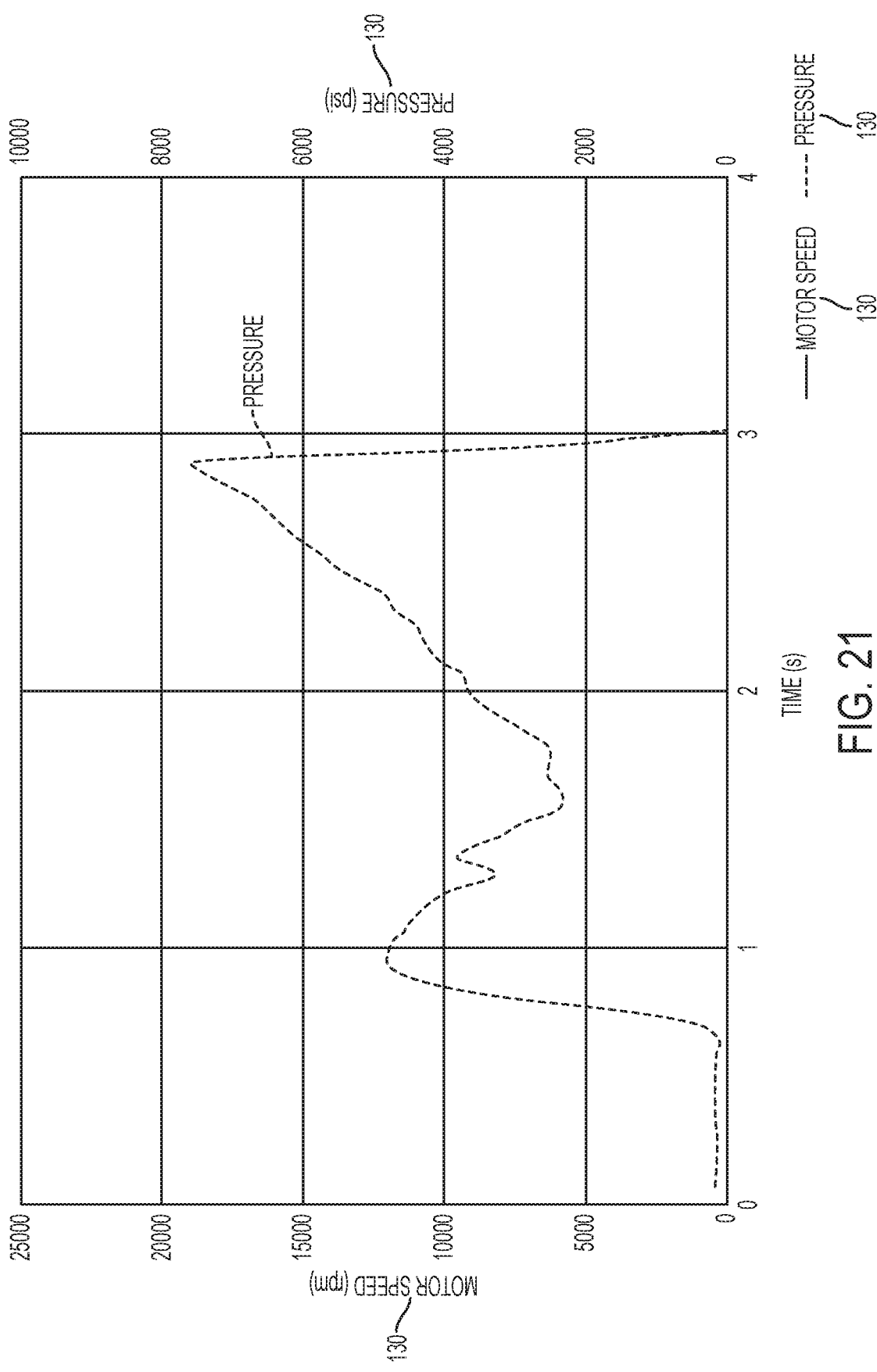
FIG. 21 illustrates an exemplary expected data curve.

In some embodiments, other curve comparison techniques are used in step 406 to determine whether a crimp cycle was successful. For instance, the expected data curve may include select data points, such as expected maximums and minimum values, and expected instances in time for those data points given the die and workpiece characteristics. FIG. 20 illustrates a second method 700 of comparing the actual data curve with the expected data curve as described with respect to step 520 of FIG. 18. As shown in FIG. 20, the electronic processor 100 identifies an expected curve feature in the expected data curve (step 705). The curve feature includes, for example, valleys and peaks formed by the expected data curve. For example, FIG. 21 illustrates an exemplary expected data curve. The expected data curve of FIG. 21 has a peak value of about 5000 psi at about 1 second, a valley value of about 2500 psi at about 1.75 seconds, and a peak of about 7500 psi just before 3 seconds. Each of these peaks and valleys are considered curve features. Other expected data curves may include different expected curve features and may include more or less curve features than the exemplary expected data curve shown in FIG. 21.

The electronic processor 100 also identifies an expected time period during which the expected curve feature is identified (step 710). The expected time period is shorter than the duration of the operation of the crimper 10 (e.g., shorter than a crimp cycle). Again, with respect to FIG. 21, the expected time period may include, for example, between 0.5 seconds and 1.5 seconds for the peak of about 5000 psi. Since the expected data curve of FIG. 21 includes other expected curve features, the electronic processor 100 may also identify one expected time period for each expected curve feature (e.g., a second expected time period for a second expected curve feature, a third expected time period for a third expected curve feature, and the like). The electronic processor 100 then identifies an actual curve feature in the actual data curve (step 715). The actual curve feature again refers to peaks and/or valleys that are formed in the actual data curve. FIG. 16A illustrates an exemplary actual data curve that includes a first actual curve feature of about 5000 psi at about 1 second, a second actual curve feature of about 2500 psi at about 1.75 seconds, and a third actual curve feature of about 7500 psi at about 3 seconds. As shown in FIG. 16A, the first actual curve feature and third actual curve feature correspond to peaks of the actual data curve, while the second actual curve feature corresponds to a valley.

The electronic processor 100 then determines whether the identified actual curve feature occurs within the expected time period (step 720). For example, the electronic processor 100 may determine whether the first actual curve feature of FIG. 16A occurs within the expected time period of about 0.5 seconds to 1.5 seconds. When the electronic processor 100 determines that the actual curve feature occurs within the expected time period, the electronic processor 100 determines that the operation was completed successfully (i.e., the crimp cycle was completed successfully) in step 725. In the example of FIG. 16A and FIG. 21, the first actual curve feature (e.g., the peak of about 5000 psi) does occur within the expected time period between 0.5 seconds and 1.5 seconds. Therefore, in this example, the electronic processor 100 determines that the crimp cycle was completed successfully. On the other hand, when the electronic processor 100 determines that the actual curve feature occurs outside the expected time period (or does not occur at all), the electronic processor 100 determines that the operation was completed unsuccessfully (step 730). In some embodiments, an indication or alert is generated when the operation was completed unsuccessfully. For example, if the actual data curve of FIG. 16A did not include the first actual curve feature, or the first actual curve feature occurred at 0.25 seconds instead, the electronic processor 100 would determine that the crimp cycle was completed unsuccessfully. In some embodiments, the method 700 may be repeated for each expected curve feature in an expected data curve to determine whether an actual data curve is similar to the expected data curve (e.g., to analyze the actual data curve based on an appropriate expected data curve). By performing the method of FIG. 20, the electronic processor 100 may ensure (1) that the obtained pressure data curve (or another actual data curve) has maximum and minimum (peak and valley) values within a certain range of the expected maximum and minimum values and (2) that those maximum and minimum values occur within a certain time period of the expected instances in time of those expected maximum and minimum values.

In the embodiments described above, the actual data curve is compared to a specific expected data curve. This expected data curve may be selected by the electronic processor 100 based on specified head type, die type, and workpiece characteristics. For example, a user may input the head type, die type, and workpiece characteristics using the touch display 344 on the external device 164. The external device 164 (e.g., the electronic processor 342) may then determine an appropriate expected data curve from a plurality of expected data curves stored in the expected curve data 326. The external device 164 may then send the expected data curve to the crimper 10, and/or may send an indication to the crimper 10 of which expected data curve to use. Additionally or alternatively, the external device 164 may send the data specified by the user to the crimper 10 for the electronic processor 100 to determine an appropriate expected data curve.

In other embodiments, however, the electronic processor 100 compares the actual curve data to a plurality of expected data curves stored in the expected curve data 326 and performs a curve matching function to identify the type of crimp. The curve matching function may include, for instance, comparing the actual curve data to the expected data curves stored in the expected curve data 326 and determining the closest match based on a sum of absolute differences of each or of select data points on the curve or using another curve matching technique. If the actual data curve does not match any of the expected data curves (e.g., the sum of the absolute differences exceeds a threshold for each expected data curve), the controller 130 determines that the crimp was not successful. In the case of no match, the controller 130 may also determine whether the trigger 106 was released early (e.g., the trigger 106 was depressed for less than a predetermined threshold) and, in turn, indicate a crimp error and no match based on the early release of the trigger 106. Additionally, the controller 130 may determine that the actual curve data matches an expected data curve generally, but is still too different from the curve and indicates that the crimp was not successful. The controller 130 may also output a type of crimp and an indication of whether the crimp was successful based on the matched expected data curve to the external device 164 for display on the touch display 344. As an example, the external device 164 may identify the crimp type as using crimper head 72, using die type X for 3/0 wire, and crimping 3/0 aluminum wire.

Figure 22:
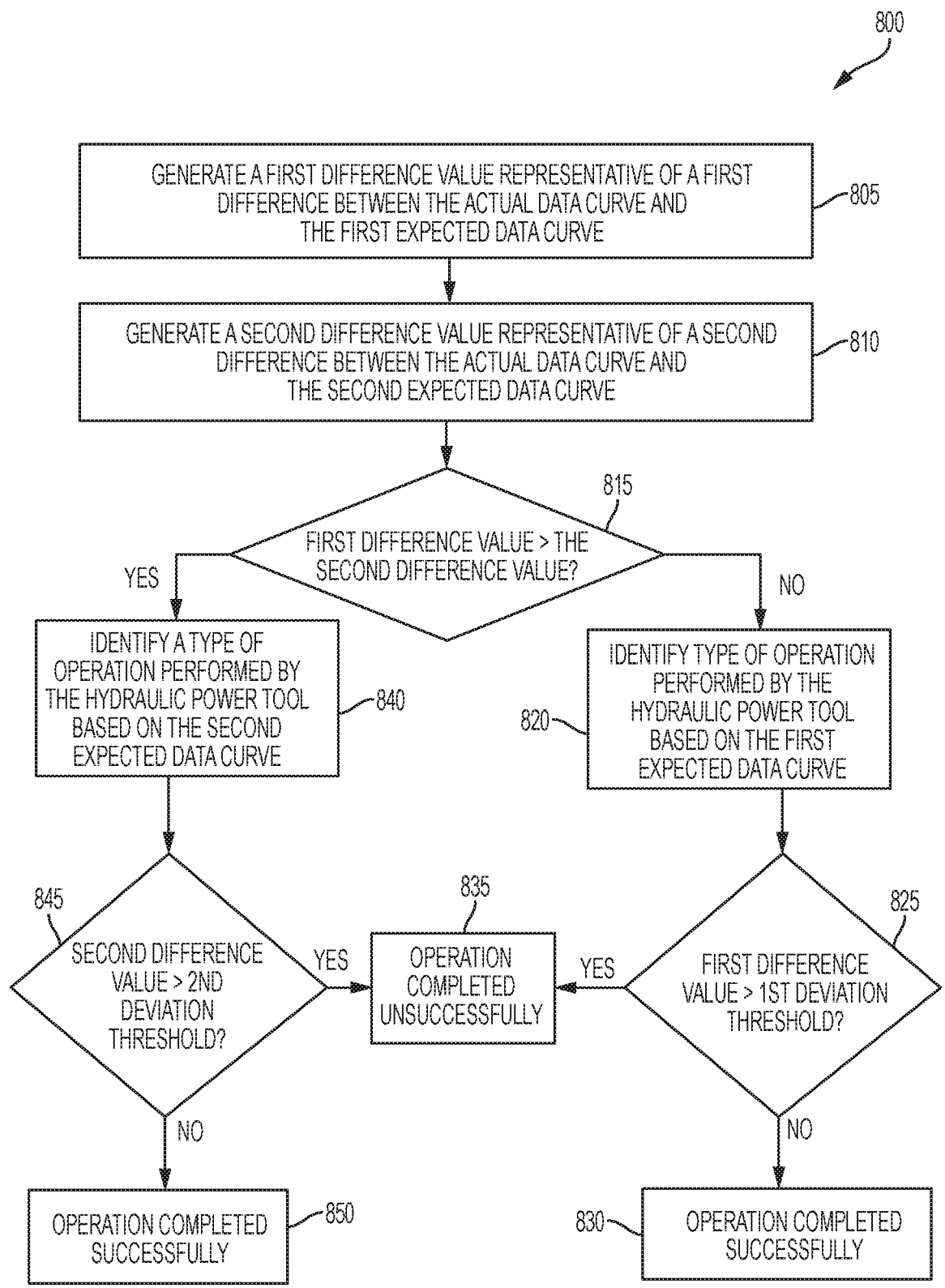
FIG. 22 illustrates a method of performing a curve matching function.

FIG. 22 is a flowchart illustrating a method 800 of the curve matching function described briefly above. In the example shown in FIG. 22, the expected curve data 326 only includes a first expected data curve and a second expected data curve. In other embodiments, the expected curve data 326 may include more expected data curves, and the actual data curve may be compared to each of these expected data curves. As shown in FIG. 22, the electronic processor 100 generates a first difference value representative of a first difference between the actual data curve and the first expected data curve (step 805). The first difference value may, in some embodiments, correspond to a sum of the absolute values of difference values between the actual data curve and the expected data curve. In other embodiments, the first difference value may be calculated based on the number of curve features that correspond to each other between the actual data curve and the expected data curve. The electronic processor 100 also generates a second difference value representative of a second difference between the actual data curve and the second expected data curve (step 810). As described above, the difference value may be generated or calculated in different ways. In one example, the first difference value and the second difference value are calculated in the same way to obtain comparable difference values.

The electronic processor 100 then determines whether the first difference value exceeds the second difference value (step 815). When the electronic processor 100 determines that the first difference value does not exceed the second difference value (e.g., the actual data curve more closely resembles the first expected data curve), the electronic processor 100 proceeds to identify a type of operation based on the first expected data curve (step 820). For example, the electronic processor 100 may identify the crimp type as using crimper head 72, using die type X for 3/0 wire, and crimping 3/0 aluminum wire. The electronic processor 100 can also determine whether the particular operation (e.g., crimp cycle) was completed successfully. As shown in FIG. 22, the electronic processor 100 determines whether the first difference value exceeds a first deviation threshold (step 825). The first deviation threshold may be a general deviation threshold used by the electronic processor 100 to determine whether an operation was completed successfully regardless of which type of operation was performed. In other embodiments, the first deviation threshold is a specific deviation threshold based on, for example, the type of operation that was performed. In other words, the deviation threshold may change when the expected data curve changes. When the first difference value does not exceed the first deviation threshold, the electronic processor 100 determines that the operation (e.g., the crimp cycle) was completed successfully (step 830). In some embodiments, the electronic processor 100 may generate an indication that the operation was successful via, for example, the indicators 116. When the first difference value, however, exceeds the first deviation threshold, the electronic processor 100 determines that the operation (e.g., the crimp cycle) was completed unsuccessfully (step 835). For example, the trigger may have been released early, the hydraulic power tool (e.g., the crimper 10 and/or the cutter 210) may be malfunctioning, or the like. In some embodiments, the electronic processor 100 generates an alert to indicate that the operation was unsuccessful.

Referring back to step 815, when the electronic processor 100 determines that the first difference value exceeds the second difference value, the electronic processor 100 proceeds to identify a type of operation based on the second expected data curve. For example, and as mentioned above, the electronic processor 100 may identify a type of crimp performed by the hydraulic power tool (e.g., the crimper 10) at step 840. The electronic processor 100 may identify the crimp type as using a crimper head 50, using die type X for 3/0 wire, and crimping 3/0 aluminum wire. The electronic processor 100 can also then determine whether the crimp cycle was completed successfully. The electronic processor 100 determines whether the second difference value exceeds a second deviation threshold (step 845). As mentioned above, the second deviation threshold may be different than the first deviation threshold, since the second deviation threshold is based on a different expected data curve. In some embodiments, however, the second deviation threshold and the first deviation threshold are the same.

When the electronic processor 100 determines that the second difference value exceeds the second deviation threshold, the electronic processor 100 determines that the operation (e.g., the crimp cycle) was completed unsuccessfully (step 835). As described above, the electronic processor 100 may generate an alert indicating that the operation was unsuccessful. On the other hand, when the electronic processor 100 determines that the second difference value does not exceed the second deviation threshold, the electronic processor 100 determines that the operation (e.g., the crimp cycle) was completed successfully (step 850). Again, the electronic processor 100 may generate an indication using, for example, the indicators 116 to show that the operation was completed successfully.

Although FIGS. 18-22 were described as being performed by the electronic processor 100, in some embodiments, the electronic processor 342 of the external device 164 may perform the methods described with respect to FIGS. 18-22. For instance, in some embodiments, a limited data set is obtained and stored in the memory 132 of the hydraulic power tool (e.g., the crimper 10). In such embodiments, the electronic processor 342 compares the maximum pressure or current value of each cycle covered by the tool operational data to the predetermined threshold to determine whether full pressure was achieved in each cycle, as described, for example, with respect to FIG. 19. In embodiments where additional data or data curves are captured during each cycle, as described above, more thorough comparison techniques as described with respect the data curve analysis of, for example, FIGS. 18, 19, 20, and 22 are carried out by the electronic processor 342 of the external device 164. As noted above, the particular expected data curve of the expected curve data 326 used may be selected by the electronic processor 342 based on user input of head type, die type, and workpiece characteristics, or the curve may be selected by the electronic processor 342 automatically based on curve matching function as described above with respect to FIG. 22.

The external device 164 may display one or more of the obtained data curves on the touch screen display 344, e.g., in response to a user request entered via the touch screen display 344 of the external device 164. Additionally, in some instances, the expected curve may be overlaid on the touch screen display 344 so that a user can compare the expected versus actual data curves of the crimper 10. In some instances, a user inputs crimp information (e.g., head type, die type, and workpiece characteristics) and the external device 164 uses the crimp information to obtain the expected data curve from the expected curve data 326 stored in memory, and overlays the obtained expected data curve on the display with the actual data curve.

In other embodiments, the electronic processor 342 of the external device 164 compares the actual curve data to the expected data curves stored in the expected curve data 326 and performs a curve matching function as described above (e.g., with respect to FIG. 22) to identify the type of crimp or operation performed. The external device 164 then displays on the touch display screen 344 the identified type of crimp, defined in terms of the head type, die type, and workpiece characteristics, for instance. As an example, the external device 164 may identify the crimp type as using crimper head 72, using die type X for 3/0 wire, and crimping 3/0 aluminum wire.

Figure 23:
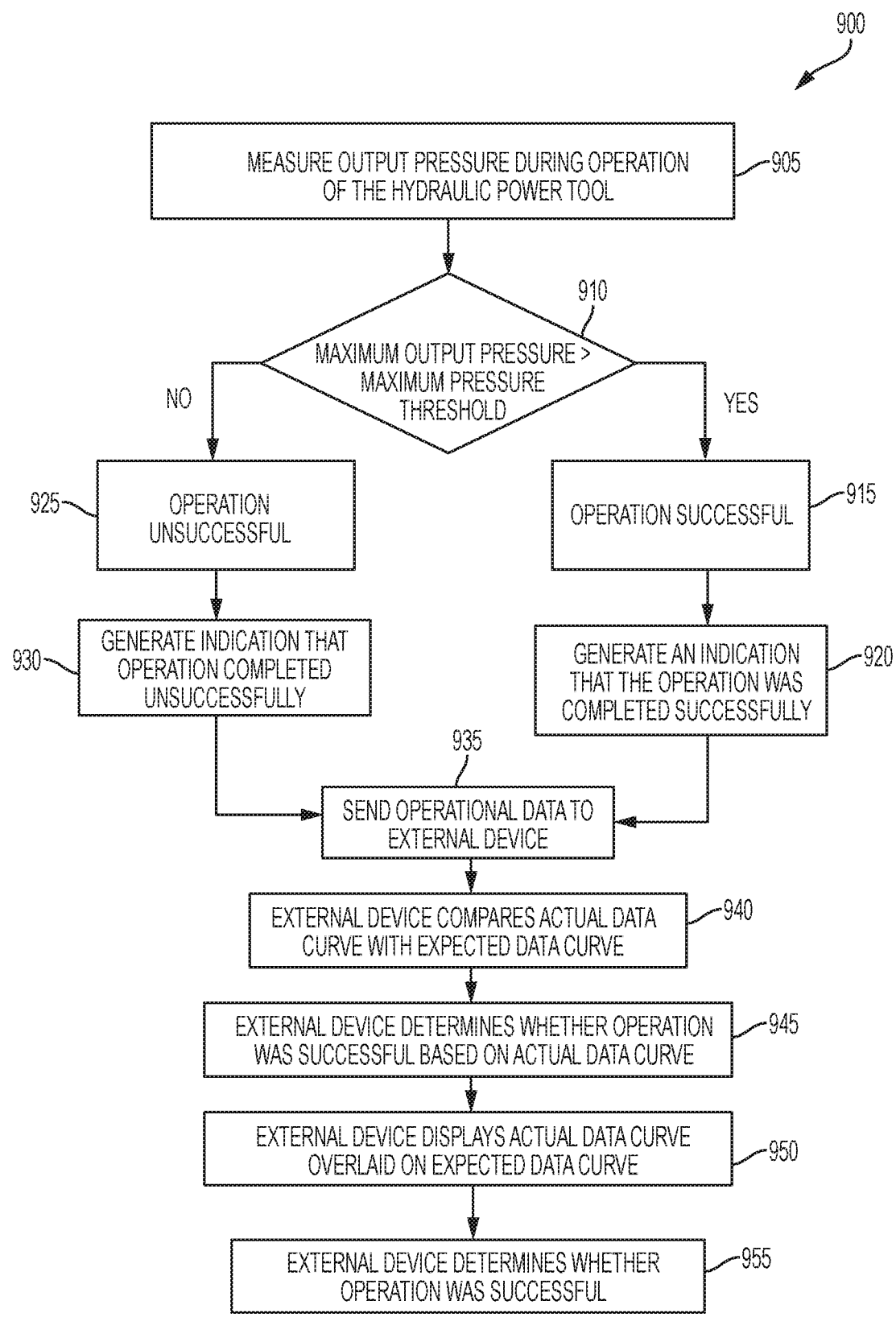
FIG. 23 illustrates a distributive method of operating the hydraulic power tool.

In some embodiments, the crimper 10 performs a more rapid, less complex analysis involving fewer data comparisons than the external device 164. For instance, after each cycle performed by the crimper 10, the electronic processor 100 of the crimper 10 compares the maximum pressure value of each cycle to the predetermined threshold and determines whether full pressure was obtained. However, the external device 164 performs the more thorough comparison techniques as described above with respect to the data curve analysis. In these embodiments, the expected curve data 326 may reside in the memory 330 of the external device 164, but not in the crimper 10. FIG. 23 illustrates a method 900 in which the electronic processor 100 performs a more simple analysis of the operational parameters and data, and the electronic processor 342 of the external device 164 performs analysis based on the actual data curve (e.g., a more complex analysis). As shown in FIG. 23, the crimper 10 (e.g., the pressure sensor 68) measures output pressure during the operation of the crimper 10 (step 905). The electronic processor 100 then determines whether a maximum output pressure measured during the operation of the crimper 10 (e.g., during the crimp cycle) exceeds a pressure threshold (step 910). When the electronic processor 100 determines that the maximum output pressure exceeds the pressure threshold, the electronic processor 100 determines that the operation (e.g., crimp cycle) was completed successfully (step 915) and generates an indication via the indicators 116 that the operation was successful (step 920). For example, the electronic processor 100 provides an indication (e.g., a signal) that causes the indicators 116 to generate an indication, such as lighting up green when the operation was completed successfully.

On the other hand, when the electronic processor 100 determines that the maximum output pressure does not exceed the pressure threshold, the electronic processor 100 determines that the operation (e.g., the crimp cycle) was unsuccessful (step 925) and the electronic processor 100 generates an indication via, for example, the indicators 116 that the operation was unsuccessful (step 930). For example, the electronic processor 100 provides an indication (e.g., signal) that causes the indicators 116 to generate an indication, such as lighting up red when the operation was completed unsuccessfully.

The electronic processor 100 also sends the operational data to the external device 164 through the antenna and transceiver 154 (step 935). The external device 164 receives the operational data from the crimper 10 and analyzes the operational data to determine whether the crimper 10 completed the operation successfully. As shown in FIG. 23, the external device 164 (e.g., the electronic processor 342 of the external device 164) compares the actual data curve with an expected data curve (step 940). In some embodiments, the electronic processor 342 of the external device 164 generates the actual data curve based on the operational data received from the crimper 10. In other embodiments, the crimper 10 sends the actual data curve to the external device 164. As described above, the electronic processor 342 of the external device 164 may select an expected data curve based on specific characteristics of the completed operation, or may perform a curve matching function as described with reference to FIG. 22 to determine an expected data curve to use. The electronic processor 342 of the external device 164 then determines whether the operation was completed successfully based on the comparison of the actual data curve and the expected data curve (step 945). The electronic processor 342 of the external device 164 may implement the methods 600 and/or 700 described in FIGS. 19 and 20 to determine whether the operation was completed successfully. In one embodiment, the electronic processor 342 of the external device 164 displays the actual data curve overlaid on the expected data curve on the touch display 344 (step 950). In other words, the actual data curve and the expected data curve are displayed simultaneously on the display 344 (e.g., within the section of the display 344) such that the differences between the actual data curve and the expected data curve are illustrated. In some embodiments, the actual data curve is displayed on top of the expected data curve, while in other embodiments, the expected data curve is displayed on top of the actual data curve. Such a display allows the user to visualize how the actual data curve differs from the expected data curve and may help a user determine how to complete the operation successfully (e.g., switching crimping heads). Additionally, as shown in FIG. 23, when the electronic processor 342 of the external device 164 determines that the operation was completed unsuccessfully (step 955), and may, in some embodiments, generate an alert through the external device 164 (e.g., using speakers, the touch display 344, a vibrate motor, and the like). Varying complexity levels of analysis between devices uses less memory space in the memory 232 of the crimper 10 and less computational effort of the controller 130 in the crimper.

With respect to FIG. 23, in some embodiments, the electronic processor 100 of the crimper 10 performs steps 905-935, but the external device 164 does not perform additional analysis on the operational parameters and/or data detected by the crimper 10. In such embodiments, the operational data is sent to the external device 164 for display and/or storage purposes. In other embodiments, after the electronic processor 100 determines whether the operation of the hydraulic drive 11 was performed successfully (e.g., steps 915 and 925), the crimper 10 sends an output to the external device 164 (e.g., via the transceiver 154) indicating whether the operation of the hydraulic drive 11 was successful. In such embodiments, the external device 164 may generate an indication to the user of whether the operation of the hydraulic drive 11 was successful instead of the indication being provided on the crimper 10. For example, the external device 164 may generate an indication via the display screen 344, a speaker, and/or a vibrate motor. In yet other embodiments, after the sensors 110 measure an operational parameter of the hydraulic drive 11 (e.g., an output pressure) as discussed with respect to step 905, the crimper 10 sends (e.g., via the transceiver 154) the measured operational parameter(s) to the external device 164. In such embodiments, the external device 164, and in particular, the electronic processor 342, compares the operational parameter (e.g., output pressure) to a maximum threshold, determines whether the operation of the hydraulic drive 11 was successful based on whether the operational parameter exceeds the maximum threshold, and generates an indication to the user of whether the operation of the hydraulic drive 11 was successful, as discussed with respect to steps 910-930. In such embodiments, the crimper 10 measures the operational parameters, but the analysis of the operational parameters is performed by the electronic processor 342 of the external device 164.

Additionally, although FIGS. 18-23 have been discussed as being performed by the electronic processor 100 of the crimper or the electronic processor 342 of the external device 164, in some embodiments, the methods discussed with respect to FIGS. 18-23 may be performed by the electronic processor 350 of the server 312. For example, as discussed with respect to FIG. 23, the crimper 10 may perform a more coarse analysis of the operational data while the electronic processor 350 of the server 312 performs a more thorough analysis of the actual data curve. In other embodiments, all the analysis of the operational data of the crimper 10 (or another hydraulic power tool) is performed by the electronic processor 350 of the server 312. For the electronic processor 350 of the server 312 to perform the analysis, the operational data is first sent to the server 312 through, for example, the external device 164 and over the network 314. The server 312 may then provide indications and/or messages back to the external device 164 when the operations are determined to have been completed unsuccessfully. Additionally, although the steps in FIGS. 18-23 are described as being performed serially, some steps may be performed concurrently (e.g., in parallel). Further, the steps shown in FIGS. 18-23 may be performed in another order by each of the electronic processors 100, 342, 350 than the order shown.

The electronic processor 100, electronic processor 342 and/or electronic processor 350, respectively, are also operable to detect a malfunctioning crimper 10. For instance, these devices may generate an alert if the maximum pressure received over a certain number of or percentage of crimp cycles is below a predetermined threshold. Additionally, these devices may generate an alert if current, pressure, or motor speed is substantially below or above an expected value at any, select, or one point along the obtained data curves. For instance, the analysis methods may have high and low alert threshold levels that, when crossed during a crimp cycle, cause an alert. The generated alerts are perceptible to a human and may be generated via, for instance, the feedback indicators 174 or the touch screen display 344.

Figure 24:
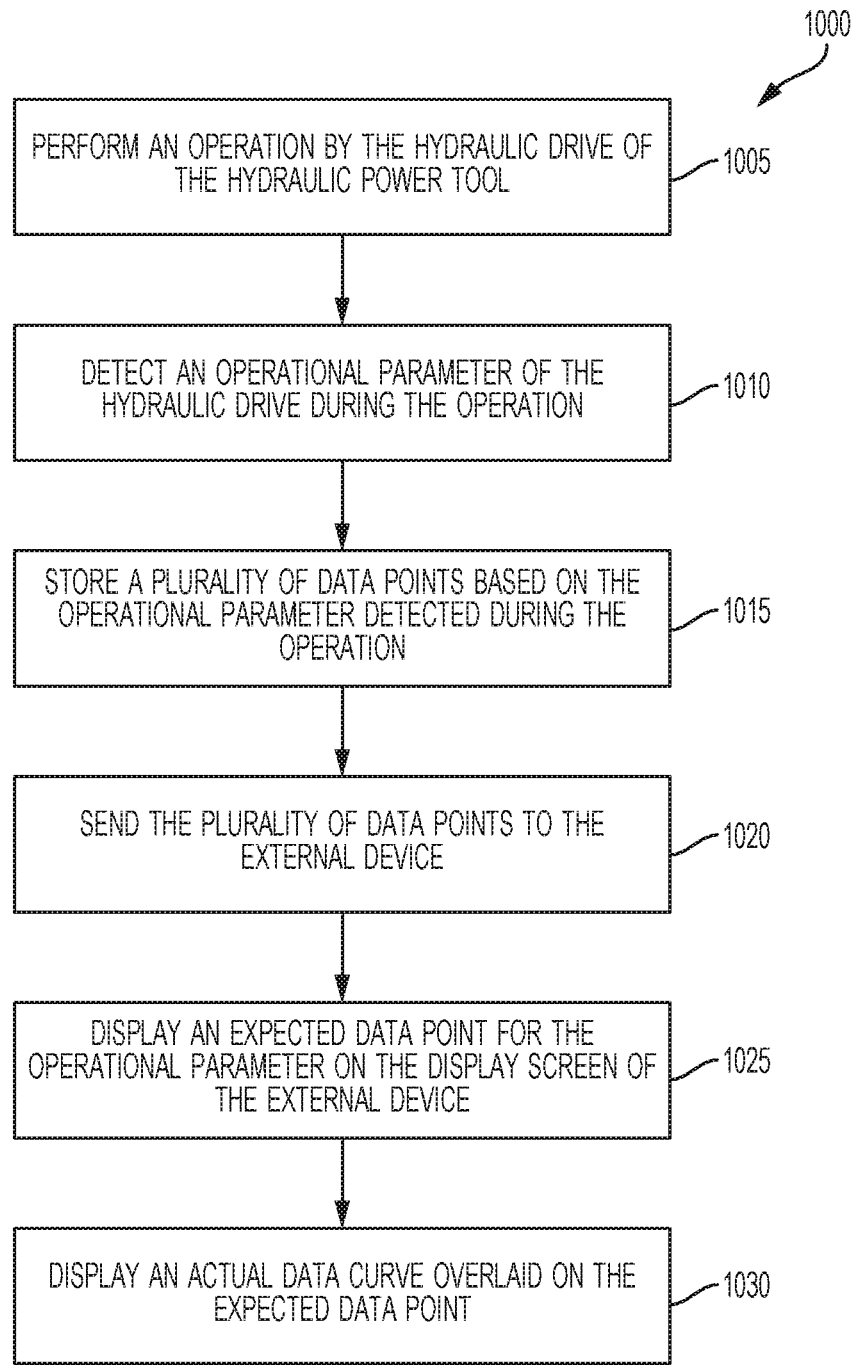
FIG. 24 illustrates a method of operating a hydraulic power tool.

FIG. 24 illustrates a method 1000 of operating a hydraulic power tool such as, the crimper 10. As shown in FIG. 24, the crimper 10 performs an operation by the hydraulic drive 11 of the crimper 10 (step 1005). During the operation of the hydraulic drive 11, a sensor such as, for example, one of sensors 110 detects an operational parameter of the hydraulic drive 11 (step 1010). In some embodiments, the operational parameter corresponds to output pressure, voltage measurements indicative of the output pressure, motor speed, and/or motor current. The electronic processor 100 of the crimper 10 then proceeds to store a plurality of data points based on the operational parameter and detected during the operation of the hydraulic drive 11 (step 1015). In some embodiments, the electronic processor 100 stores each of the plurality of data points with a corresponding sampling time (e.g., a time at which the specific data point was sampled). In other embodiments, the electronic processor 100 stores the plurality of data points and a sampling rate such that a corresponding sampling time can be computed for each data point. In yet other embodiments, the electronic processor 100 stores only the plurality of data points and a sampling rate and/or sampling times are provided by a different device, and/or are already stored in the memory 135.

The crimper 10 then proceeds to send the plurality of data points to the external device 164 via the transceiver 154 on the crimper 10 (step 1020). The external device 164, and in particular, the electronic processor 342, proceeds to control the display screen 344 to display an expected data point for the operational parameter (step 1025). In some embodiments, the expected data point is display along with, and as part of, an expected data curve. The electronic processor 342 also controls the display screen 344 to display an actual data curve overlaid on the expected data point (1030). The actual data curve is based on the plurality of data points over time. In other words, the actual data curve is a plot of the plurality of data points over time based on the sampling rate and/or the specific sampling times for each data point. As discussed above, when the actual data curve is overlaid on the expected data point, the actual data curve and the expected data point are displayed simultaneously on the same section of the display screen 344. In some embodiments when the actual data curve is overlaid on the expected data point, the expected data point is displayed on top of the actual data curve. In other embodiments, the actual data curve is displayed on top of the expected data point.

Figure 25:
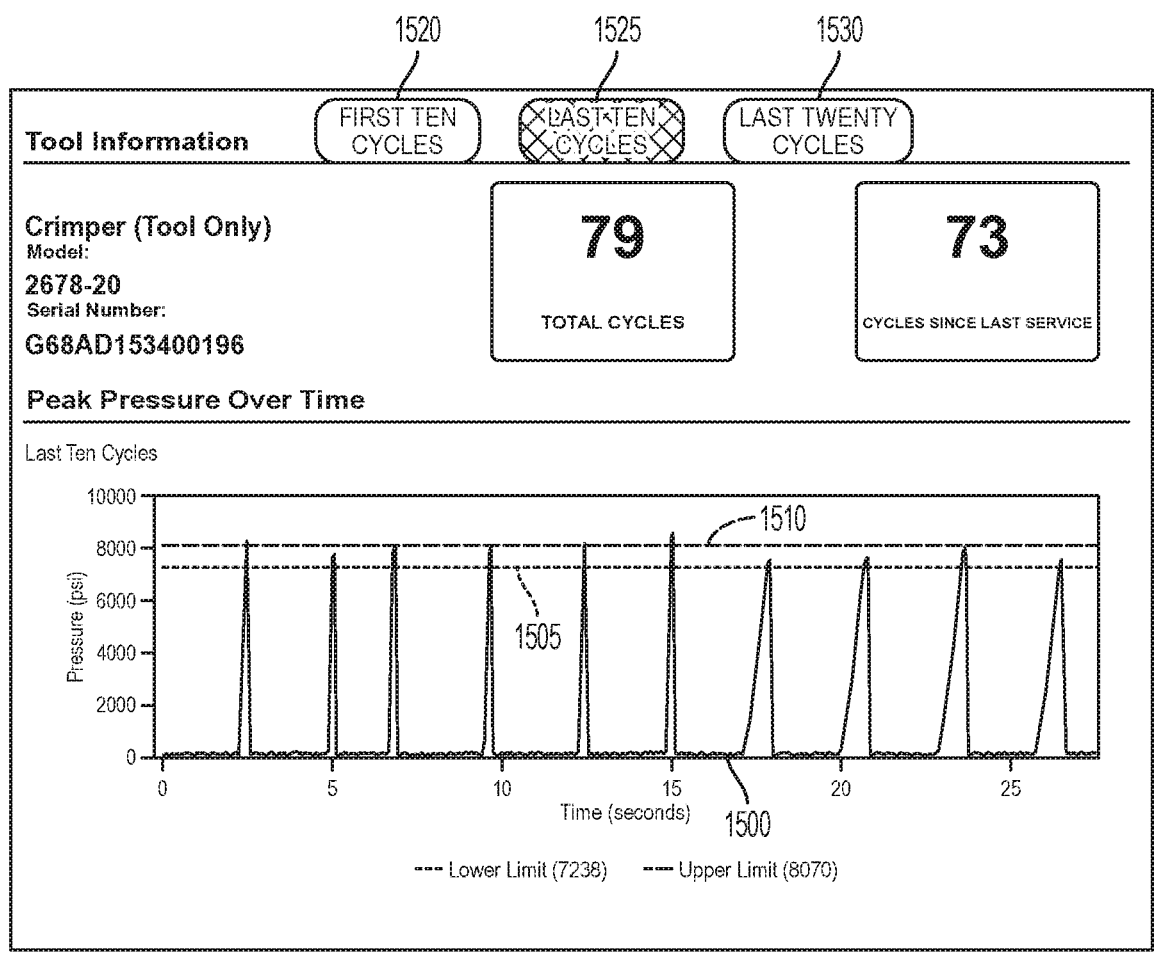
FIG. 25 is an exemplary screenshot of a display screen of the external device.

FIG. 25 illustrates an exemplary screenshot of the display screen of the external device 164. As shown in FIG. 25, the display screen 344 displays a graph including an actual data curve 1500 displayed overlaid on a first expected data curve 1505 and on a second expected data curve 1510. In the example of FIG. 25, the first expected data curve 1505 may correspond to, for example, a minimum threshold to which certain data points (e.g., the peaks) of the actual data curve 1500 are compared. The second expected data curve 1510 may correspond to, for example, a maximum threshold to which the same or different data points (e.g., the peaks) of the actual data curve 1500 are compared. In some embodiments, the electronic processor 100 of the crimper 10 and/or the electronic processor 342 of the external device 164 compares at least some of the data points of the actual data curve 1500 to the minimum threshold and/or the maximum threshold to determine whether the operation of the crimper (e.g., the crimp cycle) is completed successfully. When the actual data point exceeds the minimum threshold and/or is below the maximum threshold, the electronic processor 100 of the crimper 10 determines that the crimp cycle was completed successfully. In some embodiments, the external device 164 receives the data points and/or the minimum and maximum thresholds from the crimper 10 and displays them as shown in FIG. 25. In other embodiments, the external device 164 receives the data points and/or the minimum and maximum thresholds from the server 312.

Additionally, as shown in FIG. 25, the display screen 344 includes a first actuator 1520, a second actuator 1525, and a third actuator 1530. These actuators 1520, 1525, 1530 are selectable to indicate how many crimp cycles are displayed on the display screen 344. Based on which of the three actuators 1520, 1525, 1530 is selected, the electronic processor 342 of the external device 164 determines how many crimp cycles are to be displayed. In one embodiment, the electronic processor 342 identifies each crimp cycle based on when the operational parameter (e.g., output pressure) returns to a baseline after reaching a peak. In another embodiment, the electronic processor 342 identifies each crimp cycle based on when the operational parameter (e.g., the output pressure) reaches a peak and/or exceeds a threshold (e.g., the minimum threshold 1505). Therefore, the external device 164 may display different number of crimp cycles based on a user input through the display screen 344 or other control device of the external device 164.

Figure 26:
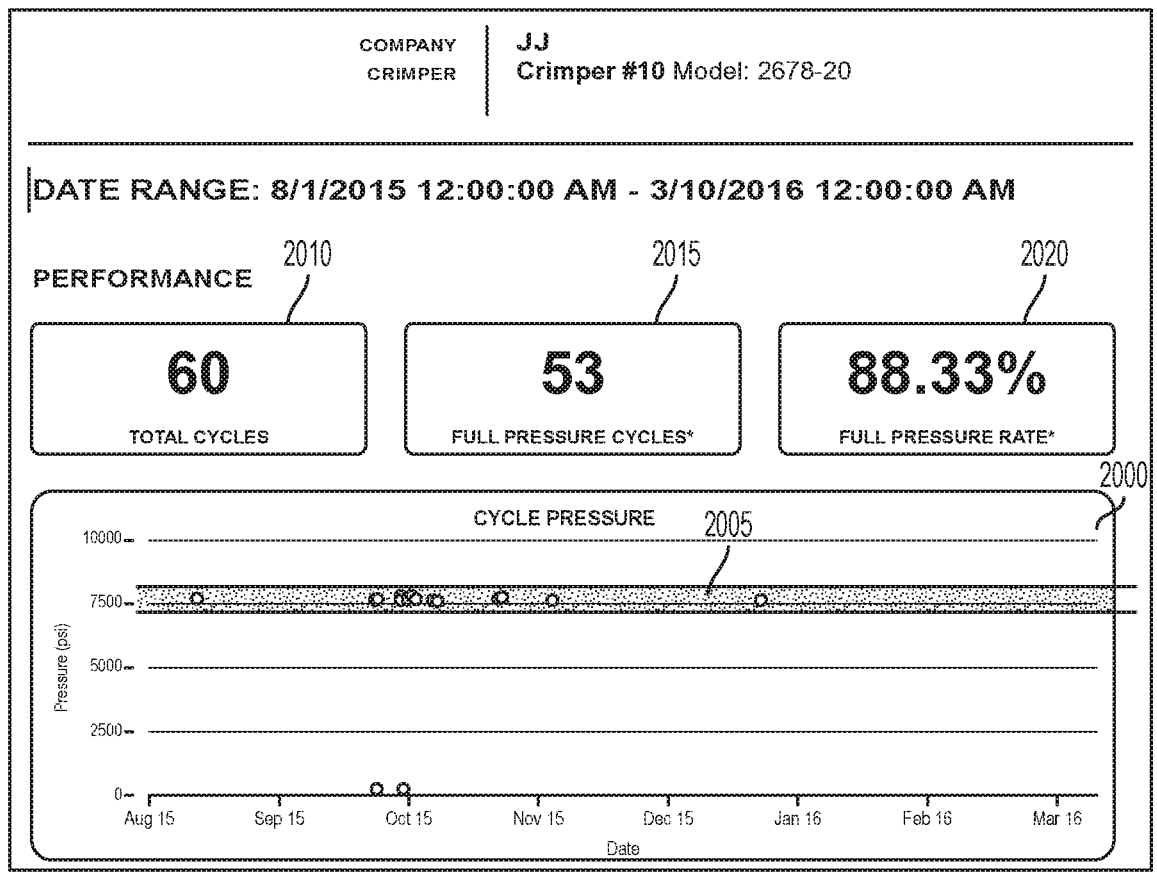
FIG. 26 is another exemplary screenshot of the display screen of the external device.

FIG. 26 illustrates another exemplary screenshot of the display screen 344 of the external device 164. As shown in FIG. 26, the display screen 344 displays a graph 2000 having a plurality of points representative of each crimp cycle. In one embodiment, each point may represent the maximum pressure reached during the particular crimp cycle. The graph 2000 also includes a shaded portion 2005 that indicates a desirable range for the maximum pressure of each crimp cycle. In some embodiments, the shaded portion 2005 corresponds to the area between the minimum threshold 1505 and the maximum threshold 1510 discussed with respect to FIG. 25. In the illustrated embodiment, the display screen 344 also displays a first indicator 2010 displaying a total number of cycles completed by the crimper 10, a second indicator 2015 displaying a total number of cycles for which full pressure was reached by the crimper 10, and a third indicator 2020 displaying a percentage (e.g., rate) of the number of cycles that reached full pressure compared to the number of total cycles performed by the crimper 10. The number of cycles for which full pressure was reached corresponds to the number of cycles for which the maximum pressure during the crimp cycle was within the shaded portion 2005 (e.g., between the minimum and the maximum thresholds). As shown in FIG. 26, the graph 2000 also illustrates the crimp cycles for which full pressure was not reached. In the illustrated embodiment, two crimp cycles were completed unsuccessfully and their corresponding maximum pressure was measured as approximately zero (0) pounds per square inch (psi).

Furthermore, the electronic processor 100, electronic processor 342 and/or processor 350, respectively, are also operable to provide early notification if the crimper performance is degrading over time. For instance, rather than comparing a parameter obtained from the tool operational data 322 to a particular threshold for a single data point, the parameter over several or many data points across multiple crimp cycles may be analyzed. If the data points are trending away from a desired value, even if not yet in excess of an alert threshold for an individual data point, the electronic processor 100, electronic processor 342, and/or processor 350 is operable to generate an alert providing an early notification of performance degradation. For instance, if the maximum achieved pressure over a set of 50 cycles is still above the predetermined threshold used to determine whether a fully pressure cycle occurred, but the detected pressure values are trending closer to the predetermined threshold at a predetermined rate, an early notification alert indicating performance degradation may be generated. In turn, a user may take the crimper 10 in for service before the crimper 10 is actually malfunctioning such that it cannot consistently achieve full pressure cycles.

Additionally, a series of overcurrent or other error conditions over a certain number of cycles will cause the electronic processor 100, electronic processor 342 and/or processor 350, to generate an early notification alert indicating performance degradation.

Furthermore, service technicians performing maintenance or diagnostic analysis of the crimper 10 may obtain tool operational data 322 from the crimper 10 via the external device 164 associated with the service personnel or via another device (e.g., via a web browser on a laptop computer) accessing the information previously stored on the memory 354 of the server 312. The service technicians may manually compare current, pressure, and/or motor speed data curves to expected data curves for the respective parameters. Particular deviations of the actual data curves from the expected data curves can indicate to the service technicians a particular issue with the crimper 10, such as a malfunctioning motor 12 or pump 14.

Figure 5:
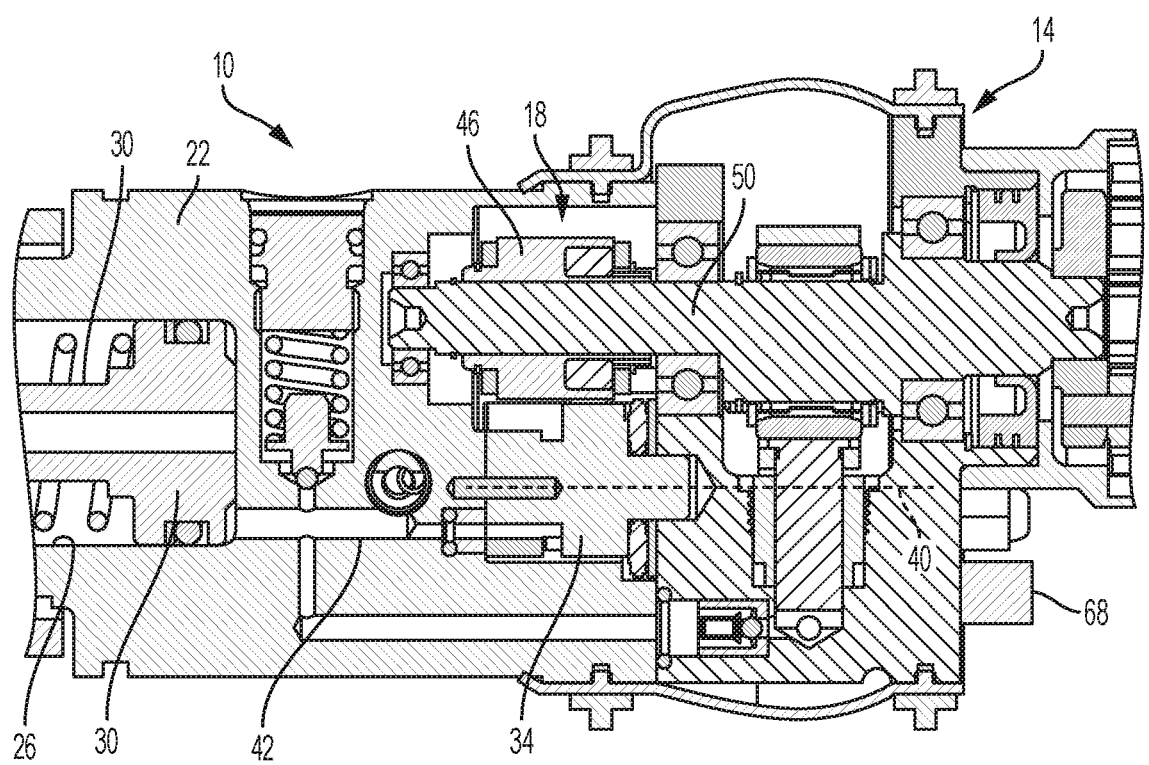
FIG. 5 is a portion of the power tool of FIG. 1, illustrating the rotary return valve in the closed position.

Although FIGS. 11-23 were generally described with respect to the crimper 10, including methods 400 of FIG. 5, 500 of FIG. 18, 600 of FIG. 19, 700 of FIG. 20, 800 of FIG. 22, and 900 of FIG. 23, the concepts described similarly apply to the cutter 210. For instance, data is captured by the cutter 210 using similar techniques, output by the cutter 210 to the external device 164 and server 312 using similar techniques, and analyzed by the cutter 210, external device 164, and/or server 312 using similar techniques as described above. The method 400 is further applicable to other hydraulic tools (e.g., knock-out punches) and to other power tools (e.g., standard drill/drivers, impact drivers, hammer drills/drivers, circular saws, reciprocating saws, table saws, orbital sanders, belt sanders, routers, etc.).

Furthermore, the method 400 is operable to analyze each of the parameters making up the tool operational data noted above. For instance, the electronic processor 100 in step 406, the external device 164 in step 416, and/or the server 312 in step 422 are each operable to analyze tool operational data (e.g., compare the data values to particular thresholds) to determine whether a threshold is exceeded. The analysis may be used to provide general statistical and tool usage information to a user, and/or to generate alerts in the instance of malfunctions, maintenance requirements, or performance degradation.

What is claimed is:

1. A power tool system comprising:
 a hydraulic power tool including:
  a hydraulic drive including a pump and a motor configured to drive the pump,
  a sensor configured to detect an operational parameter of the hydraulic drive during an operation by the hydraulic drive, and
  a first electronic processor configured to
   store a plurality of data points based on the operational parameter detected during the operation, and
   send, via a transceiver on the hydraulic power tool, the plurality of data points to an external device; and
 the external device including
  a display screen;
  a second electronic processor coupled to the display screen and configured to:
   receive the plurality of data points from the hydraulic power tool, and control the display screen to display an expected data point for the operational parameter for the operation,
   control the display screen to display an actual data curve based on the plurality of data points, the actual data curve overlaid on the expected data point,
   compare the actual data curve with an expected data curve stored in the memory, determine whether the operation of the hydraulic drive was successful in processing a workpiece based on the actual data curve and the expected data curve, and provide an indication of whether the operation of the hydraulic drive was successful in processing the workpiece;

wherein the second electronic processor is configured to compare the actual data curve with the expected data curve by calculating a difference value between each of a plurality of selected points of the expected data curve and corresponding points of the actual data curve, and summing absolute values of each of the difference values to generate a cumulative difference value; and wherein the second electronic processor is configured to determine whether the operation of the hydraulic drive was successful in processing the workpiece by determining that the operation of the hydraulic drive in processing the workpiece was unsuccessful when the cumulative difference value exceeds a deviation threshold, and determining that the operation of the hydraulic drive in processing the workpiece was successful when the cumulative difference value does not exceed the deviation threshold.

2. The power tool system of claim 1, wherein the operational parameter includes one selected from the group consisting of an output pressure, a motor current, and a motor speed.

3. The power tool system of claim 1, wherein the plurality of data points corresponds to the operational parameter detected over a crimp cycle of the hydraulic power tool.

4. The power tool system of claim 1, wherein the second electronic processor is configured to identify an expected curve feature in the expected data curve, the expected curve feature including one selected from a group consisting of a peak and a valley of the expected data curve;

identify an expected time period during which the expected curve feature is identified, the expected time period being shorter than a duration of the operation of the hydraulic drive;

identify an actual curve feature in the actual data curve, the actual curve feature including one selected from a group consisting of a peak and a valley of the actual data curve;

determine whether the actual curve feature occurs within the expected time period; and wherein the electronic processor determines that the operation of the hydraulic drive was unsuccessful in processing the workpiece when the actual curve feature occurs outside the expected time period.

5. The power tool system of claim 1, wherein the expected data curve is a first expected data curve, the second electronic processor being further configured to:

generate a first difference value representative of a first difference between the actual data curve and the first expected data curve;

generate a second difference value representative of a second difference between the actual data curve and a second expected data curve;

determine whether the first difference value exceeds the second difference value; and identify a type of operation performed by the hydraulic drive based on the second expected data curve when the first difference value exceeds the second difference value.

6. The power tool system of claim 5, wherein the second electronic processor is configured to determine whether the operation of the hydraulic drive was successful in processing the workpiece based on the actual data curve and the second expected data curve when the first difference value exceeds the second difference value; and determine whether the operation of the hydraulic drive was unsuccessful in processing the workpiece based on the actual data curve and the first expected data curve when the first difference value does not exceed the second difference value.

7. The power tool system of claim 6, wherein the second electronic processor is configured to generate an alert on the hydraulic power tool when the operational parameter does not exceed the threshold.

8. The power tool system of claim 5, wherein the second electronic processor is configured to determine that the operation of the hydraulic drive is unsuccessful in processing the workpiece when the first difference value and the second difference value exceed a predetermined threshold.

9. The power tool system of claim 1, wherein the operational parameter includes an output pressure, and wherein the electronic processor is configured to compare a maximum output pressure during the operation of the hydraulic drive to a maximum pressure threshold associated with an operation of the hydraulic power tool in successfully processing the workpiece; and generate, via an indicator on the hydraulic power tool, an indication that the operation of the hydraulic drive was successful in processing the workpiece when the maximum output pressure exceeds the maximum pressure threshold.

10. A power tool system comprising:

a hydraulic power tool including:

a hydraulic drive including a pump and a motor configured to drive the pump, a sensor configured to detect an operational parameter of the hydraulic drive during an operation by the hydraulic drive, and a first electronic processor configured to store a plurality of data points based on the operational parameter detected during the operation, send, via a transceiver on the hydraulic power tool, the plurality of data points to an external device; and the external device including a display screen;

a second electronic processor coupled to the display screen and configured to:

receive the plurality of data points from the hydraulic power tool, and control the display screen to display an expected data point for the operational parameter for the operation, control the display screen to display an actual data curve based on the plurality of data points, the actual data curve overlaid on the expected data point, compare the actual data curve with an expected data curve stored in the memory, determine whether the operation of the hydraulic drive was successful in processing a workpiece based on the actual data curve and the expected data curve, and provide an indication of whether the operation of the hydraulic drive was successful in processing the workpiece, wherein the second electronic processor is configured to compare the actual data curve with the expected data curve by identifying an expected curve feature in the expected data curve, the expected curve feature including one selected from a group consisting of a peak and a valley of the expected data curve, identifying an expected time period during which the expected curve feature is identified, the expected time period being shorter than a duration of the operation of the hydraulic drive, identifying an actual curve feature in the actual data curve, the actual curve feature including one selected from a group consisting of a peak and a valley of the actual data curve, and determining whether the actual curve feature occurs within the expected time period, wherein the second electronic processor determines that the operation of the hydraulic drive was unsuccessful in processing the workpiece when the actual curve feature occurs outside the expected time period.

11. The power tool system of claim 10, wherein the first electronic processor is configured to provide the indication by lighting an indicator on the hydraulic power tool.

12. The power tool system of claim 10, wherein the first electronic processor is configured to generate an alert on the hydraulic power tool when the second electronic processor determines that the hydraulic drive was not successful in processing the workpiece.

13. The power tool system of claim 10, wherein the operational parameter includes one selected from the group consisting of an output pressure, a motor current, and a motor speed.

14. The power tool system of claim 10, wherein the plurality of data points corresponds to the operational parameter detected over a crimp cycle of the hydraulic power tool.

15. A power tool system comprising:
a hydraulic power tool including:
a hydraulic drive including a pump and a motor configured to drive the pump,
a sensor configured to detect an operational parameter of the hydraulic drive during an operation by the hydraulic drive, and
a first electronic processor configured to
store a plurality of data points based on the operational parameter detected during the operation, and
send, via a transceiver on the hydraulic power tool, the plurality of data points to an external device; and the external device including
a display screen;
a second electronic processor coupled to the display screen and configured to:
receive the plurality of data points from the hydraulic power tool, and control the display screen to display an expected data point for the operational parameter for the operation,
control the display screen to display an actual data curve based on the plurality of data points, the actual data curve overlaid on the expected data point,
determine that the operation of the hydraulic drive was unsuccessful in processing the workpiece based on the actual data curve and the expected data point,
provide an indication of whether the operation of the hydraulic drive was unsuccessful in processing the workpiece.

16. The power tool system of claim 15, wherein the operational parameter includes one selected from a group consisting of an output pressure, a motor current, and a motor speed.

17. The power tool system of claim 15, wherein the operational parameter includes an output pressure, and wherein the electronic processor is configured to
compare a maximum output pressure during the operation of the hydraulic drive to a maximum pressure threshold associated with an operation of the hydraulic power tool in successfully processing a workpiece; and
generate, via an indicator on the hydraulic power tool, an indication that the operation of the hydraulic drive was successful in processing the workpiece when the maximum output pressure exceeds the maximum pressure threshold.

18. The power tool system of claim 15, wherein the plurality of data points corresponds to the operational parameter detected over a crimp cycle of the hydraulic power tool.

* * * * *